(12) United States Patent
Crosetto

(10) Patent No.: US 7,584,446 B2
(45) Date of Patent: Sep. 1, 2009

(54) METHOD AND APPARATUS FOR EXTENDING PROCESSING TIME IN ONE PIPELINE STAGE

(75) Inventor: Dario B. Crosetto, 900 Hideaway Pl., DeSoto, TX (US) 75115

(73) Assignee: Dario B. Crosetto, DeSoto, TX (US)

( * ) Notice: Subject to any disclaimer, the term of this patent is extended or adjusted under 35 U.S.C. 154(b) by 300 days.

(21) Appl. No.: 11/414,652

(22) Filed: Apr. 27, 2006

(65) Prior Publication Data
US 2006/0259889 A1 Nov. 16, 2006

(51) Int. Cl.
*G06F 17/50* (2006.01)
(52) U.S. Cl. .................... 716/10; 716/1; 716/16
(58) Field of Classification Search .............. 716/1, 716/10, 16
See application file for complete search history.

(56) References Cited

U.S. PATENT DOCUMENTS

| | | | |
|---|---|---|---|
| 3,916,383 A | 10/1975 | Malcolm | |
| 4,727,503 A | 2/1988 | McWhirter | |
| 4,928,246 A | 5/1990 | Crawley et al. | |
| 4,933,936 A | 6/1990 | Rasmussen et al. | |
| 4,969,469 A | 11/1990 | Mills | |
| 5,119,323 A | 6/1992 | Nickerson et al. | |
| 5,179,714 A | 1/1993 | Graybill | |
| 5,291,422 A | 3/1994 | Esztergar | |
| 5,603,012 A | 2/1997 | Sotheran | |
| 5,703,793 A | 12/1997 | Wise et al. | |
| 5,937,202 A | 8/1999 | Crosetto | |
| 6,130,967 A * | 10/2000 | Lee et al. | 382/302 |
| 6,222,406 B1 * | 4/2001 | Noda et al. | 327/269 |
| 6,680,753 B2 | 1/2004 | Kahn | |
| 6,904,110 B2 | 6/2005 | Trans et al. | |

OTHER PUBLICATIONS

Beigbeder et al., 1999, "An Update of the 2×2 Implementation for the Level 0 Calorimeter Triggers," LHCb 99-007, pp. 1-15.

Crosetto, Dario B., Mar. 30, 1999, Detailed Design of the Digital Electronics Interfacing Detectors, First-Level Triggers, and Higher Levels of Trigger with Flexible Configuration Parameters, LHCb 99-006, TRIG.

(Continued)

*Primary Examiner*—Vuthe Siek
*Assistant Examiner*—Brandon W Bowers
(74) *Attorney, Agent, or Firm*—Jones Day; Brett Lovejoy

(57) ABSTRACT

A single channel or multi-channel system that requires the execution time of a pipeline stage to be extended to a time longer than the time interval between two consecutive input data. Each processor in the system has an input and output port connected to a "bypass switch" (or multiplexer). Input date is sent either to a processor, for processing, or to a processor output port, in which case no processing is performed, through a register using at least one clock cycle to move date from register input to register output. For a single channel requiring an execution time twice the time interval between two consecutive input data, two processors are interconnected by the bypass switch. Data flows from the first processor at the input of the system, through the bypass switches of the interconnected processors, to the output. The bypass switches are configures with respect to the processors such that the system data rate is independent of processor number.

10 Claims, 56 Drawing Sheets

OTHER PUBLICATIONS

DeGrado et al., 1994, "Performance Characteristics of a Whole-Body PET Scanner," The Journal of Nuclear Medicine 35:1398-1406.

Eisenhandler, Eric, "Hardware Triggers at the LHC," pp. 47-56.

Lackey et al., Nov. 13, 1998, "CMS Calorimeter Level 1 Regional Trigger—Conceptual Design," CMS Note 1998/074.

Smith et al., 1998, "Calorimeter Trigger," Technical Overview, DoE/NSF Review, pp. 1-29.

* cited by examiner

Architecture (processor and system)

- Modularity (the same "logical unit," the 3D-Flow PE, replicated several times -- in a chip, on a board, or on a system)
- Powerful I/O "logical unit" = 3D-Flow Processing Element (PE)

a. High Energy Physics application    b. Commercial application

Basic Element: the 3D-Flow PE

- up to 26 operations per cycle
- Technology Independent
- Scalable

The 3D-Flow approach allows to:

- Select the technology and the number of PEs per chip
- Verify quickly from system level algorithm to gate-level by means of the Design Real-Time tools which interfaces with third-party Electronic Design Automation (EDA) tools.

See also: 3D-Flow System Monitoring
(for troubleshooting and software repairs during run-time)

■ One 3D-Flow PE = 100K gates

▦ 3D-Flow Chip = 16 PEs

Die-Size:

0.35 µm has a gate count of ~ 14000 per mm²
0.25 µm has a gate count of ~ 30000 per mm²
0.18 µm has a gate count of ~ 65000 per mm²

16 PEs in 0.25 µm technology can easily fit into the cavity of a 600 EBGA package

Power Dissipation:
from 0.35 µm to 0.25 µm is three times less
from 0.25 µm to 0.18 µm is three times less
(e.g., LSI-Logic Power Dissipation measured in Gate MHzAb G10 0.35 µm = 700 nW G10 0.25 = ... µm = 250 nW G10 0.18 µm = ...)

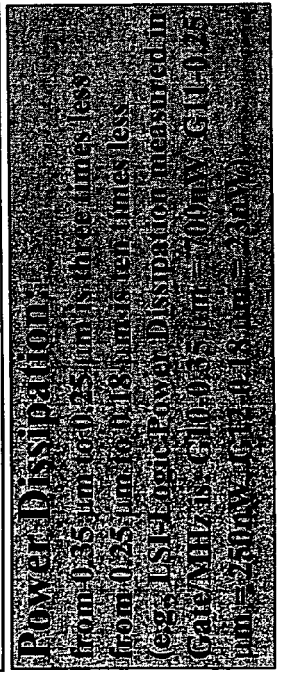

.25 µm - 2.5 Volt
600 pins EBGA
(4 x 4 cm)

OR

.18 µm - 1.8 Volt
676 pins EBGA
(2.7 x 2.7 cm)

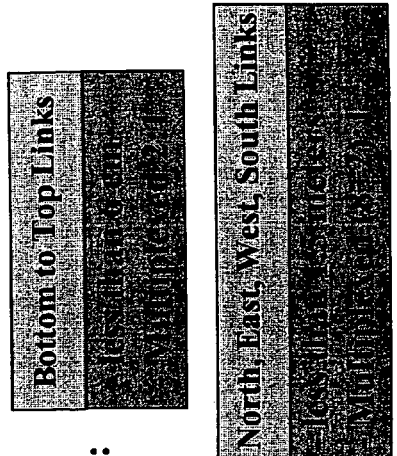

Output Drivers:

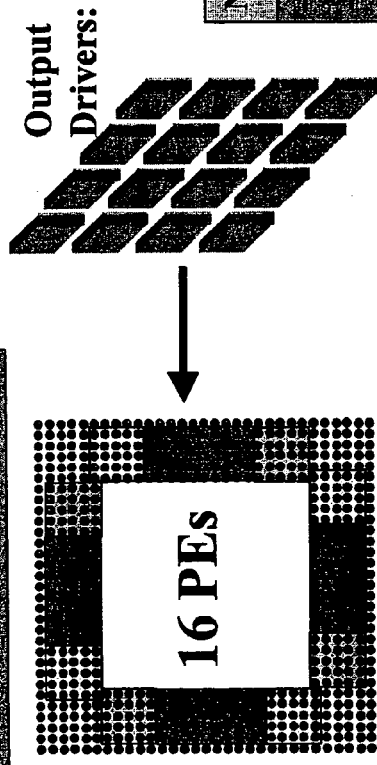

16 PEs

Fig. 12

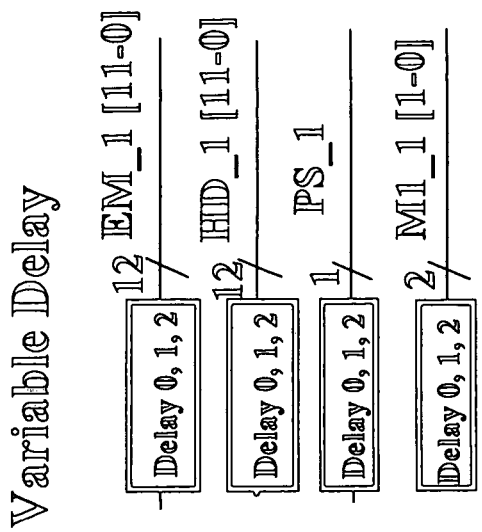

Fig. 18

```
--adding delays
ADD_DLY: PROCESS (clock, reset)
    BEGIN
        IF (reset = '0') THEN delay1_EM <= "000000000000";
            delay2_EM <= "000000000000";
            delay1_HD <= "000000000000";
            delay2_HD <= "000000000000";
            delay1_PS <= '0';
            delay2_PS <= '0';
            delay1_M1 <= "00";
            delay2_M1 <= "00";

ELSIF (clock'EVENT AND clock = '1')
            delay1_EM <= EM_1_clkd;
            delay2_EM <= delay1_EM;
            delay1_HD <= HD_1_clkd;
            delay2_HD <= delay1_HD;
            delay1_PS <= PS_1_clkd;
            delay2_PS <= delay1_PS;
            delay1_M1 <= M1_1_clkd;
            delay2_M1 <= delay1_M1;

ELSE
        END IF;

END PROCESS ADD_DLY;
```

```
-- change constant based on detector, and/or
electronics, and/or cables length
    Select_Del_EM <= EM_del;
    Select_Del_HD <= HD_del;
    Select_Del_PS <= PS_del;
    Select_Del_M1 <= M1_del;

-- This synchronises EM
    sync_data_EM <= delay2_EM WHEN (Select_Del_EM = "10")
                    ELSE delay1_EM WHEN (Select_Del_EM = "01")
                    ELSE EM_1_clkd;

-- This synchronises HD
    sync_data_HD <= delay2_HD WHEN (Select_Del_HD = "10")
                    ELSE delay1_HD WHEN (Select_Del_HD = "01")
                    ELSE HD_1_clkd;

-- This synchronises PS
    sync_data_PS <= delay2_PS WHEN (Select_Del_PS = "10")
                    ELSE delay1_PS WHEN (Select_Del_PS = "01")
                    ELSE PS_1_clkd;

-- This synchronises M1
    sync_data_M1 <= delay2_M1 WHEN (Select_Del_M1 = "10")
                    ELSE delay1_M1 WHEN (Select_Del_M1 = "01")
                    ELSE M1_1_clkd;
```

Variable Delay

Delay 0, 1, 2 → 12 EM_1 [11-0]
Delay 0, 1, 2 → 12 HD_1 [11-0]
Delay 0, 1, 2 → 1 PS_1
Delay 0, 1, 2 → 2 M1_1 [1-0]

Selecting

Fig 19

Fiig. 23

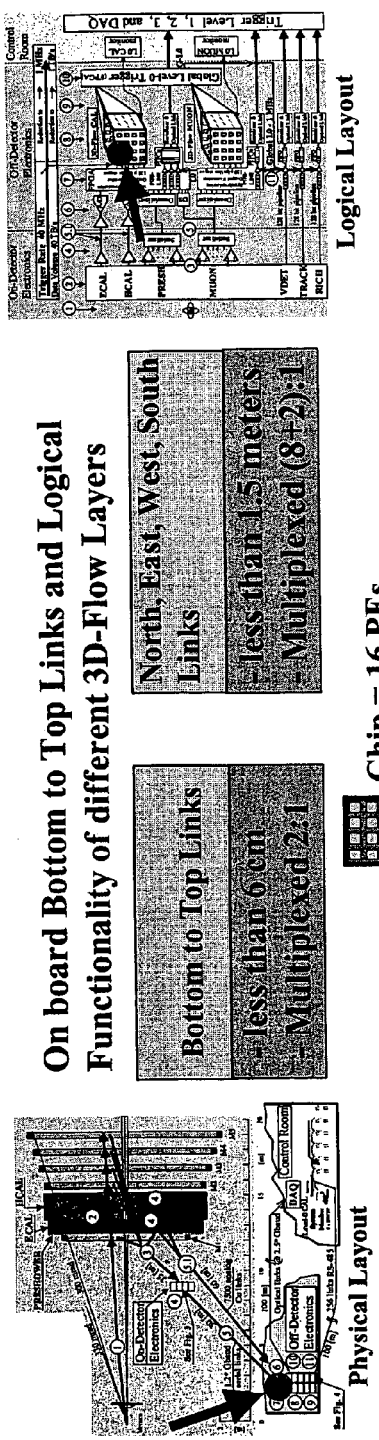
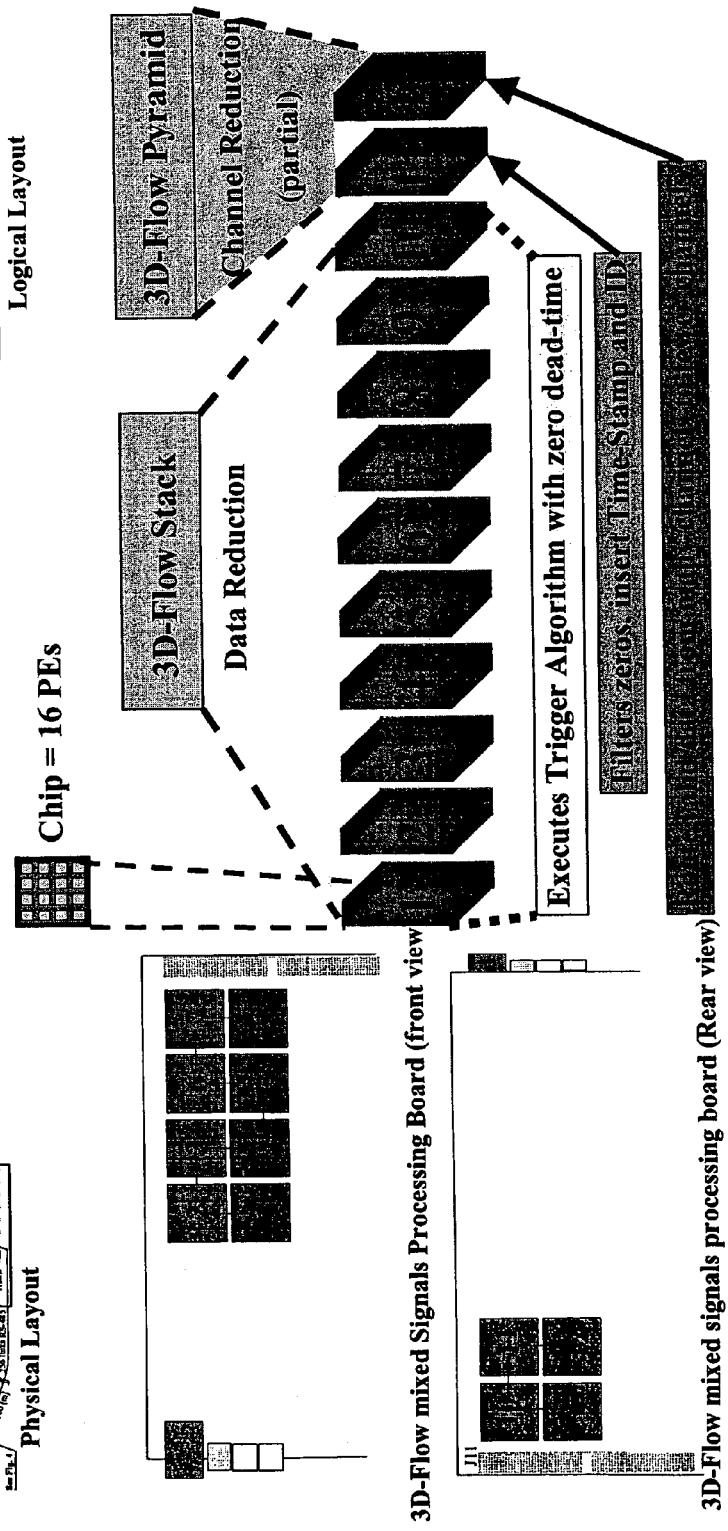
Fig 29

Fig 30

- One 3D-Flow PE = 100K gates
- 3D-Flow Chip = 16 PEs 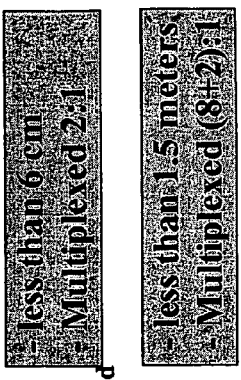

Top/Bottom I/O pins group (T/B) = 25 pins
([2 x (8+2)] + VCC, GND), Bit-0 Bottom is adjacent to Bit-0 Top, etc., for inserting jumpers between PCB pads when < 10 layers/board are required, thus not all 3DF chips are assembled.

North, East, West, South pins group (NEWS) = 5 pins (2 LVDS transmitter, 2 LVDS receivers, 1 VCC/GND). LVDS operates at 2.5 mA into 100 ohm termination.

See ASIC Design Verification (comparing system bit-vectors with gate-level bit-vectors)

- less than 6 cm — Multiplexed 2:1
- less than 1.5 meters — Multiplexed (8+2):1

.25 μm - 2.5 Volt
600 pins EBGA
(4 x 4 cm)
OR
.18 μm - 1.8 Volt
676 pins EBGA
(2.7 x 2.7 cm)

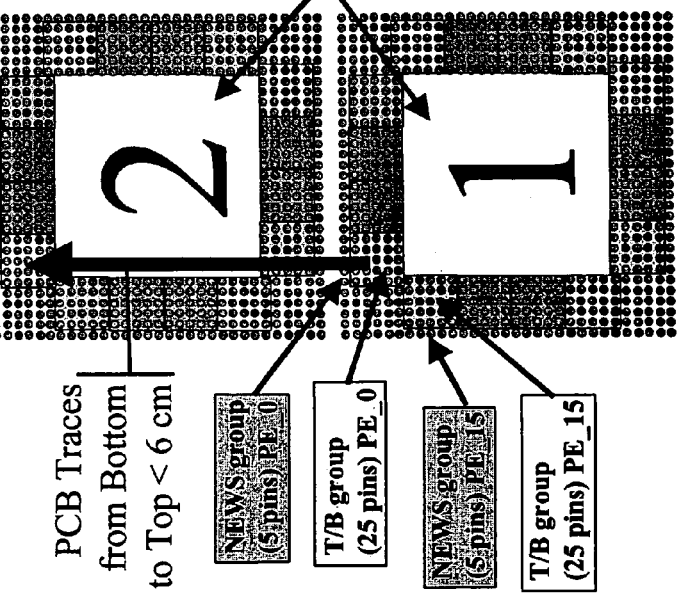

PCB Traces from Bottom to Top < 6 cm

NEWS group (5 pins) PE_0
T/B group (25 pins) PE_0
NEWS group (5 pins) PE_15
T/B group (25 pins) PE_15

See 3D-Flow System Monitoring (for troubleshooting and software repairs during run-time)

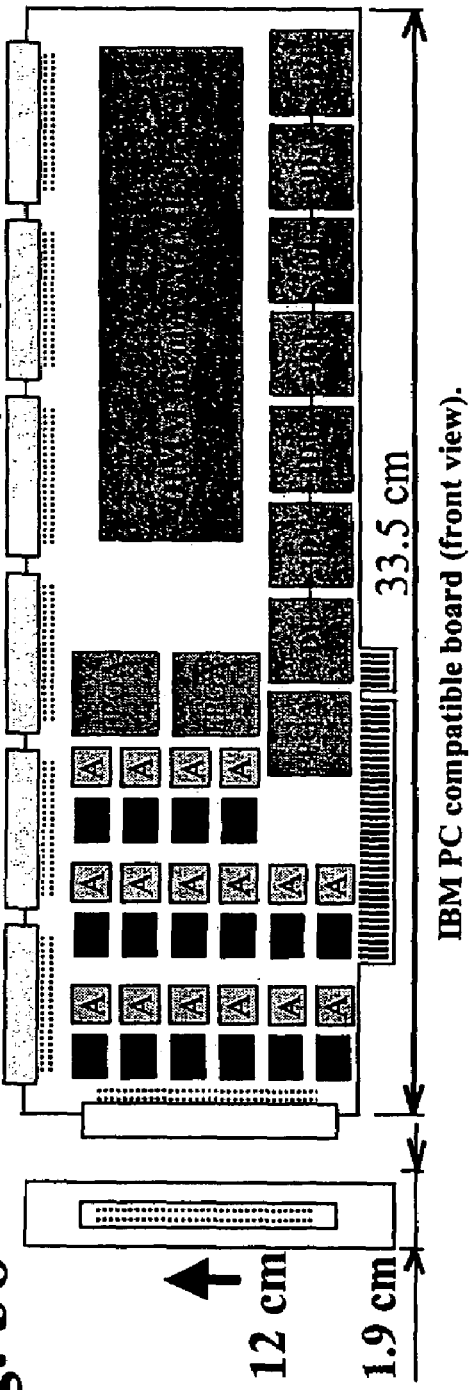
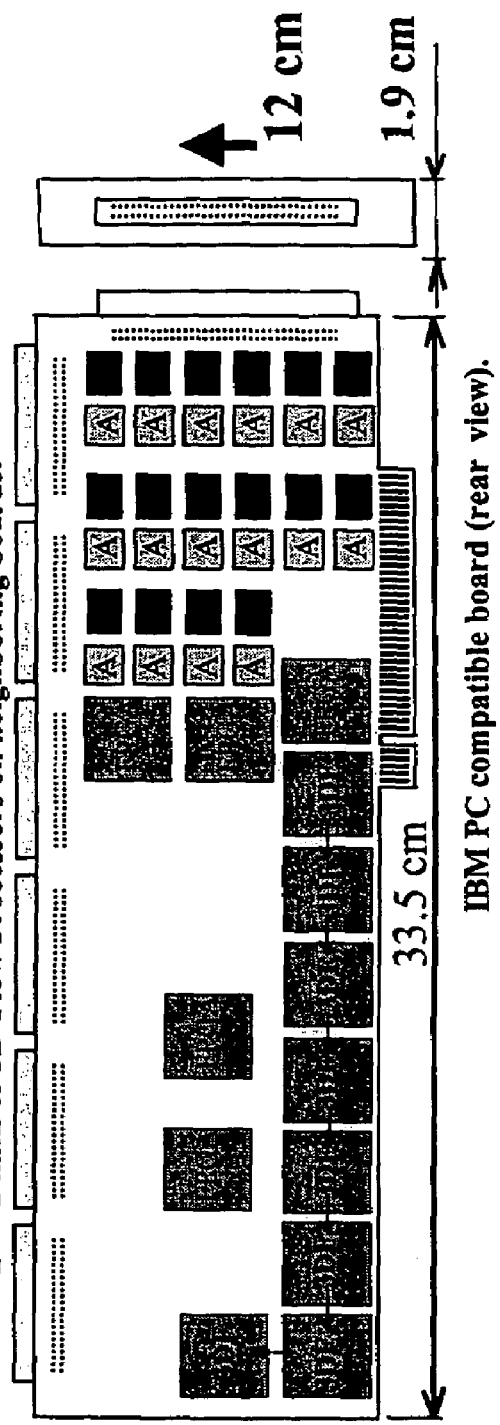
Fig. 38

Demonstrator SM for 128 Trigger Channels
(Using off-the-shelf components)

SM for 1024 Trigger Channels $$1 \times \begin{vmatrix} \quad \\ \quad \\ \quad \end{vmatrix} = \begin{vmatrix} 1 \times \text{IBM-PC @ \$1500} \\ 8 \times \text{Rockets @ \$561} \\ 16 \times \text{Panels @ \$200} \\ 256 \times \text{RS232 cables @ \$2.6} \end{vmatrix} = \$9{,}853$$

SM for 6144 Trigger Channels
= $59,118

| Current 3D systems | | 3D-Flow |
|---|---|---|
| On phantom | On human | On human |

(*) The physician injects up to 75 mCi of $^{15}$O-water. This means the patient is exposed to less radiation (315 mrem), but also that 5,550 million photons/sec are generated to the PET, compared to 10 mCi of $^{18}$F-FDG which is a higher radiation dose to the patient (1,100 mrem), but generates only 740 million photons/sec.

Fig. 55
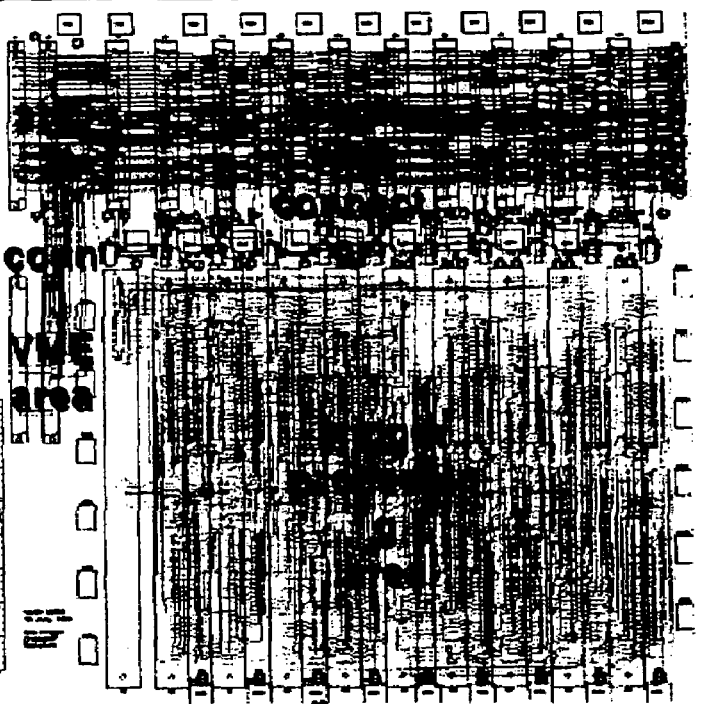
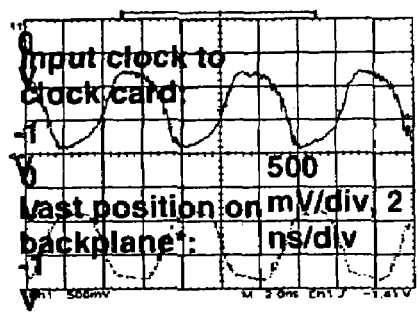
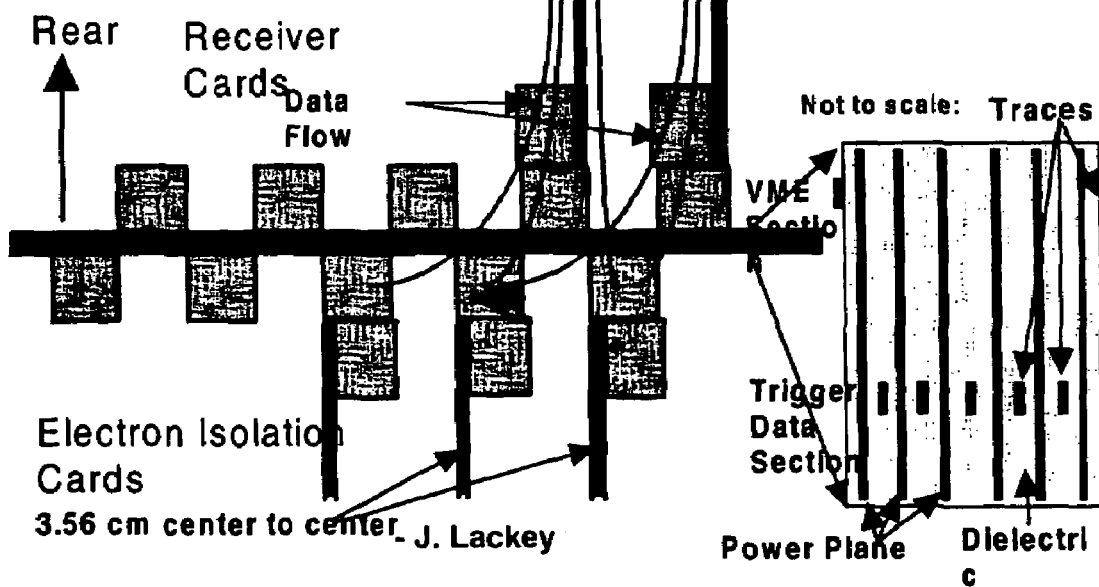

METHOD AND APPARATUS FOR EXTENDING PROCESSING TIME IN ONE PIPELINE STAGE

1. CROSS REFERENCES TO RELATED APPLICATIONS

This application claims priority to U.S. patent application Ser. No. 09/506,207, filed Feb. 16, 2000, now U.S. Pat. No. 7,051,309 entitled METHOD AND APPARATUS FOR EXTENDING PROCESSING TIME IN ONE PIPELINE STAGE, which claims benefit of: U.S. provisional application Ser. No. 60/120,194, filed Feb. 16, 1999, entitled IMPLEMENTATION OF FAST DATA PROCESSING WITH MIXED-SIGNAL AND PURELY DIGITAL 3D-FLOW PROCESSING BOARDS; U.S. provisional application Ser. No. 60/112,130, filed Mar. 12, 1999, entitled DESIGN REAL-TIME; U.S. provisional application Ser. No. 60/129,393, filed Apr. 15, 1999, entitled NOVEL INSTRUMENTATION FOR PET WITH MULTIPLE DETECTOR TYPES; U.S. provisional application Ser. No. 60/132,294, filed May 3, 1999, entitled SYSTEM DESIGN AND VERIFICATION PROCESS FOR ELECTRONICS; U.S. provisional application Ser. No. 60/142,645, Jul. 6, 1999, entitled REAL-TIME SYSTEM DESIGN ENVIRONMENT FOR MULTI-CHANNEL HIGH-SPEED DATA ACQUISITION SYSTEM AND PATTERN-RECOGNITION; U.S. provisional application Ser. No. 60/143,805, filed Jul. 14, 1999, entitled DESIGN AND VERIFICATION PROCESS FOR BREAKING SPEED BARRIERS IN REAL-TIME SYSTEMS; U.S. provisional application Ser. No. 60/154,153, filed Sep. 15, 1999, entitled NOVEL IDEA THAT CAN BRING BENEFITS IN PROVEN HEP APPLICATIONS; U.S. provisional application Ser. No. 60/161,458, filed Oct. 25, 1999, entitled SYSTEM DESIGN AND VERIFICATION PROCESS FOR LHC TRIGGER ELECTRONICS; U.S. provisional application Ser. No. 60/164,694, filed Nov. 10, 1999, entitled ADVANTAGES OF THE 3D-FLOW SYSTEM COMPARED TO CURRENT SYSTEMS; and U.S. provisional application Ser. No. 60/170,565, Dec. 14, 1999, entitled NOVEL INSTRUMENTATION FOR PET/SPECT SUITABLE FOR MULTIPLE DETECTOR TYPES. Each of the forgoing patent applications, and each of the other references cited herein, is incorporated by reference herein in its entirety.

2. BACKGROUND OF THE INVENTION 2.1 Current Pipelined Systems in Microprocessors and Fast Real-Time Electronics Pipelining is an implementation technique used to speed up CPUs or trigger systems in High Energy Physics (HEP), in which multiple instructions (or operations) are overlapped in execution. An instruction of a CPU (or trigger electronics in HEP) can be divided into small steps, each one taking a fraction of the time to complete the entire instruction. Each of these steps is called a pipe stage or pipe segment (see FIG. 1, where St_1=Stage 1). The stages are connected to one another to form a pipe.

The instruction (or datum in HEP) enters one end and exits from the other. At each step, all stages execute their fraction of the task, passing on the result to the next stage and receiving from the previous stage simultaneously. The example described herein refers to a speed of 40 MHz, but is not limited to that speed. Rather, the described approach applies to any speed which can be achieved with any technology.

Stage 1 either receives a new datum from the sensors every 25 ns and converts it from analog to digital in HEP, or fetches a new instruction in a CPU. The complete task (instruction in a CPU) is executed in the example of FIG. 1 in 5 steps of 25 ns each. In such a pipelined scheme, each stage has an allocated execution time that cannot exceed the time interval between two consecutive input data (or instruction in a CPU).

The pipelining technique has been used for many years in computer CPUs, and has subsequently been used also by the designers of the first-level triggers for HEP.

3. SUMMARY OF THE INVENTION

This invention deals with the hardware implementation of the 3D-Flow architecture that is independent of the platform used (large 9U boards described in Section 5.4.3.1, medium 6U VME boards described in Section 5.4.3.2, or small IBM PC compatible boards described in Section 5.4.3.3). Although certain specific materials are recited herein (such as the examples of three applications, one for High Energy Physics—HEP— in Section 5.5.1, one for medical imaging in Section 5.5.2 and one for robotics in Section 5.5.3), these are for illustrative purposes and not for limiting the invention. Accordingly, the invention is to be limited only by the appended claims and equivalents thereof when read together with the complete description of the present invention.

The example of the use of this method of the hardware implementation of the 3D-Flow architecture benefits Positron Emission Tomography (PET) by reducing by 60 times the time duration of an examination, or the amount of the radiation dose to the patient. The physician has the option of selecting one of the two advantages or a combination of these two.

The advantages result from the use of the common method described in this invention that is applicable in general to all applications having a single-channel or multi-channel system that requires the execution time of a "pipeline stage" to be extended beyond the time interval between two consecutive input data (see FIG. 2).

Such a "stage" is implemented with a linear array of analog or digital circuits (or processors) for a single channel and three dimensional arrays of analog or digital circuits (or processors) for a multi-channel system. Each analog or digital circuit (or processor) has at least one input and one output port connected to an internal or external "bypass switch+register" 10 (or multiplexer).

The data arriving from the input port can be sent either to the internal circuit (or processor) 20, or can be sent to the output port without being processed by the circuit (or processor) through a register that requires at least one clock cycle to move the data from the input to the output of the register.

Each circuit (or processor) can perform an analog function (or execute a digital algorithm) on the input data (and fetch additional data received from other input ports) requiring a time longer than the time interval between two consecutive input data. For example, for a stage of one channel requiring an algorithm execution time twice the time interval between two consecutive input data, two circuits need to be cascaded and interconnected by the internal or external "bypass switch+register" (or multiplexer).

For a stage requiring the execution of an algorithm which is three times longer than the time interval between two consecutive input data, three identical circuits should be cascaded, and so on. Data and results flow synchronously from the first circuit at the input of the system, through the "bypass switches+register" of the cascaded circuits, to the output. Multi-channel systems have several linear arrays of cascaded circuits (or processors) side-by-side that can also be interconnected laterally.

The hardware approach of the implementation of the layout of the "bypass switches+register" (or multiplexer) with respect to the cascaded circuits is such that a) a maximum input data rate is achieved, which is independent of the number of cascaded circuits used (while the number of cascaded circuits is proportional to the algorithm execution time); b) the PCB traces or wires connecting the "bypass switches+register" to the circuits can be kept short and at the same length, independent of the number of cascaded circuits used; c) the overall system construction is simplified, is modular and scalable; d) the solution is cost effective. This technique can be used (but it is not limited) for simplifying hardware construction and increasing performance when interconnecting different circuits inside a chip, between components, between boards, between crates, between systems. Rather than using a classical current approach (see central part of FIG. 4) with a centralized switching matrix device (which easily becomes the bottleneck of the entire system), the hardware implementation of the 3D-Flow architecture described herein (see right part of FIG. 4) eliminates bottlenecks.

Practical examples of applications that will benefit from the hardware implementation of the 3D-Flow architecture that is described in this invention, are the following:
1. all applications with processing and data-moving requirements that cannot be met by conventional processor architectures in the foreseeable future where
   a) the speed involved in this category of applications is one that needs to sustain an input data rate of the order of tens or hundreds of MHz with an input data word width of 32-bit, and
   b) the latency between the output results and input data is of the order of hundreds of ns.

Currently, these categories of applications make use of non-programmable cabled logic, different for each application. Typical examples are: detecting particles in High Energy Physics, and in Nuclear Medicine (PET, SPECT cameras, etc.), detecting and tracking fast-moving objects with a latency of 50-250 ns such as the one shown in FIG. 10B.

For all these applications, since there are no commercially available processors with an architecture suitable to these tasks, a 3D-Flow processor should be used with powerful I/O and instructions performing efficient data movement as described herein and in U.S. Pat. No. 5,937,202, 8/1999 Crosetto;
2. all applications with processing-time and data-moving requirements that cannot be met by a single conventional processor (or a single set of these connected in parallel), such as Pentium, Power PC, DSPs or the future EPIC 64-bit processor made by Intel and HP, but that can be met if several of them are assembled and interconnected via "bypass switches+register" 10, such as the 3D-Flow architecture described herein (see FIG. 2)
   a) the speed involved in this category of applications is one that needs to sustain an input data rate up to a few hundred KHz for an input data word width of 32-bit, and
   b) the latency between the output results and input data is of the order of hundreds of µs, or ms (depending on the complexity of the algorithm).

Typical examples are: a) a closed-loop system such as a robot with hundreds of sensors, and a feed-back algorithm (e.g. in C++) that requires the information from all the sensors to be analyzed and that cannot compute the next group of parameters that need to be sent to the actuators before a new set of input data arrives; b) a system for finding and tracking objects; c) quality control in industry or imaging processing.

For all these applications, since there are commercially available processors which could solve the problem if several of them were connected in cascade mode via bypass switches implementing the 3D-Flow architecture described herein, only the 3D-Flow "system-level" architecture needs to be implemented. The task for these applications is that of designing the interface circuitry to be put in between the commercially available processors.
3. where the modularity, scalability, and flexibility are required,
4. a short time to market implementation with low-cost components is desired (this is provided by having constrained the 3D-Flow architecture to a single type of replicated components which facilitate the development of the software tools).

Three examples of applications using the 3D-Flow architecture are provided herein:
1. two for the high-end system performance requiring the use of the 3D-Flow processor as the basic element of the 3D-Flow real-time architecture. One application targeted to be able to adapt to both unexpected operating conditions and to the challenge of new and unpredicted physics in High Energy Physics experiment (see Section 5.5.1), a second for the PET/SPECT/CT, etc. (see Section 5.5.2), medical imaging aiming to increase the sensitivity of the devices, to reduce the time duration of an exam, and to be able to monitor biological events that were not seen before;
2. one for a lower-end application (which cannot be solved by a single commercially available processor, however) requiring several commercial available processors interconnected via bypass switches in a 3D-Flow architecture mode (See Section 5.5.3). The example refers to the control of a robot system (but could be applied to acquiring and analyzing multiple sensors in an application).

3.1 Innovation in Breaking the Speed Barrier in Programmable Systems.

The key concept is a switching element intrinsic in each 3D-Flow processor (or external to the basic commercial processor if the lower performance solution is implemented) that allows for a processing time in a pipelined stage that is longer than the time interval between two consecutive input data. Other parts of the key elements are the related software and hardware of the 3D-Flow system which together make possible a simplified hardware implementation providing higher performance at lower cost.

3.2 Extending the Execution Time in One Pipelined Stage

The real-time algorithm in HEP, PET/SPECT medical instruments, and applications detecting fast moving objects requires the performance of a sophisticated analysis on the input data to optimally identify the particles, similarly in detecting photons in instruments for Nuclear Medicine, or in performing pattern recognition for objects identification in image processing.

The designers of electronics for these systems have attempted to achieve the above goal by using cable logic circuits, fast GaAs technology, and fast memories. All these solutions have assumed that the processing time in one pipelined stage may not exceed the time interval between two consecutive input data.

In the above applications as well as in others, however, it is desirable to extend the processing time in a pipeline stage.

The 3D-Flow system (see Section 5.1.3) introduces a layered structure of processors and an intrinsic bypass switch in each processor that can extend this processing time in one pipelined stage. Each 3D-Flow processor in "Stage 3" (St_3 in FIG. 2) executes the complete task of the first-level trigger algorithm. There is no division of the trigger algorithm into small steps, each executed by a different processor (or circuit) as would have been the case in a normal pipelined system.

If, for example, the time to execute the algorithm is ten times the time interval between two consecutive data, the processor of the first layer fetches one set of data from the top port connected to the sensors and (without processing them) moves the following nine sets of data to the subsequent layers via a bypass switch intrinsic to each 3D-Flow processor.

The processor in the second layer (see FIG. 5) will fetch one datum, move one result received from layer one and move eight input data received through layer one to the following layers through the internal bypass switches, and so on.

Thus, the key element of the 3D-Flow system to extend the processing time beyond the time interval between two consecutive input data, is the intrinsic bypass switch on each processor which allows for a longer processing time proportional to the number of layers.

The throughput problem posed by the need to exchange data or to execute unbreakable algorithms is illustrated in FIG. 3 and explained in its caption.

3.3 Example of Using a Commercial Processor in the 3D-Flow Architecture for a Robot Control Application A methodology linked to the 3D-Flow system architecture (see Sections 5.3, and 5.4.4) has been developed to efficiently assess all the factors affecting a target system (input data rate, input word-width, processor internal bus width, processor speed, complexity of the real-time algorithm, maximum latency permitted, overall system throughput, etc.).

For applications that do not have requirements as stringent as the examples described above but that cannot be solved with the use of a single commercially available processor (or a single layer of processors connected in parallel), the overall 3D-Flow system architecture—with bypass switches and its associated register, extending the processing time of a stage beyond the time interval between two consecutive data—can be applied to a different commercial processor, thus preserving the modularity, scalability, flexibility, and simplified construction of the 3D-Flow system.

An example of a migration from the 3D-Flow processor to a commercially available processor used in a 3D-Flow system architecture for a single-channel application for a robot control is described in Section 5.5.3.

3.4 The Novel Methodology and Apparatus of this Invention Compared to the Prior Art FIG. 4 compares the different implementations in extending the processing time in a pipeline stage. The novel implementation which is the subject of this invention is described in the right column, the prior art is described in the central column, while the problem to be solved is described in the left column. For a single channel, the current implementation could provide a solution, however inefficient and costly.

For multiple channel systems requiring data exchange between neighboring PEs (see FIG. 4F), the current approach does not offer a practicable solution capable of implementation because the two dimensions "x" and "y" have been used by neighboring connections and there is no more room to parallellize circuits as in the previous "single channel" case.

The consequences of the lack of the implementation of a solution using the prior art, is that the processing time in each pipeline stage was kept not to exceed the time interval between two consecutive input data. Current implementations on multi-channels which have to limit processing time to 25 ns, give up algorithm efficiency, and use non-programmable fast electronics)

FIG. 4A shows the problem that needs to be solved for a single channel. The processing time in a pipeline stage must be extended, because the operations in that particular stage are indivisible. Examples of tasks that are indivisible are: a) the processor is awaiting data from several neighbors which cannot be received within 25 ns; b) some "branch" instructions in the program take longer than 25 ns; or c) the algorithm is indivisible because the intermediate results generated would be too large to be transmitted from one stage to the next and because the algorithm is too complex to be executed in 25 ns.

In case the problem can be solved with twice the processing time, a solution currently implemented in some applications is to replicate the circuit as shown in FIG. 4B and to add a switch at the input of the two identical circuits and one at the output. While the switch is routing one datum to one circuit, the other circuit can process for a longer time. At the arrival of the next datum after 25 ns, the switch will route it to the second circuit, allowing it to spend 50 ns processing the first one, and so on. The switch at the output will collect the results from the two circuits alternatively every 25 ns.

If more processing time is required, another identical circuit is added to increase it to 75 ns, and the general switches connected at the input and output of the three identical circuits also need to be changed (see FIG. 4C). This scheme is costly and impractical from a construction standpoint, because when an identical circuit is added in parallel the entire system must be redesigned. The position of the switches at the system level prevents the system from being modular, or scalable.

Traces connecting the different circuits on a printed circuit board (PCB) change in length, and the difference between short and long traces increases as the traces need to reach more components. PCB traces with different length or that are too long may seriously affect the overall performance. Electrical conditions on the PCB change and make it more complex to handle long and short signal transmission at high speed.

These hardware problems do not exist in the 3D-Flow solution because of the intrinsic bypass switch in each 3D-Flow processor, as detailed in FIGS. 5, 4D and 4E. Cable length between crates remains the same, trace length on the backplane remains the same, and the change in the PCB is minor (see Section 5.4.3.1.6 for detailed implementation) when additional layers of 3D-Flow are added. 3D-Flow layers can be added in the future when more performance will be required. The system is "modular and scalable."

FIG. 4F defines the need to extend the processing time in a specific stage of the pipeline in a multiple-channel system requiring data exchange between neighboring PEs.

No current designs afford a solution in the case of the multiple-channel application. In fact, study and analysis of all the systems, including the one for the first-level trigger for High Energy Physics, show that the constraint of limiting the processing time of one stage to the time interval between two consecutive input data has been the accepted standard.

This seriously limits performance, considerably increases the cost of implementation, and makes the hardware difficult to debug, monitor, and repair due to the large number of different types of components and different types of boards.

For example a pipeline stage such as the one described in the Section 5.4.3.1 which is built with ten 3D-Flow layers executes a trigger algorithm for HEP experiments with a duration up to 250 ns. Compares to the current trigger systems (e.g. the report by J. Lackey, et al., "CMS Calorimeter Level 1 Regional Trigger Conceptual Design." cmS note 1998/074, Nov. 13, 1998. http://cmsdoc.cern.ch/documents/98/note98_074.pdf, and by The Atlas Technical Proposal CERN/LHCC/94-43, 15 Dec. 1994. HEP experiments at CERN, Geneva) designed to execute algorithms in one stage not to exceed 25 ns. The 3D-Flow implementation gives a 1000% performance increase. Twenty 3D-Flow layers will provide a 2000% performance increase.

The important contribution of the 3D-Flow architecture, besides solving a problem that could not be solved before, is that of making it possible to build new simpler hardware that is less expensive, that is programmable, and that will allow a much greater increase in performance beyond that promised by known advances in technology.

The architecture of the stack of 3D-Flow processors replacing the center pipeline stage of the system should be seen as a unit where data are cyclically distributed to the idle processor and each processor is allowed to execute an algorithm (or a task) in its entirety. In this case, though, the speed is much improved, and what was considered impossible before has been made possible by using the 3D-Flow architecture and its intrinsic bypass switch.

A key element of the hardware construction is the node of communication that is in the backplane of the crate. This is crucial in understanding how the 3D-Flow construction simplifies hardware and cost, see detailed description in Section 5.6. A comparison of the backplane with existing systems (e.g., the trigger for cmS experiment at CERN, Geneva) shows how the new architecture realizes cost savings by reducing the number of board types from six to one, reducing the number of component types to a single type of ASIC (Application Specific Integrated Circuit), and specifying a set of circuits downloadable in a single type of FPGA (Field Programmable Gate Array). Details of the hardware implementation are given in the articles: Crosetto, D., "LHCb baseline level-0 trigger 3D-Flow implementation." Nuclear Instrument & Methods, NIM A, volume 436, issue 3, pp. 341-385, 2 Nov. 1999, and Crosetto, D., "Detailed design of the digital electronics interfacing detec., . . . " LHCb 99-006, 30 Mar. 1999. http://lhcb.cern.ch/trigger/level0/3dflow/febr_17_99/lhcb_99_006.pdf

4. BRIEF DESCRIPTION OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

FIG. 1. Pipelining implementation technique in current CPUs, HEP trigger electronics, or fast real-time electronics.

FIG. 2. One pipeline stage needs to have the processing time extended. The electronics of Stage 3 (St_3) consists of several layers of 3D-Flow processors called a "stack." Each 3D-Flow processor executes the entire real-time algorithm. Programmability has been achieved, and ultra-fast cable logic implementation is not necessary. An intrinsic bypass switch in each 3D-Flow of the stack performs the function of routing the incoming data to the first idle processor. The 30 is the representation of either implementations 40 or 50. The implementation 50 with external "bypass switches+register" is used when the throughput of the system is not very high and it can be solved by cascading commercial circuits or processors. The implementation 40 with the use of a stack of 3D-Flow processors is necessary when the high throughput is required and no commercially available processor could solve the problem.

FIG. 3. Stage of a pipeline system which receives input data from sensors and from neighbors every 25 ns. To avoid the indicated bottleneck because of the inability a) to obtain a reasonable amount of reduced data after 25 ns, or b) because the algorithm cannot be broken in pipeline stages and the intermediate results are too numerous to be passed to the next stage, then the 3D-Flow system (see FIG. 6) distributes the sensors input data to different layers in a cyclic manner, thus leaving a processing time proportional to the number of layers.

FIG. 4. The novel methodology and apparatus of this invention compared to the prior art.

FIG. 5. The flow of the input data and output results in a 3D-Flow system. The example shows a 3D-Flow system executing an algorithm that requires three times the time interval between two consecutive input data where the input data rate is 1/8 the processor clock frequency. The left column of the table at the left shows how processors at each layer count the input data, bypass data, results, and bypass results in order to set the bypass switches appropriately at the processors at each layer. An example of the position of the bypass switches for clocks #34 and #35 is shown in the other columns of the table.

FIG. 6. The 3D-Flow Processing Element (PE) or "logical unit"

FIG. 7. One layer (or stage) of 3D-Flow parallel processing.

FIG. 8. General scheme of the 3D-Flow pipeline parallel-processing architecture.

FIG. 9. Data flow from 16 processors in one layer to 4 in the next layer.

FIG. 10. Performance of a 9U 3D-Flow Crate as described in 5.4.3.1.9

FIG. 11. System design and verification process

FIG. 12. Technology independent 3D-Flow ASIC

FIG. 13. General scheme of the interface between detectors, triggers, and DAQ electronics.

FIG. 14. Configurable Front-End (FE) interfacing module for several applications FIG. 15. (Top of figure) Physical layout of the detector elements sending signals to one FPGA front-end chip (Bottom of figure). Schematic of the front-end electronics of 4 Trigger Towers mapped to one FPGA.

FIG. 16. Front-end signal synchronization, pipelining, derandomizing, and trigger word formatting.

FIG. 17. VHDL code and circuit schematic representation of registering input data.

FIG. 18. VHDL code and circuit schematic representation of the updating of the variable delay FIG. 19. VHDL code and circuit schematic representation for the selection of the variable delays.

FIG. 20. VHDL code and circuit schematic representation of the 128 pipeline buffer.

FIG. 21. VHDL code and circuit schematic representation for moving accepted data from the pipeline to the FIFO.

FIG. 22. VHDL code and circuit schematic representation for formatting and multiplexing the trigger word.

FIG. 23. Logical layout of the functions, partitioned in components, which interface FE, Trigger, and DAQ.

FIG. 24. 64-channels mixed-signal processing board 9U (front view).

FIG. 25. 64-channels mixed-signal processing board 9U (rear view).

FIG. 26. 64-channels digital processing board 9U (front view).

FIG. 27. 64-channels digital processing board 9U (rear view).

FIG. 28. 3D-Flow layer interconnections on the PCB board.

FIG. 29. Bottom to Top links on the PCB board.

FIG. 30. Bottom to Top Links on the PCB (details).

FIG. 31. 3D-Flow System LVDS Neighboring Connection Links Scheme.

FIG. 32. 3D-Flow North, East, West, and South LVDS Links.

FIG. 33. Crate-To-Crate Backplane LVDS Links (Option 1).

FIG. 34. Crate-To-Crate Backplane LVDS Links (Option 2)

FIG. 35. The 3D-Flow Crate for 9U boards.

FIG. 36. 32 channels mixed-signal processing VME board 6U (front view)

FIG. 37. 32 channels mixed-signal processing VME board 6U (rear view)

FIG. 38. 32 channels mixed-signal processing board IBM PC compatible

FIG. 39. Interrelation between entities in the Real-Time Design Process

FIG. 40. ASIC verification design process. The user's real-time algorithm is simulated on the SYSTEM TEST-BENCH. Expected results (top right) are checked versus different input data set (top left). Bit-vectors for one or more PEs (for any PE in the system) are saved to a file (center bottom). Test-bench parameters for any PE(s) are generated by the system test-bench for software (center right) and hardware (center-left) simulator. All bit-vectors are compared for design validation.

FIG. 41. Design Real-Time software tools (Designed for Windows '95, '98, and NT).

FIG. 42. Scheme of the control signal distribution with minimum skew.

FIG. 43. Demonstrator of a System Monitor for 129 3D-Flow channels.

FIG. 44. Overview of the use of the 3D-Flow system in particle identification in HEP FIG. 45. LHCb level-0 trigger—physical layout.

FIG. 46. LHCb level-0 trigger—logical layout.

FIG. 47. On-detector electronics for level-0 trigger.

FIG. 48. Off-detector electronics for level-0 trigger.

FIG. 49. Electronics in the control room for the calorimeter level-0 trigger monitoring.

FIG. 50. LHCb programmable global level-0 trigger decision unit.

FIG. 51. LHCb calorimeter Level-0 trigger layout.

FIG. 52. 60 fold improvements of PET/SPECT sensitivity.

FIG. 53. Layout of the PET/SPECT real-time data acquisition and processing system.

FIG. 54. Mapping of the detector channels to the 3D-Flow boards and the search for coincidences in different layers of the pyramid.

FIG. 55. Backplane of the cmS first-level trigger system.

FIG. 56. Backplane of the 3D-Flow first-level trigger system.

Other features of the present invention will be apparent from the accompanying drawings and from the following detailed description.

5. DETAILED DESCRIPTION OF THE INVENTION

5.1 The Concept

The method and apparatus of this invention is an hardware implementation independent from the platform used (e.g. large 9U boards described in Section 5.4.3.1, medium 6U boards described in Section 5.4.3.2, or small IBM PC compatible boards described in Section 5.3.3.3) of applications similar to the one for HEP (see Section 5.5.1), robot control (see Section 5.5.3), or PET/SPECT/CT (see Section 5.5.2) where the processing time in one pipelined stage is required to be longer than the time interval between two consecutive input set of data. An example is that the PET/SPECT/CT device is profiting from the method of this invention in implementing the hardware in providing to the physician and patient an instrument capable of medical imaging with the improved features compared to the current devices of: a) increased sensitivity requiring 60 times less amount of radiation dose to the patient; b) reducing the time duration of an exam up to 60 times (the physician will have the option to select the previous advantage of radiation dose reduction, or the examination time duration reduction, or a combination of the two), and c) to be able to monitor biological events that were not seen before.

5.1.1 The Intrinsic Bypass Switch in Each 3D-Flow Processor

Input data and output results flow from the "Top layer" to the "Bottom layer" of a stack of the 3D-Flow system as shown in FIG. 5.

The system is synchronous. The first layer has only input data at the top port which are received from the "sensors," while the bottom layer has only results at the output port.

In the example of a 3D-Flow system shown in FIG. 5, every eight clock cycles a new set of data (identified in FIG. 5 as i1, i1; i2, i2, i3, i3, etc.) is received by Layer 1 of the 3D-Flow processor stack.

In the same example, each processor requires 24 cycles to execute the indivisible algorithm.

The column of the table of FIG. 5 labeled "switch status #34, #35" shows the position of the switches of the processors in Layer 1, Layer 2, and Layer 3 respectively. The processors in Layer 2 have the internal switches in the open position allowing input/output to the processor. This is called position 'i'. The internal switches in Layer 1 and 3 processors are in the closed position, blocking entry to the processor and moving data from the top port of the processor to the bottom port through the bypass switch and its associated register without processing them. This position of the switches is called position 'b'.

In the example, the first set of data (i1, i1) is fetched from the processors in the first layer via the internal switches set in position 'i'. Upon entry of the data into the processor, the internal switches are set in position 'b'. The second set of data received at Layer 1 at the clock cycle 9 and 10 are moved via the internal switches in position 'b' to the processors at Layer 2 which are in position 'i' and free to start the execution of the algorithm. The data received at cycle 17 and 18 are moved to Layer 3 via the internal switches in position 'b' of Layer 1 and Layer 2, these layers being occupied in processing the previous data. When the internal switches of the processors at Layer 1 are set in position 'i' at the clock cycles 25 and 26 as the new set of data are fetched by the processors at this layer, the results of the processing on the previous set of data on the same layer are sent to Layer 2 to be moved to layer 3, which is the last layer of the 3D-Flow system.

At each clock cycle the data not processed by the processor, but only moved from the top port to the bottom port through the bypass switches are also buffered into a register as shown in FIG. 5. Thus for each clock cycle a datum advances into the "flow" from the first layer of processors to the last layer, one layer at a time.

The hardware implementation of this technique is done as follows:

a) the connection between the bottom port of one layer of processors (or circuit) to the top port of the adjacent layer can be done with PCB traces (or metal traces inside a chip, or wires within boards in a crate) of short and equal length, b) the above connection will provide a short propagation delay, allowing to reach high system throughput c) total number of cascaded circuits will not affect the system throughput, but only the latency of the results from the input data.

The table to the left of FIG. 5 shows how the processors at each layer count the input data, results, bypass data, and bypass results.

5.1.2 Needs of Extending Processing Time in a Pipeline Stage

In many applications it is desired to extend the processing time in a pipeline stage. For example, in a high-speed data acquisition and processing system such as the ones at the Large Hadron Collider (LHC) experiments at CERN, where 16- to 32-bit data per channel are received every 25 ns, a pipeline stage would not only need the time required to fetch the 32-bit input data, and to exchange the information with its neighbors (see FIG. 3), but would also need the time required to reduce the data received from neighbors (2×2, or 4×4) in order to be able to send through the exit port every 25 ns a reasonable amount of reduced data through a reasonable number of lines.

The time required to reduce the data received from the neighbors depends on the level-0 trigger algorithm. Typical operations performed are: adding values to find characteristics of possible clusters, finding local maxima, comparing with thresholds, calculating front-to-back ECAL-HCAL, etc. (ECAL is a subdetector which has the characteristic of detecting electrons, HCAL is a subdetector which has the characteristic of detecting hadron). The operations of pattern-recognition and data moving that can be performed in 25 ns are very limited even with the foreseeable advances in technology.

The main difference between the way all other HEP groups (such as LAL-Orsay-France, Bologna-Italy, cmS-CERN-Geneva, Atlas-CERN-Geneva, etc.) approach the problem and the way that the 3D-Flow architecture does, is that:

1. the former application approaches the implementation by splitting the algorithm into pipeline stages, each not to exceed 25 ns (or the speed selected for a specific application); while 2. the 3D-Flow architecture (see section 5.1.3) solves the problem by replacing one pipeline stage with a stack of 3D-Flow processors made of several processor layers (currently, in the detailed design of Section 5.4.3.1, with 1 to 10 layers) which extend the processing time for that specific stage from 25 ns up to 250 ns. (Simple algorithms use fewer layers as shown in Sections 5.4.3.2 and 5.4.3.3).

A design that needs to constrain each pipeline stage to 25 ns (as per the HEP groups), needs to impose limitations by:

1. partitioning the problem. (The option of building a system that handles only ECAL, another that handles HCAL, is not cost effective since more electronics has to be built. The problem is just deferred to a later stage with the need to build other electronics to correlate all partial results from the ECAL, HCAL, Pad chamber, etc., subsystems, with the disadvantage of not having the possibility of using raw data from all subdetectors within a specific area in an integrated manner for better particle identification.);

2. keeping the trigger algorithm very simple. (This may not provide the best efficiency);

3. limiting the field of analysis to a small area (at the limit to a 2×2), with the intent to limit the number of hardware connections (Limits the efficiency);

4. designing fast electronics ("hardwired, or GaAs adder ASICs which are not programmable but are expensive because development are costly, takes a long time and they will be outdated when they need to be used).

Trigger architectures such as the ones adopted and described in C. Beigbeder, et al., An Update of the 2×2 Implementation for the Level 0 Calorimeter Triggger. LHCb 99-007, 29 Apr. 1999. http://lhcb.cern.ch/notes/postscript/99notes/99-007.ps, from LAL-Orsay-France and J. Lackey, et al., "CMS Calorimeter Level 1 Regional Trigger Conceptual Design." cmS note 1998/074, Nov. 13, 1998. http://cms-doc.cern.ch/documents/98/note98_074.pdf, from cmS-CERN, Geneva (as well as the other groups such as Bologna, Atlas, etc.) have used in their solution 1) and 2), while LAL opted also for 3), cmS makes the analysis on a larger area and had developed a 200 MHz GaAs 8-inputs 12-bit adder. Regardless, GaAs is not cost effective for common logical functions (it is more suitable for fast analog circuits, radiation-harded components, or for digital circuits @ GHz). Applications such as the one of cmS would have found a higher-performance and lower-cost solution using the 3D-Flow architecture which provides the possibility to execute algorithms requiring up to 250 ns and does not require special technologies such as GaAs.

If the constraint of 25 ns is eliminated, the user will not need to partition the problem in a section for ECAl, another for HCAL, etc., but will be able to use the raw data of a specific area from several subdetectors in an integrated manner for better particle identification.

5.1.3 The 3D-Flow Architecture

The 3D-Flow architecture is designed for applications where it is required to extend the processing time processing in one pipelined stage beyond the time interval between two consecutive input set of data. The architecture is based on a single type of replicated circuit cascaded through "bypass switches+register."

The circuit can be a commercially available component, which requires external implementation of the "bypass switches+register", or, when system performance of high throughput is required, the circuit can be a 3D-Flow processor (see Section 5.1.3.2), which has an internal architecture with powerful I/O and instructions performing efficient data movement and has the "bypass switches+register" implemented internally.

What follows is a description of the 3D-Flow architecture based on the 3D-Flow processor, the use of the described "bypass switches+register" interfaced to a commercially available processor will implement the same 3D-Flow architecture. However, it will have less performance since more instructions will be needed relative to the architecture based on the 3D-Flow processor in order to move data across the system.

Objective:

Oriented toward data acquisition, data movement, pattern recognition, data coding and reduction.

Design Considerations:

Quick and flexible acquisition and exchange of data, bi-directional with North, East, West, and South neighbors, unidirectional from Top to Bottom.

Small on-chip area for program memory in favor of multiple processors per chip and multiple execution units per processor, data-driven components (FIFOs, buffers), and internal data memory. (Most algorithms that this system aims to solve are short and highly repetitive, thus requiring little program memory.)

Balance of data processing and data movement with very few external components.

Programmability and flexibility provided by download of different algorithms into a program RAM memory through a standard serial I/O RS232.

Strong emphasis on modularity and scalability, permitting solutions for many different types and sizes of applications using regular connections and repeated components.

Easy to develop (since the entire system is based on a single type of replicated circuit) software development tools, debug and monitoring functions on the target system.

5.1.3.1 System Architecture

The goal of this parallel-processing architecture is to acquire multiple data in parallel (up to the maximum clock speed allowed by the latest technology) and to process them rapidly, accomplishing digital filtering on the input data, pattern recognition, data moving, and data formatting.

The compactness of the 3D-Flow parallel-processing system in concert with the processor architecture (its I/O structure in particular) allows processor interconnections to be mapped into the geometry of sensors (such as detectors in HEP or PET/SPECT in medical imaging) without large interconnection signal delay, enabling real-time pattern recognition. This work originated by understanding the requirements of the first levels of triggers for different experiments, past, present and future. A detailed study of each led to the definition of system, processor, and assembly architecture suitable to address their recognized common features. To maintain scalability and simplify the connectivity, a three-dimensional model was chosen, with one dimension essentially reserved for the unidirectional time axis and the other two as bi-directional spatial axes (FIG. 6).

The system architecture consists of several processors arranged in two-orthogonal axes (called layers; see FIG. 7), assembled one adjacent to another to make a system (called a stack; see FIG. 8). The first layer is connected to the input sensors, while the last layer provides the results processed by all layers in the stack.

Data and results flow through the stack from the sensors to the last layer. This model implies that applications are mapped onto conceptual two-dimensional grids normal to the time axis. The extensions of these grids depend upon the amount of flow and processing at each point in the acquisition and reduction procedure as well as on the dimensionality of the set of sensors mapped into the processor layers.

Four counters at each processor arbitrate the position of the bypass/in-out switches (Top to Bottom ports. See FIG. 5) responsible for the proper routing of data. Higher-dimensional models were considered too costly and complex for practical scalable systems, mainly due to interconnection difficulties.

5.1.3.2 Processor Architecture

The 3D-Flow processor is a programmable, data stream pipelined device that allows fast data movements in six directions with digital signal-processing capability. Its cell input/output is shown in FIG. 6.

The 3D-Flow can operate on a data-driven, or synchronous mode. In data-driven mode, program execution is controlled by the presence of the data at five ports (North, East, West, South, and Top) according to the instructions being executed. A clock synchronises the operation of the cells. With the same hardware one can build low-cost, programmable first levels of triggers for a small and low-event-rate detector, or high-performance, programmable higher levels of triggers for a large detector. The multi-layer architecture and automatic by-pass feature from Top to Bottom ports, allow to sustain event input at the processor clock rate, even if the actual algorithm execution requires many clock cycles, as described below.

The 3D-Flow processor is essentially a Very Long Instruction Word (VLIW) processor. Its 128-bits-wide instruction word allows concurrent operation of the processor's internal units: Arithmetic Logic Units (ALUs), Look Up Table memories, I/O busses, Multiply Accumulate and Divide unit (MAC/DIV), comparator units, a register file, an interface to the Universal Asynchronous Receiver and Transmitter (UART)/RS232 serial port used to preload programs and to debug and monitor during execution, and a program storage memory.

The high-performance I/O capability is built around four bi-directional ports (North, East, South and West) and two mono-directional ports (Top and Bottom). All of the ports can be accessed simultaneously within the same clock cycle. N, E, W, and S ports are used to exchange data between processors associated with neighboring detector elements within the same layer. The Top port receives input data and the Bottom port transmits results of calculations to successive layers.

A built-in pipelining capability (which extends the pipeline capability of the system) is realized using a "bypass switch." In bypass mode, a processor will ignore data at its Top port and automatically transmit it to the Top port of the processor in the next layer. Many 3D-Flow processing elements, shown in FIG. 6, can be assembled to build a parallel processing system, as shown in FIG. 7. The "bypass switch" is controlled in a synchronous manner by a programmable counter located on each CPU and presetable by RS-232. This feature thus provides an automatic procedure to route the incoming data to the layer with idle processors, which are ready to process it.

5.1.3.3 introducing the Third Dimension in the System

In applications where the processor algorithm execution time is greater than the time interval between two data inputs, one layer of 3D-Flow processor is not sufficient.

The problem can be solved by introducing the third dimension in the 3D-Flow parallel-processing system, as shown in FIG. 8.

In the pipelined 3D-Flow parallel-processing architecture, each processor executes an algorithm on a set of data from beginning to end (e.g., the event in HEP experiments, or the picture in graphics applications).

Data distribution of the information sent by the external data sources as well as the flow of results to the output are controlled by a sequence of instructions residing in the program memory of each processor.

Each 3D-Flow processor in the parallel-processing system can analyze its own set of data (a portion of an event or a portion of a picture), or it can forward its input to the next layer of processors without disturbing the internal execution of the algorithm on its set of data (and on its neighboring processors at North, East, West, and South that are analyzing a different portion of the same event or picture. The portion of event or picture is called "Frame A1, Frame A2, etc.," in FIG. 8.).

The manner each 3D-Flow processor has been programmed, determines how processor resources (data moving and computing) are divided between the two tasks or how they are executed concurrently.

A schematic view of the system is presented in FIG. 8, where the input data from the external sensing device are connected to the first layer of the 3D-Flow processor array.

The main functions that can be accomplished by the 3D-Flow parallel-processing system are:

Operation of digital filtering on the incoming data related to a single channel;

Operation of pattern recognition to identify events of interest; and

Operations of data tagging, counting, adding, and moving data between processor cells to gather information from an area of processors into a single cell, thereby reducing the number of output lines to the next electronic stage.

In calorimeter trigger applications, the 3D-Flow parallel-processing system can identify patterns of energy deposition characteristic of different particle types, as defined by more or less complex algorithms, so reducing the input data rate to only a subset of candidates.

In real-time tracking applications, the system can perform pattern recognition, calculate track slopes, and intercepts as well as total and transverse momenta (see LHCb Technical proposal CERN/LHCC 98-4, or Atlas Technical proposal CERN/LHCC/94-43).

5.1.4 The Hardware Solution to Break Current Speed Barriers in High-Speed Programmable Systems The key element of the 3D-Flow architecture is the Top-to-Bottom "bypass switches", which remove the constraint of executing within the time interval of two consecutive input data sets, operations of 1. fetching input data;
2. exchanging with neighbors; and
3. performing eventual pattern recognition and data reduction in order to obtain a reasonable amount of reduced data that can be sent through a reasonable number of output lines.

The above feature can be implemented as an external circuit in an array of commercially available processors when the throughput requirements are not high, or it is implemented internally to the 3D-Flow processor when real-time systems with high throughput performance are required. However, in both cases, the added value to the architecture is the manner to implement either system in hardware as it is described in this invention, which provides the additional features of modularity, scalability, it simplify construction and it reduces cost. These additional features are provided by the ability:

1. to constrain the entire system to a single type of replicated circuit;
2. to constrain to a minimal number of different boards;
3. to constrain all the physical connections of the "bottom" to "top" ports within a "stack" to a very short distance (e.g., micron on a chip, or less than 6 cm on a PCB board), and
4. to constrain to an architecture and its hardware implementation that simplifies software development and hardware assembly, and which meets the requirements of several fast real-time applications, All the above features (conceptual architecture and its hardware implementation) provide a system architecture which breaks the current speed barriers in programmable systems.

This novel architecture/implementation feature allows for implementation of a programmable acquisition and processing system acquiring data from multi-sensors at speeds related to the processor speed in the following manner. For example, with a processor speed @ 100 MHz, the system can acquire from each channel a) 4-bit data @ 400 MHz, b) 8-bit @ 200 MHz, 16-bit @ 100 MHz, or 32-bit @50 MHz. The input data rate and the complexity of the real-time algorithm can change and will affect only the latency of the results.

Since the processor input Top port is 8-lines multiplexed to an internal 16-bit wide bus, the 4-bit @ 400 MHz inputs from the sensors will require an external 1:2 multiplexer.

5.1.5 Component of the Technology Platform

The overall architecture is based on a single circuit, a commercial processor interfaced to a "bypass switch+register", or the 3D-Flow Processing Element (PE), consisting of fewer than 100K gates. The 3D-Flow processor is technology independent and is replicated several times in a chip, on a board, and on a crate.

Several topologies can be built, the most common being a) a system with the same number of PEs per each layer which perform the function of pattern recognition which is called "stack," and b) a system with a decreasing number of PEs in different layers for data funneling called "pyramid." (see U.S. Pat. No. 5,937,202, 10/1999, Crosetto and this patent application for a new implementation of the routing of data through the pyramid which require only the exchange of the data between three processors at each layer during the phase of channel reduction instead of the need to exchange of data among five processors).

5.1.6 Technology-Independent 3D-Flow Asic

The goal of this parallel-processing architecture is to acquire multiple data in parallel and to process them rapidly, accomplishing digital filtering, pattern recognition, data exchange with neighbors, and data formatting.

Because the 3D-Flow approach is based on a single type of circuit, it is natural to keep this modularity with a single type of replicated component that does not require glue logic for its interconnection. For this reason, as well as the fact that integrated circuit (IC) design advances are very rapid, it is best to retain it in intellectual property (IP) form written in generic VHDL reusable code so that it can be implemented at any time using any technology. VHDL is an acronym which stands for VHSIC Hardware Description Language. VHSIC is yet another acronym which stands for Very High Speed Integrated Circuits. In this way, it can be implemented at the last moment using the latest technology that will provide the best characteristics (low power dissipation, lower cost, smaller size, higher speed). See Section 5.4.1 for more information in regard to the 3D-Flow ASIC.

SOCs (System On a Chip), utilizing IPs (Intellectual Property) Virtual Components (VC), are redefining the world of electronics, as exemplified at DAC '98 conference.

5.1.7 The 3D-Flow Pyramid with Channel Reduction 4:1 in Three Steps

FIG. 9 shows the channel reduction implemented using a 3D-Flow ASIC with 16 processors as described in Section 5.4.1.3 and shown in FIG. 12.

Each letter of FIG. 9 indicates a presence of a 3D-Flow processor. Data in this case flow from 16 processors of one layer of the pyramid to four processors of the next layer of the pyramid.

All the programs from the second layer of the pyramid until the last layer are different from the ones in the first layer (however they are the same in group of 16 from the second layer to the last layer) because they do not have to insert the time stamp and ID information to the data coming from the top port. They simply have to route valid data to the processor to which it is connected in the next layer.

The overall two-layers pyramid shown in FIG. 9 accomplish a 4:1 reduction or funneling of data from sixteen inputs to four outputs. Of course, other configurations of processors in the base layer can be utilized to accomplish many other ratios of digital inputs funneled to a fewer number of digital outputs. In order to identify the data flow in the processor pyramid as described herein, each processor in the base layer is labeled with an uppercase letter or a number, and the processors of the subsequent layers are labeled with a lower case letter. As noted above, each processor of the base layer include an active top input port for receiving data from a preceding "stack" layer of processors.

In FIG. 9 data from processors P, K, L, and Q in layer n is sent to processor k in layer n+1. Similarly, data from processors M, N, S, and R goes to l; from W, 2, Z, and V to q; and from Y, X, T, and U to p. With regard to processor K located in the upper left corner of the base layer in FIG. 9, data is routed to the east port and received via a west port of processor L. Processor L, in turn, passes data received from both the top input port and its west input port to the south output port, which data is received by way of the north input port of processor Q. In processor Q, data is received on the east input port, on the north input port and the top input port, and transferred via its bottom port to the top input port of processor k in the next layer n+1. As can be seen, the data from the four respective top input ports of processors P, K, L, and Q are funneled to a single data stream from the bottom output port of processor Q at the base layer to the top input port of processor k of the subsequent layer. In like manner the four top input ports of processors of the other three group of processors in the base layer are funneled to the other three processors l, q, and p in the subsequent pyramid layer.

As such, 16 high-speed data inputs of the base layer have been funneled to four processors in the next layer in three steps. During the operation of moving data, each processor can save the data in a temporary register or memory buffer and compare or perform other arithmetic and/or logical operation with other data fetched during the same cycle or during different cycle from the different input ports (or from the same input port if they are fetched during different cycles).

5.2 The Need 5.2.1 The Need for Programmability in Fast Real-Time Data Acquisition and Processing The need of programmability in fast real-time data acquisition and processing systems has been stated in several articles.

In commercial applications (see FIG. 10B), the demand for real-time digital video, image processing and networking is increasing. The 2.5 Gbps optical networking products available today (and 10 Gbps available for long distances) require high-performance processing systems capable of handling Gbyte/s up to several Tbyte/s of information from multiple channels. The system should be scalable in size and also in performance as the technology level advances.

FIG. 10b shows a system that could be accommodated in a 3D-Flow crate as described in Section 5.4.3.1.7 (more 3D-Flow crates can be cascaded to increase performance) that sustain a continuous input data rate of 81 Gbyte/sec, performs image processing (e.g. edge detection) adding a latency of only 50-250 ns (depending on the complexity of the real-time algorithm) and sends out the data of the image at the same rate.

In High Energy Physics applications (see FIG. 10a showing the performance of only one crate of a system) we typically have a high input data rate (of the order of 800 Gbyte/s to a few Tbyte/s) with the need to detect some specific patterns (photons/electrons, single hadrons, muons, and jets, as well as global sums of energy and missing energy). In addition, there are combinations of objects such as lepton pairs and jets with leptons or missing energy. Valid patterns which satisfy the pattern-recognition algorithm criteria occur only at a rate of the order of 100 KHz to 1 MHz. (Data shown are relative to one crate with optical fibers at 2.4 Gbps; however, a system of several crates can be built. The input rate is calculated as follows: the crate has 16 boards, each board has 64 channel, each channel can fetch data from the first 3D-Flow processor @ 160 Mbyte/s, thus 16×64×160=163.8 Gbyte/s. See details of the board and crate in Section 5.4.3.1).

The social benefit is that by having discovered and validated this approach, many other segments of society will directly benefit. For example, information that travels in multiple fibers at a total rate of hundreds of Gbyte/s or even at Tbyte/s that needs correlation between signals on different fibers, such as images transmitted over multiple fibers, could be processed and modified with a delay of only 50-250 ns, as shown in FIG. 10b. Medical imaging such as PET/SPECT could provide better imaging at higher resolution requiring a lower radiation dose to the patient at lower cost due to the higher processing capability that shortens the time of the exam, enabling more patients to be examined in one day. Benefits in performance and cost of the described system compared to current alternative solutions built with hard-wired circuits are described in Section 10.

The present invention has been described in detail in Section 5.5.2 as applied to Positron Emission Tomograph (PET) units as an example of advantageous use.

5.3 Methodology

A methodology has been developed and software tools have been created which allow partitioning a problem into modular, scalable units and mapped them to the most suitable hardware platform.

The significance of the advantages of this architecture and its associated hardware implementation is the level of integration of the software tools which allow to design and verify the requirements of an application from system level to gate level. The tools gives designers faster feedback on the effectiveness of their parameter changes, and allow them optimize the system throughput in less development time, while using the latest technology and permitting a simplified hardware implementation at a lower cost.

5.3.1 From Concept to Hardware Design

Having verified the validity of the concept, the next step is the translation into a technology-independent hardware design. This phase of the preliminary design analysis for a specific application is summarized in the second row of FIG. 11.

As an example, the methodology has been applied to the application of the trigger for HEP. The entire first-level trigger system has been partitioned according to the pipelined scheme of FIG. 1 (see bottom of figure, trigger electronics); however, even if the sequence of the pipelined tasks is the same as that in FIG. 1, in this design the timing is not limited to 25 ns per stage. Rather, at each stage the timing has been increased as needed, allowing the implementation of indivisible stages of the trigger algorithm with an execution time longer than 25 ns.

A first analysis of the requirements of the different sections of the first-level trigger and a survey of the commercially available components and technology allow the following pipeline to be proposed (Please note that the timing reported does not include delays due to cables, optical fibers, line drivers, and line receivers):

1. "Stage 1": the analog-to-digital conversion of the signals from the sensors can be accomplished in a single stage of 25 ns using standard off-the-shelf components;
2. "Stage 2": the front-end electronic circuits (input signal synchronization, trigger word formatting, pipeline buffer, and derandomizer) can be implemented in a single stage of 25 ns in a cost-effective/flexible manner using FPGAs/CPLDs;

3. "Stage 3": the fully programmable first-level trigger algorithm with the 3D-Flow system allows implementation of the concept of extending the processing time at this stage to a time longer than the time interval between two consecutive input data. This will provide better performance, more flexibility and lower cost because of its simpler design realization. A ten-layer 3D-Flow system, which will execute the trigger algorithm in 250 ns, was considered sufficient to allow present and future algorithms to be implemented with flexibility. The design should be technology-independent so as to permit realization at any time using the most cost-effective technology.
4. "Stage 4": data reduction and channel reduction are also accomplished in a programmable form by the same 3D-Flow processor in the pyramidal topology configuration (see Section 5.1.7). At this stage the input data set (also called "event") that has passed the trigger algorithm criteria is reduced from the original 40 MHz to 1 MHz or 100 KHz (depending upon the occupancy on detectors in different experiments). This stage can be implemented as a multiple pipeline stage system (that we may call "internal stages"), each not to exceed 25 ns. In general, there is no processing involved and thus no need to extend the processing time on any "internal stage" (although the 3D-Flow system would allow extending the processing time at these "internal stages" if required). However, data must be moved only from many input channels to fewer output channels. The time required by this stage depends on the size of the system, on the size of the output word, and on the type of results required; and it may vary from a few hundreds of ns to the order of a microsecond.
5. "Stage 5": the "global level-one decision unit" (see Section 5.5.1.9) can be implemented in programmable form with a 3D-Flow pyramid system followed by FPGAs with combinatorial logic (or lookup table) functions. This stage can also be implemented as a multiple pipeline stage system, each not to exceed 25 ns. The time required by this stage is of the order of 100 ns.

5.4 The Hardware

5.4.1 A Single Type of Component for Several Algorithms

The overall hardware can be constrained to a single type of commercially available component (processor), or in applications requiring high throughput, the 3D-Flow processor with powerful I/O capabilities should be used. Following is the description of the implementation based on the 3D-Flow processor.

5.4.1.1 The 3D-Flow: A Single Type of Circuit for Several Algorithms

The system is based on a single type of replicated circuit called 3D-Flow processing element (PE) consisting of about 100K gates. Several PEs can be put into a single component. The 3D-Flow PE circuit is technology-independent.

5.4.1.2 The Evolution of IC Design

All current indications and projections confirm that the evolution will continue to increase rapidly in the years to come. Furthermore, the traditional way of designing systems will change: the current productivity of about 100 gates per day (EE Times, Oct. '98) will need to improve substantially, in order to resist competition. Many statements in this regard have been reported by specialized magazines. Using today's methodology, a 12-million-gate ASIC would require 500 person-years to develop, at a cost in excess of $75M. Companies will not be able to afford this cost, unless one develops IP blocks in order to build System On a Chip. Analog design retains its investment for several years, while digital design becomes outdated in about one year.

The 3D-Flow System digital design based on a single replicated circuit:
  allows for implementation of the users' conceptual algorithm, at the gate circuit level, into the fastest High-Speed, Real-Time programmable system.
  retains its value because of its powerful 'Design Real-Time' tools that allow the user to quickly design, verify and implement a system on a chip (SOC) based on a single replicated circuit (the 3D-Flow processing element [PE] in IP form [C++, VHDL, and netlist]), that can be targeted to the latest technology at any time.

5.4.1.3 Technology Independent 3D-Flow ASIC

The basic 3D-Flow component shown in FIG. 12 has been implemented in a technology-independent form and synthesized in 0.5 micron, 0.35 micron technology, and in FPGA's Xilinx, Altera and ORCA (Lucent Technologies). The most cost-effective solution is to build the 3D-Flow in 0.18 µm cmOS technology @ 1.8 Volts, accommodating 16 3D-Flow processors with a die size of approximately 25 mm2, and a power dissipation [gate/MHz] of 23 nW. Each 3D-Flow processor has approximately 100K gates, giving a total of approximately 1.7 million gates per chip which can be accommodated into the cavity of a 676-pin EBGA package, 2.7 cm×2.7 cm. As the technological performance increases, so can the multiplexing of the I/O increase. For example, the (8+2): 1 of the LVDS serial links can increase to 16:1 or (16+2): 1 when the LVDS serial link speed reaches 1.2 Gbps or higher. (Please see the Web site of LSI-Logic as an example of technology currently available: http://lsilogic.com/products/PRchart.html and ./unit5_2.html).

5.4.2 The Interface Between the Sensors and the 3D-Flow System

The following is the detailed design of the interface circuit between signals received from plural sensors and the 3D-Flow system based on the 3D-Flow processor. Although the name of the signals refer to an application in HEP, the interface is design for general use and the signals from the sensors that are sent to one 3D-Flow processor can be mixed in a different way by changing the pin to signal assignment in the VHDL code. The VHDL code is an additional representation of a circuit which is directly interpreted by software tools and converted into silicon circuit through synthesis programs. This document provides both representation of the interface circuit in VHDL form and in schematic form.

The complete design of the front-end electronics interfacing LHCb (Large Hadron Collider Beauty Experiment at CERN, Geneva, Switzerland) detectors, Level-0 trigger and higher levels of trigger with flexible configuration parameters has been made for a) ASIC implementation, and b) FPGA/CPLD implementation.

Being able to constrain the entire design to a few types of replicated components: a) the fully programmable 3D-Flow system, and b) the configurable front-end circuit, provides even further advantages because only one or two types of components will need to migrate to the newer technologies. The effort required to migrate a system made of several different components to a higher-performance technology will, in that case, be almost equivalent to completely redesigning the architecture from scratch. The proposed approach with the current configurable front-end module and the scalable 3D-Flow fully programmable system, aims to provide a technology-independent design which lends itself to any technology at any time. In this case, technology independence is based mainly on generic-HDL (hardware description language) reusable code which allows a very rapid realization of the state-of-the-art circuits in terms of gate density, power dissipation, and clock frequency. The design of four trigger towers of the LHCb preferred embodiment, presently fits into an OR3T30 FPGA, and run as required at 80 MHz. Preliminary test results meet the functional requirements of LHCb and provide sufficient flexibility to introduce future changes. The complete system design is also provided along with the integration of the front-end design in the entire system and the cost and dimension of the electronics.

5.4.2.1 Generally Scheme of the Interface Between Detectors, Triggers, and DAQ Electronics One of the field of application of the 3D-Flow system is that of using the feature of extending its processing time capability in one pipeline stage beyond the time interval between two consecutive input data in order have more processing time to be able to correlate and analyze patterns among plural input signals. The mentioned feature of extending the processing time in one pipeline stage can be applied to a single channel as to many channels (see FIG. 4). Following is described an application (for HEP, however the same interface without the buffering of the signals for 128 clock cycles, can be used by several other applications such as PET/SPECT/CT, PET/SPECT/MRI, etc.), that is suitable for a few channels as well as for thousands of channels.

In a High Energy Physics (HEP) experiment, hundreds of thousands of electrical signals are generated every few tens of ns (called bunch crossing; in the case of the Large Hadron Collider—LHC—at CERN, Geneva the bunch crossing is 25 ns) by different types of sensors installed on different subdetectors, and are sent to the electronics for parallel signal analysis.

Since the subdetectors may be placed far from each other (each one thus detecting the hit of the same particle at different times required by the Time Of Flight—TOF—of the particle in reaching the sensors at different locations), and since the cables from the subdetectors to the electronics may have different lengths, all signals (also called "raw data" after conversion to digital form) belonging to the same bunch crossing time must be synchronized by the electronics. (This function is implemented in the component called Front-End FPGA (Field Programmable Gate Array) shown in FIG. 13 and indicated by the number '1' inside a circle).

Since the data rate is very high (tens of MHz), trigger decisions must be based on a wisely chosen sub-sample of the signals. For reasons of system performance at a very high input data rate and for reasons of cost optimization, it is convenient to perform the parallel processing on a sub-set of hundreds of thousands of signals at the rate of tens of MHz.

This fast processing unit analyzing and correlating many signals at an input data rate of 40 MHz is called "Trigger Unit.". The input signals needed by the "Trigger Unit" are extracted from the overall raw data in the front-end chip by the block indicated by '2' inside the circle in FIG. 13.

During the time the trigger unit analyzes the sub-set of data and arrives at a decision whether to accept or reject an event (an event is defined as all signals belonging to a certain "bunch crossing" time), the full granularity (that is: full time and spatial resolution information from all sensors) of all signals received from all subdetectors is stored into a circular pipeline buffer. This functional block is indicated by the number "3" inside a circle in the Front-End chip of FIG. 13.

Typically, in most of the current experiments, the time required by this stage to reduce the data rate is of the order of 3 µs. This includes not only the processing time by the trigger unit, but also the delay of cables and of the other electronics.

The entire process is synchronous. Every 25 ns, a new set of data is received from all subdetectors and at the same time a Yes/No global-level trigger signal (indicated as G_L0 in FIG. 13 and described in Section 5.5.1.9) accepts (by transferring all data into the FIFO) or rejects the data relative to the event that occurred 128 bunch crossings (or cycles) before. (In this specific case, 128×25 ns=3.2 □s).

Since we do not know which event will be accepted, but we do know instead from Monte Carlo simulation that an average acceptance rate at this stage ranges from 100,000 to 1 million events per second, the electronics sustaining the highest expected acceptance rate for a given experiment should be designed and built.

The 3D-Flow trigger system is totally flexible to sustain the entire acceptance range and to serve all types of experiments. The design and implementation of the Front-End chip has followed the same criteria of flexibility, modularity, and commonality as was the case for the 3D-Flow for the fully programmable trigger design. In the Front-End chip design, the depth/width of the FIFO, the bits that form the trigger word to be sent to the trigger processor, the depths of the pipeline buffer, and the variable delay applicable to each input bit in order to synchronize the signals from the detector are configurable and can be adapted to the requirements of different experiments or can accommodate future changes for the same experiment.

Finally, the reduced raw data are available in the FIFO to be sent to the Data Acquisition system and to the higher level of the trigger system shown with the number "4" inside a circle in the right-hand side of FIG. 13.

The FIFO is used to derandomize the accepted event between the global level-0 trigger and the input of the level-1 trigger unit. The depth of the FIFO is determined by the maximum number of accepted events within a given time period.

The decision to fetch a new event from the FIFO is taken by the higher trigger level that sends a read-FIFO signal when it is ready to read a new event.

The present design also provides the next higher level trigger with the information on the exact number of events in the FIFO at each given time. This information is useful in case the next level trigger has the capability of increasing its input data read rate, preventing the FIFO from getting full.

5.4.2.2 Configurable Front-End (FE) Interfacing Module for Several Applications

In the present design, the problem of interfacing detectors, trigger units, and DAQ electronics has been approached keeping in mind the general scheme shown in FIG. 13 and the specific needs of LHCb described in Section 5.5.1.

Even if the goal were to make a design that meets the requirements of LHCb front-end electronics interfacing specific subdetectors to the electronic with specific functions of the trigger and DAQ (see FIG. 14b), the approach followed provides a much more general solution (see FIG. 14a). This approach is such that the same front-end module can equally solve the problem of the front-end circuitry of the LHCb muon subdetector and serve as the front-end of other experiments or applications.

Instead of limiting the design to a circuit that interfaces the signals from different subdetectors (e.g., from 8 PADs of the PAD chamber, 4 signals from preshower, 4 signals from the electromagnetic, and 1 signal from the hadronic calorimeter) of the LHCb specific geometry to the triggers and DAQ, one can look at the present design as if a circuit with general features were available to the user.

The general features of the circuit are those of providing a certain number of interface FE-bit-channels (a front-end bit channel should not be confused with a "trigger tower channel," which is at present defined for LHCb as 23-bit, and which is the input word to one 3D-Flow trigger processor. See Section 5.4.2.5 and FIG. 15) from any detector type (one or more bits per detector) to the DAQ and higher level triggers.

Each FE-bit-channel has a pipeline buffer to store the information during trigger decision time, and each value received from the sensors has a time-stamp associated to it that will be sent out, together with the sensor value, in case the event that occurred at its specific time stamp is accepted.

5.4.2.3 Front-End Signal Synchronization/Pipelining/Derandomizing/Trigger Word Formatter The complete detailed study for the overall level-0 front-end electronics has been performed. Detailed circuits that can be downloaded in the ORCA OR3T30 FPGA are provided, together with test benches for easy verification of the correlation between signals and their timing performance.

For the mixed-signal processing board (see Section 5.4.3.1.1), after the task of amplification and conversion of analog signals to digital by means of an ADC such as Analog Devices AD9042 converting to 12-bit at 40 MHz, all digital information are sent to 16 FPGAs. Each FPGA can implement all functions described below for four channels out of 64 channels in a board. The study has been made referring to the component from Lucent Technologies ORCA OR3T30 with 256-pin BGA with a package dimension of 27 mm×27 mm.

The digital information relative to four trigger towers (see Section 5.5.1) is sent to the input of one FPGA. If a PAD from the muon station or signals from any other subdetector is used by more than one trigger tower, it will be sent to all the appropriate FPGA units.

All data are strobed into a register inside the FPGA at the same time; however, the present design allows for data arriving from different detectors (e.g. muon Pad vs. ECAL) be out of phase by one or two bunch crossing (or the clock cycle of the detector).

Next, a delay from 0 to 2 clock counts at each bit received at the input of the FPGA needs to be inserted. This function, called "variable delay," is shown in FIGS. 16, 18, and 19.

For each channel we have, then, 12-bit information from the electromagnetic calorimeter, 12-bit information from the hadronic calorimeter, 1-bit information from the preshower, and 2-bit information from the muon pad chamber, for a total of 27-bits per input-channel.

The above 27-bits input channels need to be stored into a level-0 pipeline buffer of 128 clocks (or bunch crossings) while the trigger electronics verifies whether the event should be retained or rejected. This function is called "128 pipeline." (See FIG. 20).

When an event is accepted, the global level-0 trigger decision unit (see Section 5.5.1.9) sends a signal to all the "128 pipeline" bits buffers to move the accepted bit (corresponding to an accepted event) to a derandomizing FIFO buffer (see FIG. 21). This function is called "FIFO". For each channel we will have a 27-bit FIFO containing the full information relative to the accepted event. Even though all the process is synchronous, it is safer to extend the width of the FIFO in each FPGA. At present, 8-bit have been reserved for the time-stamp "bunch-crossing" counter; however, it is defined as a global variable in the VHDL code that can be changed at any time.

Each FPGA handles the information of four trigger-towers channels (see FIG. 15), memorizes the information for 128 clock cycles, stores the information relative to the accepted events (at an average of 1 MHz) into a 32-bit deep (this parameter can be changed at any time), 80-bit wide FIFO. The width of the output FIFO in each FPGA is calculated as follows: 4×12-bit electromagnetic, 12-bit hadronic, 4×1-bit preshower, 4×2-bit pads of muon stations, and 8-bit time-stamp from a bunch crossing counter that will allow one to verify partial event information at different stages of the data transmission (optical fibers, deserializer, etc.). Thus for each accepted event, each FPGA will send 80-bit through the serializer and the optical fiber to the upper level trigger and DAQ.

A strobe signal received from the upper level decision units and DAQ (called EnOutData in FIGS. 15, 16 and 21) will read all output FIFOs from the FPGAs at an estimated rate of 1 MHz.

Besides the synchronization, 128 pipeline storage, and derandomization of the full data path, it is also necessary to generate the trigger word to be sent to the 3D-Flow trigger processor. In order to save some 3D-Flow bit-manipulation instruction, the function of formatting the input trigger word can also be implemented into the FPGA (see FIG. 19).

As the circuit is currently conceived, an FE-bit-channel (representing 1-bit of information received from the sensors) can be associated to 1-bit of the 12-bit ADC converter, to 1-bit of the preshower, or to any of the information received from the subdetectors.

At each FE-bit-channel, a delay can be inserted for the purpose of synchronizing the information belonging to the same event (or bunch crossing time). Each FE-bit-channel stores the information in a circular pipeline buffer to allow the lower level trigger unit to take a decision within a few microseconds. The candidates accepted by the global lower level trigger unit are stored in a derandomizing FIFO, ready to be read out by the DAQ and higher level triggers. Any of the FE-bit-channels can be selected and combined in any order to form the trigger-word to be sent to the trigger processor. The feature of receiving information from neighboring elements such as the PADs that are to be used in formatting the trigger word is also implemented without needing to duplicate all circuits relative to an FE-bit-channel (pipeline, FIFO, etc.).

All the above parameters (FIFO depth/width, input delay, pipeline buffer depth, trigger word extraction can be configured differently for each application. The changes need to be introduced only in one file (shown in Table 1) that is kept separate from the other code. Thus, the same front-end circuit can be used for the front-end circuit of the LHCb muon subdetector, as well as for other experiments.

After the parameters have been changed in the configuration file, the execution of the script file reported in Table 2 recompiles the entire project making it ready to be simulated by software simulation tools such as that furnished by Model Technologies, and to be synthesized into FPGA (Field Programmable Gate Array) or ASIC (Application Specific Integrated Circuit).

The selection of accommodating 72 FE-bit-channels is a good compromise between several factors such as: a) the number of components that will be required on a board (16), b) the size of each component, c) the number of inputs/outputs per chip, d) a good partition of a "Trigger Tower," i.e., a logical group of signals from the LHCb subdetectors, e) the fact that each component can accommodate four of them, and f) the fact that the front-end circuit can be implemented either on a medium-cost FPGA, offering maximum flexibility, or in a small-cost ASIC.

TABLE 1

Configuration parameters for the front-end chip.

```
--                                                 --
-- Copyright (c) 1999 by 3D-Computing, Inc.        --
--             All rights reserved.   --
-- Author    : Dario Crosetto                      --
--                                                 --
-- This source file is FREE for Universities, National Labs and  --
-- International Labs of non-profit organizations provided that the --
-- above statements are not removed from the file,  --
-- that the revision history is updated if changes are introduced, and --
-- that any derivative work contains the entire above-mentioned notice. --
--                                                 --
-- Package name : FE_config.vhd
--
-- Project   : Front-End Electronics Logic
-- Purpose   : This file contains the configuration parameters of the
--       chip. A change of a parameter in this file will affect
--       changes in all the modules of the front-end project design.
--       After the changes, the user should recompile the entire
--       project using the script macro.
--
-- Revisions :       D. Crosetto      2/12/99    created for one trigger tower channel;
--                   D. Crosetto                 4/23/99 modified for 4 trigger tower channels;
--
---------------------------------------------------------------------
LIBRARY IEEE;
USE IEEE.std_logic_1164.ALL;
PACKAGE FE_config IS
---------------------------------------------------------------------
-- declare the constants used in the design.      --
---------------------------------------------------------------------
        CONSTANT PS_del : std_logic_vector(1 DOWNTO 0) := "10"; --select delay 2
        CONSTANT HD_del : std_Logic_vector(1 DOWNTO 0) := "00"; --select delay 0
        CONSTANT EM_del : std_logic_vector(1 DOWNTO 0) := "00"; --select delay 0
        CONSTANT M1_del : std_logic_vector(1 DOWNTO 0) := "01"; --select delay 1
   CONSTANT Time_ID_width : INTEGER:= 8 ; -- # bits of the time_stamp info
   CONSTANT M1_width      : INTEGER:= 2; -- # bits of M1 data
   CONSTANT adc_width     : INTEGER:= 12; -- # bits of ADC data
   CONSTANT Width_To3DF   : INTEGER:= 8; -- width of 3D-Flow input data port
   CONSTANT fifo_depth    : INTEGER:= 5; -- depth of output fifo (power of 2)
   CONSTANT fifo_width    : INTEGER:= 80; -- width of output fifo (# of bits)
   CONSTANT PIPE_depth    : INTEGER:= 128;-- depth of pipeline buffer (# of locations)
   CONSTANT EM_trig_width : INTEGER:= 8; -- EM bits used for trigger
   CONSTANT HA_trig_width : INTEGER:= 8; -- HAD bits used for trigger
   CONSTANT PS_trig_width : INTEGER:= 1; -- PS bits used for trigger
   CONSTANT M1_trig_width : INTEGER:= 2; -- M1 bits used for trigger
END FE_config;
```

TABLE 2

Script file that recompiles the entire front-end chip for simulation.

```
vcom -work work -explicit -93 c:\3d_comp8\ORCA_VHDL_notime_FE\source\FE_config.vhd
vcom -work work -explicit -93 c:\3d_comp8\ORCA_VHDL_notime_FE\source\FE_syncinput.vhd
vcom -work work -explicit -93 c:\3d_comp8\ORCA_VHDL_notime_FE\source\FE_fifo.vhd
vcom -work work -explicit -93 c:\3d_comp8\ORCA_VHDL_notime_FE\source\FE_pipeline.vhd
vcom -work work -explicit -93 c:\3d_comp8\ORCA_VHDL_notime_FE\source\FE_trig_formatter.vhd
vcom -work work -explicit -93 c:\3d_comp8\ORCA_VHDL_notime_FE\source\FE_top.vhd
vcom -work work -explicit -93 c:\3d_comp8\ORCA_VHDL_notime_FE\source\FE_testbench_v2.vhd
```

TABLE 3

VHDL code of the inputs/outputs of the front-end chip mapped to one FPGA.

```vhdl
------------------------------------------------------------------------
--                                                                    --
-- Copyright (c) 1999 by 3D-Computing, Inc.
--                       All rights reserved. --
-- Author      : Dario Crosetto --
--                                                                    --
-- This source file is FREE for Universities, National Labs and       --
-- International Labs of non-profit organizations provided that the   --
-- above statements are not removed from the file,                    --
-- that the revision history is updated if changes are introduced, and --
-- that any derivative work contains the entire above-mentioned notice. --
--                                                                    --
-- Package name : FE_top.vhd
--
-- Project   : Front-End Electronics Logic
-- Purpose   : This file implements the front-end signal synchronization,
--             pipelining, derandomizing, trigger word formatter.
--             The code is for four trigger channels
--
-- Revisions :       D. Crosetto        2/12/99     created for one channel;
--                   D. Crosetto                    4/23/99 modified for 4 channels;
--
--------------------------------------------------------------------------
LIBRARY IEEE;
USE IEEE.std_logic_1164.ALL;
USE IEEE.std_logic_arith.ALL;
LIBRARY work;
USE work.FE_config.ALL;
----------------------------------------------------------------
--Entity Definition
----------------------------------------------------------------
ENTITY FE_top IS
    PORT ( clock, reset      : IN STD_LOGIC;
        EM_A                 : IN STD_LOGIC_VECTOR(adc_width - 1 DOWNTO 0);
        EM_B                 : IN STD_LOGIC_VECTOR(adc_width - 1 DOWNTO 0);
        EM_C                 : IN STD_LOGIC_VECTOR(adc_width - 1 DOWNTO 0);
        EM_D                 : IN STD_LOGIC_VECTOR(adc_width - 1 DOWNTO 0);
        HD_A                 : IN STD_LOGIC_VECTOR(adc_width - 1 DOWNTO 0);
        PS_A                 : IN std_logic;
        PS_B                 : IN std_logic;
        PS_C                 : IN std_logic;
        PS_D                 : IN std_logic;
        M1_A                 : IN STD_LOGIC_VECTOR(M1_width - 1 DOWNTO 0);
        M1_B                 : IN STD_LOGIC_VECTOR(M1_width - 1 DOWNTO 0);
        M1_C                 : IN STD_LOGIC_VECTOR(M1_width - 1 DOWNTO 0);
        M1_D                 : IN STD_LOGIC_VECTOR(M1_width - 1 DOWNTO 0);
        M1_E                 : IN STD_LOGIC_VECTOR(M1_width - 1 DOWNTO 0);
        M1_F                 : IN STD_LOGIC_VECTOR(M1_width - 1 DOWNTO 0);
        M1_G                 : IN STD_LOGIC_VECTOR(M1_width - 1 DOWNTO 0);
        M1_H                 : IN STD_LOGIC_VECTOR(M1_width - 1 DOWNTO 0);
        Time_ID              : IN STD_LOGIC_VECTOR(Time_ID_width -1 DOWNTO 0);
        G_L0                 : IN std_logic;
        EnInData             : IN std_logic;
        EnOutData            : IN std_logic;
        clk_x2               : IN STD_LOGIC; -- Replaced by the internal PLL --
        clk_x4               : IN STD_LOGIC; -- Replaced by the internal PLL --
        fifo_empty           : OUT std_logic;
        fifo_full            : OUT std_logic;
        diff_fifo_addr       : OUT std_logic_vector(fifo_depth - 1 downto 0);
        LOAD_3DF_A           : OUT std_logic;
        TO_3DF_A             P1 : OUT STD_LOGIC_VECTOR(Width_To3DF - 1 DOWNTO 0);
        LOAD_3DF_B           : OUT std_logic;
        TO_3DF_B             : OUT STD_LOGIC_VECTOR(Width_To3DF - 1 DOWNTO 0);
        LOAD_3DF_C           : OUT std_logic;
        TO_3DF_C             : OUT STD_LOGIC_VECTOR(Width_To3DF - 1 DOWNTO 0);
        LOAD_3DF_D           : OUT std_logic;
        TO_3DF_D             : OUT STD_LOGIC_VECTOR(Width_To3DF - 1 DOWNTO 0);
        DataOut              : OUT std_logic;
        St_Burst             : OUT std_logic
        );
END FE_top;
```

5.4.2.4 Coding of the Input-Synchronizer Module (VHDL)

The input synchronizer module registers all inputs and, at each channel, inserts the delay defined in the configuration file of Table 1.

There are three registers for each channel (or trigger tower), channel A, channel B, channel C, and channel D.

- First, all registers are reset to zero when the RESET signal is zero.
- Next, at the clock rising edge, the value of dly1_xx_x is copied into the register dly2_xx_x; the values of xx_x_clkd are copied into the register dly1_xx_x, the value of xx_x is copied in xx_x_clkd.

---

Insert the header statement of Table 1, or Table 4 in case this code needs to be used or copied

```
ELSIF (clock'EVENT AND clock = '1') THEN
    EM_A_clkd <= EM_A;
    EM_B_clkd <= EM_B;
    EM_C_clkd <= EM_C;
    EM_D_clkd <= EM_D;
    dly1_EM_A <= EM_A_clkd;
    dly1_EM_B <= EM_B_clkd;
    dly1_EM_C <= EM_C_clkd;
    dly1_EM_D <= EM_D_clkd;
    dly2_EM_A <= dly1_EM_A;
    dly2_EM_B <= dly1_EM_B;
    dly2_EM_C <= dly1_EM_C;
    dly2_EM_D <= dly1_EM_D;
```

---

Change delay values based on detector, and/or electronics, and/or cable length

---

```
Select_Del_EM <= EM_del;
Select_Del_HD <= HD_del;
Select_Del_PS <= PS_del;
Select_Del_M1 <= M1_del;
```

---

This synchronizes EM signals. EM_xx signal will get the value of one of the three registers conforming the selection made in the previous statement.

---

```
EM_AS <= dly2_EM_A WHEN (Select_Del_EM = "10")
    ELSE dly1_EM_A WHEN (Select_Del_EM = "01")
    ELSE EM_A_clkd;
EM_BS <= dly2_EM_B WHEN (Select_Del_EM = "10")
    ELSE dly1_EM_B WHEN (Select_Del_EM = "01")
    ELSE EM_B_clkd;
EM_CS <= dly2_EM_C WHEN (Select_Del_EM = "10")
    ELSE dly1_EM_C WHEN (Select_Del_EM = "01")
    ELSE EM_C_clkd;
EM_DS <= dly2_EM_D WHEN (Select_Del_EM = "10")
    ELSE dly1_EM_D WHEN (Select_Del_EM = "01")
    ELSE EM_D_clkd;
```

---

5.4.2.5 Coding of the Trigger-Word-Formatter Module (VHDL)

The Trigger-Word-Formatter module builds four trigger words to be sent to four 3D-Flow processors by extracting the information from synchronized raw data. Any combination of bits available in the FPGA can be used, the same signal can be sent to several 3D-Flow processors, and the format can be changed at a later time by changing the configuration file of Table 1.

The Load to the 3D-Flow processor signal is synchronized with the clock. The 32-bit trigger word is clocked out to the 3D-Flow processor at twice the speed of the system clock (40 MHz).

The implementation for FPGA OR3T30 uses an internal PLL (Phase-Locked Loop) at 80 MHz. The circuit is different from the ASIC implementation. The FPGA implementation uses a different circuit made of the trigger-word formatter 32-bit register, connected to two 8-bit multiplexers 2:1, connected to two 8-bit registers, connected to one 8-bit multiplexer 2:1. The first set of multiplexers uses the clock at the "select" input, the second set of 8-bit registers uses clock_x2 (@80 MHz) as strobe, and the last multiplexer uses clock_x2 at the "select" input.

The limitation of the current FPGAs that cannot have a PLL @ 160 MHz requires the use of multiplexers, registers and PLL @ 80 MHz. Future FPGAs will have PLL @ 160 MHz, and thus the circuit could be of the same type as the one for ASIC (which uses a counter @ 160 MHz to select the input at the multiplexer).

The sequence of operation in the FPGA is the following:

Insert the Header Statement of Table 1, or Table 4 in Case this Code Needs to be Used or Copied First, the trigger word is extracted from the synchronized raw data in the following manner (code shows only one channel out of four):

---

```
TEMP_3DF_A <= EM_AS(EM_trig_width -1 DOWNTO 0) &
    HD_AS(HA_trig_width -1 DOWNTO 0)
    & PS_AS & "000000000" & M1_AS(M1_trig_width -
    1 DOWNTO 0)
    & M1_BS(M1_trig_width - 1 DOWNTO 0)
    & M1_CS(M1_trig_width - 1 DOWNTO 0);
```

---

A counter @ 160 MHz is used to select input data of the multiplexer that sends them to the 3D-Flow processor.

---

```
MUX_CNT: PROCESS (int_clk_x4, reset)
BEGIN
    IF (reset = '0') THEN
        Mux_Count <= (others => '0');
    ELSIF (int_clk_x4'EVENT AND int_clk_x4 = '1') THEN
        IF (EnInData_delay = '1') THEN
            Mux_Count <= Mux_Count + 1;
        ELSE
        END IF;
    ELSE
    END IF;
END PROCESS MUX_CNT;
```

---

The 32-bit of the trigger word is sent out, in four steps through a 8-bit data bus, to the 3D-Flow trigger processor (code shows only one channel out of four).

---

```
-- clocking the trigger-word to the trigger decision 3D-Flow processor.
CLK_TRI: PROCESS (int_clk_x4, reset)
    BEGIN
        IF (reset = '0') THEN
            TO_3DF_A <= (others => '0');
        ELSIF (int_clk_x4'EVENT AND int_clk_x4 = '1') THEN
            IF (EnInData_delay = '1') THEN
                CASE Mux_count IS
WHEN "00" => TO_3DF_A <= TEMP_3DF_A(4 *
Width_To3DF - 1 DOWNTO 3 * Width_To3DF);
WHEN "01" => TO_3DF_A <= TEMP_3DF_A(3 *
```

```
-continued
Width_To3DF - 1 DOWNTO 2 * Width_To3DF);
WHEN "10" => TO_3DF_A <= TEMP_3DF_A(2 *
Width_To3DF - 1 DOWNTO Width_To3DF);
WHEN "11" => TO_3DF_A <= TEMP_3DF_A(Width_To3DF -
1 DOWNTO 0);
WHEN OTHERS => NULL;
    END CASE;
```

5.4.2.6 Coding the Pipeline Buffer Module (VHDL)

Insert the Header Statement of Table 1, or Table 4 in Case this Code Needs to be Used or Copied.

At the clock rising edge, a new synchronized data is copied into the pipeline buffer at the LSB (Least Significant Bit) position, and the entire pipeline buffer is shifted one position to the left.

```
ELSIF (clock'EVENT AND clock = '1') THEN
PIPE_EM_A0(PIPE_depth - 1 DOWNTO 0) <=
PIPE_EM_A0(PIPE_depth - 2 DOWNTO 0) & EM_AS(0);
```

The MSB (Most Significant Bit) of the pipeline buffer is copied into the 80-bit wide register "TO_IN_FIFO." (Code is shown only for the first 12-bit channels out of 72 channels, last 8-bit are the value of the "Time_ID" counter).

```
TO_IN_FIFO(fifo_width - 1 DOWNTO 0) <=
    PIPE_EM_A0(127) & PIPE_EM_A1(127) &
    PIPE_EM_A2(127) & PIPE_EM_A3(127) &
    PIPE_EM_A4(127) & PIPE_EM_A5(127) &
    PIPE_EM_A6(127) & PIPE_EM_A7(127) &
    PIPE_EM_A8(127) & PIPE_EM_A9(127) &
    PIPE_EM_A10(127) & PIPE_EM_A11(127) &
```

Coding the FIFO and the Output Serializer (VHDL)

Insert the Header Statement of Table 1, or Table 4 in Case this Code Needs to be Used or Copied.

This code implements the FIFO read pointer. At the clock rising edge, if the FIFO is not empty and there is a request to read one data from the higher level trigger unit, the read pointer is incremented. (The write pointer is similar, but uses the Global Trigger signal "G_L0" as a condition to increment the write pointer).

```
-- FIFO read address
PROCESS (reset,clock,EnOutData)
BEGIN
    IF (reset = '0') THEN
        int_fifo_rdaddr <= (others => '0');
    ELSIF (clock'Event AND clock = '1') THEN
        IF EnOutData = '1' AND int_fifo_empty = '0' THEN
            int_fifo_rdaddr <= int_fifo_rdaddr + 1;
        END IF;
    END IF;
END PROCESS;
```

The following code implements the update of the FIFO flags. A counter keeps track of how many data are present in the FIFO at any time. The counter is incremented when there is a write operation and the FIFO is not full, while it is decremented when there is a read operation and the FIFO is not empty.

```
-- fifo full/empty logic
PROCESS (clock, reset)
BEGIN
    IF reset = '0' THEN
        int_fifo_cnt <= (OTHERS => '0');
    ELSIF (clock'EVENT AND clock = '1') THEN
        IF G_L0 = '1' AND int_fifo_full = '0' THEN
            int_fifo_cnt <= int_fifo_cnt + 1;
        END IF;
    ELSE
        IF EnOutData = '1' AND int_fifo_empty = '0' THEN
            int_fifo_cnt <= int_fifo_cnt - '1';
        END IF;
    END IF;
END PROCESS;
```

This code writes a new data into the FIFO when a Global Trigger Accept signal is received and the FIFO is not full.

```
comb_proc: PROCESS (G_L0,TO_IN_FIFO    , int_fifo_wraddr)
BEGIN
    IF (reset = '0') THEN
        next_file <= (OTHERS =>
            (OTHERS => '0'));
    ELSIF (wr_en = '1' AND G_L0 = '1' AND
        int_fifo_full = '0') THEN
        next_file(CONV_INTEGER(int_fifo_wraddr)) <=
            TO_IN_FIFO;
    END IF;
END PROCESS;
```

This code sends data out of the FIFO serially from DataOut pin.

```
DataOut <= temp_out(fifo_width - 1);
```

The code sends "St_burst_out" signal synchronized with first bit of output string of 80 bits.

```
PROCESS (reset,int_clk_x2,EnOutData,int_fifo_empty)
BEGIN
    IF (reset = '0') THEN
        St_burst <= '0';
    ELSIF (int_clk_x2'Event AND int_clk_x2 = '1') THEN
        IF EnOutData = '1' AND int_fifo_empty = '0' THEN
            St_burst <= '1';
        ELSE
            St_burst <= '0';
        END IF;
    END IF;
END PROCESS;
```

This code reads out values from the FIFO when receiving "EnOutData" signal from the Higher-Level Trigger.

(In more details) loads "temp_out" with FIFO value pointed by read_fifo_address ELSE load "temp_out" with shifted value.

```
PROCESS (reset,int_clk_x2,EnOutData) -- MSB first shift register.
BEGIN
    IF (reset = '0') THEN
        temp_out <= (others => '0');
    ELSIF (int_clk_x2'EVENT AND int_clk_x2 = '1') THEN
        IF (EnOutData = '1' AND int_fifo_empty = '0') THEN
            temp_out <= next_file(CONV_INTEGER(int_fifo_rdaddr));
        ELSE
            temp_out <= temp_out(fifo_width - 2 downto 0) & '0';
        END IF;
    END IF;
END PROCESS;
```

This signal assignment makes the FIFO Flags status available at the pin of the chip.

```
diff_fifo_addr <= int_fifo_cnt(fifo_depth - 1 DOWNTO 0);
int_fifo_full <= int_fifo_cnt(fifo_depth);
int_fifo_empty <= '1' WHEN int_fifo_cnt = "000000" ELSE '0';
```

5.4.2.8 Mapping the Level-0 Front-End Circuits into ORCA OR3T30 FPGA

The above "generic VHDL" style suitable for any FPGA or ASIC, if kept as is, will be technology independent. The synthesis tools of different vendors will translate into gates for their technology. However, the user may further improve the layout for a particular technology in order to optimize the silicon. (This effort is not convenient for large designs such as the 3D-Flow chip because of the portability and the fact that it is more important to have a technology-independent design. In the long run, given the rapid advances in technology, it will also be cost effective, eliminating the need to spend many hours to save a few gates in an environment where the gates cost less every year.)

Since this front-end circuit is a small design, and the architecture of the ORCA Programmable Function Unit was known, the exercise of mapping the function into logic was not very complex.

The basic elements of the ORCA architecture used to implement the above functions are: a Programmable Logic Cell (PLC), and Programmable Input/Output Cells (PICs). An array of PLCs is surrounded by PICs. Each PLC contains a Programmable Function Unit (PFU) containing 8 registers, a Supplemental Logic and Interconnect Cell (SLIC), local routing resources, and configuration RAM (used in our case to implement the 128 pipeline buffer).

Following is the resulting optimization, calculated for four trigger channels that can be implemented in an OR3T30 FPGA device.

TABLE 4

Mapping the Level-0 front-end circuit into ORCA OR3T30 FPGA.

| Function | # of PFU | Comment |
|---|---|---|
| Input register | 0 | Use PIC registers |
| Variable delay | 20 | 1 PFU per 4 input bits |
| 3DF interface | 32 | |
| 128-clock pipeline | 80 | 1 per input bit |
| Counters (for 128 clock pipeline) | 9 | |
| 32 × 80 FIFO | 20 | 4 bit per PFU (use dual-port memory) |
| 80-bits Parallel In, Serial Out regs | 10 | |

TABLE 4-continued

Mapping the Level-0 front-end circuit into ORCA OR3T30 FPGA.

| Function | # of PFU | Comment |
|---|---|---|
| 5-bit read pointer | 4 | For FIFO read pointer |
| 5-bit write pointer | 4 | For FIFO write pointer |
| Miscellaneous | 3 | |

The total number of PFUs required is 182. The OR3T30 contains 196 PFUs.

5.4.2.9 From Detector Signals to Global Level-0 Trigger Decision Unit

The front-end design (FPGA or ASIC) described herein can be one component of a larger system for triggering and front-end data acquisition. What follows is the description of the logical layout and physical layout of the system embodying the front-end chip. Connections on printed board, and off-printed board between front-end chips in order to have no boundary limitation in the overall detector trigger system, are also described.

5.4.2.10 Logical layout

FIG. 23 shows the logical layout of the entire electronic chain of components from the front-end to the global decision unit and Data Acquisition (DAQ) of the application of the Level-0 trigger of the LHCb experiment. Signals received from different sensors from different subdetectors are sent to the FPGA front-end chips, each accommodating four channels (or trigger tower in the LHCb nomenclature) and to the 3D-Flow ASIC, each accommodating 16 channels (or trigger tower).

5.4.2.11 Physical Layout: A Single Type of Board for Several Applications.

The modularity, flexibility, programmability, and scalability of the 3D-Flow system, including its front-end chip described in this article, are maintained all the way from the component to the crate(s). This also applies to the type of board used in the system. Only a single type of board is needed in a 3D-Flow system of any size. This board can change for each application from mixed signals, analog and digital, to a purely digital board, depending on the nature of the input signals received from the sensors. A complete description of the board, built-in standard 9U×5 HP×340 mm size, can be found in Section 5.4.3.1; the following is a description only of the layout and the channel partitioning in the FPGA front-end chip with respect to the other chips on the board.

The board design, based upon an 80 MHz 3D-Flow processor and a 40 MHz FPGA with outputs to the 3D-Flow processors at 80 MHz, accommodates 64 trigger towers channels and 10 processing layers.

The FPGA front-end chip can be installed in either type of board: the mixed signal board (analog and digital) and the purely digital board.

In both cases, the digital information relative to four trigger towers (converted to digital by ADC converters in the mixed analog and digital board, or directly received in digital form via optical fibers in the purely digital board) is sent to the input of one FPGA.

Each of the 16 front-end FPGA chips (8 chips are assembled on the front and 8 are assembled on the rear of the board as shown in FIG. 24) perform the following functions on four groups of signals called "Trigger Tower":

synchronizes 72 inputs (4×12 bits ECAL, 12 bits HCAL, 4×1 PreShower, 4×2 Pads) every 25 ns;

saves 72 raw data in a 128×72 pipeline-stage digital buffer every 25 ns;

generates four trigger words to be sent to four 3D-Flow processors at 80 MHz. Currently, the trigger word is defined as: 8-bit electromagnetic calorimeter, 8-bit hadronic calorimeter, 1-bit preshower, and 6-bit PADs from the PAD chamber (see FIG. 8) (this can, however, be changed at any time);

derandomizes accepted raw data into a FIFO;

receives the global level-0 trigger at the average rate of 1 MHz;

sends out the 80-bit raw data of the corresponding accepted events (when global level-0=yes) through a single output pin @ 80 MHz.

Every FPGA chip (16 FPGA chips in total per each board, as shown in FIG. 24) on the board sends out one bit every 12.5 ns. The 16-bit word of raw data accepted by the global level-0 trigger decision unit is then serialized (See Hewlett Packard, Lucent technologies, AMCC, and Vitesse components described in reference 8) and sent out through an optical fiber @ 1.28 Gbps (12.5 ns/16=0.78125 ns period that is equivalent to 1.28 Gbps).

5.4.2.12 Front-End Hardware Summary

The extraction of the level-0 trigger word is well integrated into the circuit of the front-end that is performing the functions of input data synchronization, pipelining, and derandomizing (FIFO). In summary:

16 FPGAs per board would exploit the function of the front-end electronic and trigger word extraction of 64-trigger towers. The total calorimeter and PAD chamber, front-end electronics will require 1536 FPGAs.

Only about 375 additional OR3T30 FPGAs are required to complete the FE for all subdetectors participating in the level-0 trigger. The calculation is as follows: the remaining subdetectors are the muon station 2, for 12,000 bits, and muon stations 3, 4, 5 for 6000-bits for a total of 30,000-bits. Assuming that the above function be implemented for 80-bit per FPGA OR3T30, we will need about 375 additional components.

The mapping of the circuit into the FPGA has the following constraints: a) the ORCA PFU architecture is well optimized if the range of the variable delay that performs synchronization is limited from 0 to 2, b) the pipeline depth should not be greater than 128. The implementation on OR3T30 meets requirements @ 80 MHz.

Purchasing about 2000 FPGA chips will provide maximum flexibility in downloading different circuits in the future.

The complete design of the front-end electronics has been made for a) ASIC implementation, and b) FPGA implementation. For the ASIC implementation, all VHDL source files and test results have been provided.

Preliminary test results meet the functional requirements of LHCb and provide sufficient flexibility to allow future changes.

The design is targeted to a small FPGA (OR3T30) for solving the specific requirements of LHCb and achieving the speed @ 80 MHz, at the minimum cost. The speed @ 80 MHz is for ambient temperature up to 70° C., junction temperature up to 125° C., and for a load on the output drivers up to 50 pF per driver.

Although the effort that has been made it could be used only by LHCb because hard macros have been created specifically for the detector topology described in the LHCb TP (the immediate construction of the system with today's FPGA could be pursued), an additional design in generic-HDL, which allows to introduce future modification and allows implementing the design at any time with any technology for different applications, has been provided.

For the specific design of LHCb, 96 boards (9U), about 2000 FPGAs, and about 5000 3D-Flow ASICs in addition to all other commercially available components listed in FIG. 25, will be sufficient to build a fully programmable system capable of sustaining an input data rate up to 960 Gb/s, providing the programmability of executing a real-time algorithm (2×2, or 3×3, or 4×4, etc.) up to 20 steps (considering that 26 operations can be executed in each step).

The design/verification methodology, which allows to verify the user's real-time system algorithm down to the gate-level simulation on a technology-independent platform, is a proof that the system can be implemented to any technology at any time.

5.4.3 The Implementation of the 3D-Flow System 5.4.3.1 EXAMPLE 1

Large 9U Boards/Crates

The modularity, flexibility, programmability and scalability of the 3D-Flow system is kept all the way from the component to the crate(s). This is valid also for the type of board used in the system. Only a single type of board is needed in a 3D-Flow system of any size. This board can change for each application from mixed analog and digital signals to a purely digital board, depending on the nature of the input signals received from the sensors.

Following are descriptions of a mixed-signal 3D-Flow processing board based on the 3D-Flow processor (option 1) and a purely digital processing board (option 2). The only difference among the two boards is the front-end electronics. In one case there are preamplifiers and analog-to-digital converters, in the second case there are high speed optical fiber links.

The board design presented here, based upon an 80 MHz processor, accommodates 64 trigger towers channels and 10 processing layers. With the processor word 16-bit wide word, such a board can sustain an input bandwidth of 10.24 Gbyte/s (80 MHz×2 bytes×64) and process the received information on each of the 64 channels with zero dead-time and a real-time algorithm of the complexity up to 20 steps. (It should be considered that up to 26 different operations can be executed at each step, including efficient operations of data exchange with neighboring channels).

With today's technology, it is not a problem to feed a 9U×5 HP (1 U=44.45 mm; 1 HP=5.08 mm) board from the front panel with digital information at 10.24 Gbyte/s, e.g. the information could be received by the board using currently available deserializer/receivers links from several vendors at 1.2 GHz. Possible choices for such deserializer devices include Hewlett Packard HDMP-1024, HDMP-1034 @1.2 Gbps, AMCC quad serial backplane serializer/deserializer device with single and dual I/O S2064/S2065 @ 1.25 GHz, and from VITESSE). Alternatively, by using the deserializer from AMCC-S3044 @ 2.4 GHz (this device requires a minimum network interface processor that can be implemented in FPGA, Lucent Technologies TC16-Type 2.5 Gb/s optical transmitter/receiver with 16 channels @ 155 Mb/s serializer/deserializer, or the use of links soon to become available for the short range at 10 GHz that are already available for the long range in telecommunications (see Lucent Technologies and/or Nortel), may also solve this problem.

Should the transmission distance exceed 30 meters @ 1.2 GHz (only 10 meters can be achieved with acceptable Bit Error Rate—BER—for transmission over copper @ 2.4 Gbps), then the more expensive optical fibers receivers should be coupled to the components mentioned above. As one can notice from the type of components listed above, not all vendors provide devices with functions of deserializing/receiving/demultiplexing, separated from the functions of serializing/transmitting/multiplexing. The same situation occurs when one of the above components has to be coupled with a fiber optic receiver. Also in this case we may find vendors that offer both functions (optical fibers receiver/transmitter) in a single component at a lower cost in some cases than the price of a component with a single function. Some examples of matching the previous deserializer/receivers with optical fibers receivers (or receiver/transmitter) are: Hewlett Packard HDMP-1024 with the optical transreceiver HFCT-53D5, AMCC-S3044 with the fiber optic receiver SDT8408-R, Lucent Technologies deserializer TRCV012G5 with the optical fiber transreceiver Netlight1417JA. Connectors carrying several fibers are provided by many vendors (e.g. from Methode).

The above deserializing/receiving components have matching components that can be found from the same vendors, which have the function of serializing/transmitting/multiplexing and optical fiber transmitting that are needed for transmission of the input data from the front-end electronics, or for the transmission of the output results from the 3D-Flow digital (or mixed-signal) processing board to the data acquisition system and higher level triggers. A few examples are: deserializer HDMP-1034, matched with serializer HDMP-1032, deserializer HDMP-1024, matched with serializer HDMP-1022, deserializer AMCC-S3044 coupled with the fiber optic receiver SDT8408-R matched with the serializer AMCC-S3043 coupled with the fiber optic transmitter SDT8028-T (this devices requires a minimum network interface processor that can be implemented in FPGA).

In the mixed signal application (option 1), only 80 analog signals (64 ECAL+16 HCAL, since each HCAL is equivalent to an area of 4 ECALs), converted to digital with 12-bit resolution in addition to 192 bits (1 preshower+2 Pads from muon station 1×64) are received by each board every 25 ns. This is not saturating the bandwidth of the 32-bit×64 channels=2048-bit every 25 ns bunch crossing that the 3D-Flow system could sustain.

However, the front-end electronic FPGA chips on the same board described in details in Section 5.4.2 (see Section 5.5.1 FIG. 24) increase the input bandwidth to the 3D-Flow system by formatting and generating the input trigger word to be sent to each of the 64 channels. More precisely, the FPGA trigger word formatter (see Section 5.4.2 and FIG. 15) reduces the ECAL information from 12-bit to 8-bit, and increases by duplicating information to different channels (e.g. sending the same 8-bit HCAL information to each of the 4 subtended ECAL blocks, and sending the same 2-bit Pads to 4 neighboring blocks), in order to save some bit-manipulation instructions to the 3D-Flow processors.

5.4.3.1.1 3D-Flow Mixed-Signal Processing Board (Option 1)

Features of the 3D-Flow mixed-signal processing board built in standard 9U×5 HP×340 mm dimensions (see FIGS. 24 and 25):
 converts 80 analog inputs (ADC 12-bit resolution), and produces 4 copies of each HCAL digitized value;
 Synchronizes 1728 inputs (12 bits ECAL, 12 bits HCAL, 1 PreSh, 2 Pads, ×64) every 25 ns;
 saves 1728 raw-data every 25 ns in a 128×1728 pipeline-stage digital buffer;
 processes data received from 64 trigger towers (or data received at a continuous input data stream of 10 Gbyte/s) and sends to the global level-0 trigger the information (tower ID, bunch crossing ID, and energy) of the clusters that passed the level-0 trigger algorithm;
 receives the global level-0 trigger and sends out the raw data of the corresponding accepted events;
 derandomizes accepted raw data into a FIFO;
 all 3D-Flow inter-chip Bottom to Top ports connections are within the board (data are multiplexed 2:1, PCB traces are shorter then 6 cm); all 3D-Flow inter-chip North, East, West, and South ports connections between boards and crates are multiplexed (8+2): 1 and are shorter than 1.5 meters;
 communicates with the host monitoring/control system via 16 RS-422 links to download user's algorithms into the processors and upload performance data (the status of all processors during 8 consecutive cycles) for monitoring purposes;
 communicates with the host monitoring/control system to download the FPGAs programming, to adjust signals synchronization, pipeline stages, FIFO buffer and trigger word formatter;
 communicates through 160 Low Voltage Differential Signaling (LVDS) links to North, East, West, and South neighboring boards.

What follows is a description of the board with its component list and assembly information The 3D-Flow mixed-signal processing board has on the front panel:
 three connectors for receiving digital raw data from the preshower and muon M1 detectors through six copper twisted pair links at 1.2 Gbps, receiver from Hewlett Packard HDMP-1034 (or HDMP-1024, dimension: 23 mm×17 mm);
 five 17-conductor coaxial ribbon cables (see catalog AMP No. 82158, pp. 5 and 12) for analog input (see FIG. 24) from electromagnetic, hadronic calorimeter, and from the control signal (reset, control A1, clear, clock, and global level-0 accept);
 17 bidirectional RS-422 links for monitoring the on-board 3D-Flow system and loading different circuits into the FPGAs
 one RJ45 connector carrying four high speed LVDS output signals to the global level-0 trigger decision unit;
 one optical fiber carrying out raw-data relative to the event accepted by the level-0 trigger decision unit. (e.g. Hewlett Packard transmitter at 1.2 Gbps HDMP-1022 (dimension: 23 mm×17 mm) coupled with the fiber optic transreceiver HFBR-53D5 (dimension: 39.6 mm×25.4 mm).

On the rear of the board are assembled alternately four 200 pin AMP-9-352153-2 (see catalog AMP No. 65911, p. 14) connectors with three 176 pin AMP-9-352155-2 connectors. The latter connectors have a key for mechanical alignment to facilitate board insertion. Of these, 1280 pins carry LVDS signals to neighboring 3D-Flow chips residing off-board in the North, East, West, and South direction; 48 pins are used for power and ground.

Starting from the left of the board (see FIG. 24), we have 80 analog preamplifiers P (half of the components are on the rear of the board as shown in FIG. 25), 80 analog to digital converters A (e.g. Analog Device AD9042 converting each analog input channel to 12-bit at 40 MHz). The converted data are then combined with the other digital information received from the other detectors (preshower and muon stations) into 16 FPGAs (4 channels fit into an ORCA Lucent Technologies 256-pin BGA OR3T30) for the purpose of synchronization, pipelining, derandomizing, and trigger word formatting.

Formatted data are then sent to the processor stack (see FIGS. 28, and 29), to be picked by the first available layer, according to the setting of the bypass switches (see FIG. 5), where the trigger algorithm is then executed.

At the bottom of the stack (see FIG. 29), the first layer of the pyramid checks whether a valid particle (electron, hadron, or photon) was found.

The entire board (64 channels) is designed to send to the global trigger decision unit an average of 40 bits of information of clusters validated by the trigger algorithm (tower ID, time stamp, and energies) at each bunch crossing, through four LVDS links at 400 Mbps on the J1 connector.

If the detector has higher occupancy so that any region of 64 channels could be expected to transmit to the global level-0 decision unit more than 40-bit per bunch crossing, then it would be sufficient to select a higher speed link (e.g., 1.2 Gbps). If the occupancy is still higher, the number of output links to the global trigger decision unit can be increased to the required level.

If on the other hand, 40-bit per bunch crossing per group of 64 were sufficient, then it would be simpler not to use the National Semiconductor serializer DS92LV1021, but rather have the North, East, West, or South ports of the 3D-Flow chip driver send the information directly to the global level-0 decision unit. In the present board, these serializer chips from National Semiconductor have been considered in order to make a conservative choice in terms of driving capabilities to three meters, while the 3D-Flow chip is required to drive only 1.5 meters on the LVDS I/O.

The board consists of surface-mounted devices assembled on both sides, with some free space not covered by components.

5.4.3.1.2 3D-Flow Digital Processing Board (Option 2)

The digital processing board carries on the mother-board 16 high speed receiver links at 2.4 Gbps (e.g., the set from AMCC-S3044 and the SDT8408-R optical fiber receiver which contains 16 sockets for mezzanine boards with the same set of components, or with the transmitter set AMCC-S3043 and the SDT8028-T (These devices require a minimum network interface processor that can be implemented in FPGA).

The user can install as many mezzanines as required (up to 16) for the application in order to optimize the cost. For example, one could use 16× receivers set on the mother board to sustain 5 Gbyte/s rate of data input to the board, and install 16× transmitter mezzanine boards that provides 5 Gbyte/s output. Another application may need instead to install 15× receiver mezzanine boards that together with the 16 on-board receivers provides 9.92 Gbyte/s input bandwidth, and only one transmitter mezzanine board for 320 Mbyte/s output data. This configuration will satisfy many high energy physics experiments where the real-time trigger algorithm achieves a substantial reduction.

As another example, the cmS (see the cmS experiment at CERN, http://cmsdoc.cern.ch/doc/notes/docs/NOTE1998_074 W. Smith, et al. "CMS Calorimeter Level-1 Regional Trigger Conceptual Design." cmS NOTE-1998/074) calorimeter level-1 trigger (currently implemented in 19 crates (9U) using a different approach, while it will require only 5 crates (9U) if the 3D-Flow approach would be used), requires to receive only 18-bits from each trigger tower (electromagnetic, hadronic, fine grain, and characterization bit). Thus only 5 additional mezzanine fibers and receiver modules must be installed. One board can process 64 trigger towers and send to the global level-1 trigger decision unit the particles ID, time stamp and energy information of the particles validated locally by the trigger algorithm. Subsequently, it can provide the raw-data of the particles validated by the global level-1 trigger. This scheme has the advantage of flexibility: If the experiment later requires not only changing the level-0 (or level-1) trigger algorithm, but also increasing the number of bits (information) used in the level-0 (or level-1) trigger algorithm, this can be done without redesigning the hardware. In the case of the cmS calorimeter trigger algorithm, by using the digital processing board of the 3D-Flow approach, the user can, in the future increase, the number of bits from each trigger tower from 18 to 31 before being required to redesign the hardware.

Features of the 3D-Flow digital processing board, built in standard 9U×5 HP×340 mm dimensions (see FIGS. 26, 27):
input 1024 digital inputs and outputs 1024 digital output every 25 ns, or any combination of I/O having a total of 2048 I/O and a minimum of 1024 inputs every 25 ns;
synchronizes up to 2048 inputs every 25 ns from different detectors (electromagnetic, hadronic, preshower, and M1)
saves up to 2048 raw-data every 25 ns in a 128×2048 pipeline-stage digital buffer;
processes data received from 64 trigger towers (or data received at a continuous input data stream of 9.92 Gbyte/s) and sends to the global level-0 (or level-1) trigger the information (trigger tower ID, time-stamp, and energy) of particles that passed the level-0 trigger algorithm;
receives the global level-0 trigger accepts and sends out the raw data of the corresponding accepted events;
derandomizes accepted raw data into FIFO;
all 3D-Flow inter-chip Bottom to Top ports connections are within the board (data are multiplexed 2:1, PCB traces are shorter then 6 cm); all 3D-Flow inter-chip North, East, West, and South ports connections between boards and crates are multiplexed (8+2):1 and are shorter than 1.5 meters;
communicates with the host monitoring/control system via 16 RS-422 links to downloads user's algorithms into the processors and upload performance data (the status of all processors during 8 consecutive cycles) for monitoring purposes;
communicates with the host monitoring/control system to downloads the FPGAs programming, to adjust signals synchronization, pipeline stages, FIFO buffer and trigger word formatter;
communicates through 160 LVDS links to North, East, West, and South neighboring boards.

What follows is a description of the board with its component list and assembly information.

The 3D-Flow digital processing board has on the front panel:
16 optical fibers of receivers, each at 2.4 Gbps installed on the motherboard and 16 optional optical fibers (transmitter or receivers) installed on the mezzanine boards (receiver SDT8408-R, dimension: 15.24 mm×36.4 mm, with the deserializer AMCC-S3044, dimension: 17 mm×17 mm, both at 2.5 Gbps and transmitter SDT8028-T, dimension: 15.24 mm×36.4 mm, with the serializer AMCC-S3043, 17 mm×17 mm). These devices require a minimum network interface processor that can be implemented in FPGA;

17 bidirectional RS-422 links for monitoring the on-board 3D-Flow system and loading different circuits into the FPGAs;

one RJ45 connector carrying four high speed LVDS output signals to the global level-0 trigger decision unit.

On the rear of the board are assembled alternately four 200 pin AMP-9-352153-2 connectors with three 176 pin AMP-9-352155-2 connectors. The latter connectors have a key for mechanical alignment to facilitate board insertion. Of these, 1280 pins carry LVDS signals to neighboring 3D-Flow chips residing off-board in the North, East, West, and South directions; 48 pins are used for power and ground.

The mezzanine board is built with four PAL16P8 (high speed, 5n pin-to-pin, or fast PLD) for the purpose of demultiplexing the 16-bit at 155 MHz provided by the AMCC-S3044 into 32-bit at 77.5 MHz. These additional PALs are needed at least until When the FPGAs at 160 MHz will become available and the signals from the AMCC chip could be sent directly to the FPGA chip. The reason for installing the 4 µL on the mezzanine board is to lower the high frequency through connectors (77.5 MHz in the place of 155 MHz). This will allow for lower cost connectors to be used.

The digital data (from the electromagnetic and hadronic calorimeter, preshower and muon) are sent into 16 FPGAs (4 channels fit into an ORCA 256-pin BGA OR3T30) for the purpose of synchronization, pipelining, derandomizing, and trigger word formatting.

Formatted data are then sent to the processor stack (see FIGS. 28 and 29), to be picked by the first available layer, according to the setting of the bypass switches (see FIG. 5), where the trigger algorithm is then executed. At the bottom of the stack, the first layer of the pyramid checks whether a valid particle (electron, hadron, or photon) was found.

The output of the particle found locally by the trigger algorithm (tower ID, time stamp, and energies) are sent out to the global level-0 decision unit through an RJ45 connector carrying four LVDS links at 400 Mbps. The same consideration that was made for the mixed-signal processing board described in Section 6.1 on the number of bits sent to the global level-0 decision unit that is related to the detector occupancy, applies also to this board.

The raw-data of the events validated by the global level-0 trigger are sent out to the higher level trigger system and DAQ, through the installed transmitter mezzanine boards. The necessary number of transmitter mezzanine boards should be installed in order to sustain the volume of raw-data information needed to be sent out.

Boards contain surface-mounted devices assembled on both sides, with some free space not covered by components.

5.4.3.1.3 Logical-to-Physical Layout of 64 Channels/10 Layers on the 3D-Flow Board The optimized layout of the 3D-Flow PC board needs to take into account the need to communicate both with neighboring processors in the same layer (NEWS ports), as well as along the successive layers (Top and Bottom ports). In the current implementation, each layer is represented by 4 IC's (64 channels per board, 16 processors per IC). Each stack consists of 12 layers, i.e. 10 layers of actual pipelined algorithm execution (as discussed in Section 2, and in Section 6.5) followed by two more layers to provide the first stages of data funneling (the "pyramid").

One key element to keep in mind is that, while data transfer among layers occurs at every clock cycle, only about 10% of the time, data are exchanged within the same layer. These considerations have led to the layout shown in FIG. 28.

Sequential numbers of chips on the board physical layout (left of FIG. 28) indicate chips in the same x/y position in the logical scheme (right of FIG. 28) corresponding to the position in subsequent layers, while chips numbered 1, 13, 25, and 37 correspond to the 64 processors of the first layer of the 3D-Flow system that are connected to the FPGAs which send the formatted trigger word of the detector's data.

The chips corresponding to the first layer (labeled 1, 13, 25, and 37) are positioned in the central column of the board, while the remaining elements of each stack (2 to 12, 14 to 24, etc.) follow the arrowhead pattern shown in FIG. 28 (note that chips 9-12, 21 to 24, etc., are positioned on the board's opposite side, as shown in FIG. 29).

This layout allows for each group of 16 processors to keep the minimum PCB trace distance for the Bottom to Top connection between chips belonging to different layers.

All 3D-Flow inter-chip Bottom to Top ports connections are within the board (data are multiplexed 2:1, PCB traces are shorter than 6 cm), while all 3D-Flow inter-chip North, East, West, and South ports connections between boards and crates are multiplexed (8+2):1 and are shorter than 1.5 meters.

5.4.3.1.4 On-Board Data-Reduction, Channel-Reduction and Bottom-to-Top Links

FIG. 24 shows the relation between the logical layout of a stack of 3D-Flow chips, its implementation in hardware, and the functionality performed by processors in different layers in a stack.

The left bottom part of FIG. 28 shows the top part of the mixed-signal processing board (front and rear), whereas the chip arranged in a logical position are shown in the right part of the figure.

The layout immediately shows that bottom to top connection can be kept within 6 cm, allowing minimum latency in data propagation in a synchronous system at 80 MHz.

Processor number 1 receives the trigger word data from the FPGA (or detector data). Up to two 16-bit words of information can be received by processor 1 at each bunch crossing. During the subsequent clock cycles, processor 1 executes the user trigger algorithm (including data exchange with its neighbors on the same layer, on-board, or off-board, or off-crate.

The interconnection between neighboring elements, typical of the 3D-Flow architecture, allows to implement, within the same board design and just by reprogramming the processors, searches for energy deposition in 2×2, 3×3, 4×4, 5×5, 7,7, etc., clusters of neighboring calorimeter elements.

After a layer of processors has received the data relative to one bunch crossing (or, more in general, one "frame"), further incoming data are bypassed (according to the setting of the bypass switches) to the next layer of processors (as shown in FIG. 5). After 10 bunch crossing, the next set of data is fetched again by the processor of layer 1, which in the mean time have finished the execution of the algorithm, placed the result in a local output FIFO buffer. The same clock cycle used to fetch the input data is also used to transmit the results of the previous calculation to the bottom port.

This same board design could easily be adapted to situations where, because of simpler algorithms, less than ten layers are required to keep up with the incoming data. In this case, one would have a not fully populated board, with jumpers to bypass the unused locations (See FIG. 30 and next section). The number of connections for the inter-boards and inter-crates North, East, West, and South will also be reduced to the number of layers used by the simpler algorithm, thus not requiring to install all cables with RJ45 connectors.

As the outcome of the process described above, the results applying the trigger algorithm to the data of each bunch crossing arrive every 25 ns to the processors in the first layer of the pyramid (layer 11). Their tasks is to check whether an event of interest (high PT electron, photon or hadron) has been reported. In the affermative case, time stamp, and block ID are attached to the results, and the full information is forwarded to the next layer (layer 12).

Layer 12, the "base" of the channel-reduction pyramid, receives at most a few validated candidates at every bunch crossing. Only two of the four layer-12 chips are connected, via the Bottom to Top ports, to the next layer 13, containing only two chips.

The accepted candidates are first routed internally, within layer 12, to the "exit points," from where they are transmitted to the next layer 13 (see center of FIG. 25, and FIG. 27, 3D-Flow chips). The channel-reduction process is going to layers of fewer and fewer channels, until the results are sent to the global level-0 trigger unit

5.4.3.1.5 Details of the On-Board Bottom-to-Top Links (6 cm)

In order to keep the distance from the bottom port to the top port to a minimum, the pin assignment of the 3D-Flow needs some considerations.

There are 16 processors on a chip; all 16 processors have top and bottom port signals multiplexed 2:1 connected to the pins of the chip (600-pin EBGA @ 2.5 Volt, with dimensions of 40 mm×40 mm and a pitch spacing between balls of 1.27 mm could be reduced next year to 1 mm pitch providing a 676-pin EBGA @ 1.8 Volt, with dimensions of 27 mm×27 mm). Moreover, 12 processors also have some of the North, East, West and South ports connected to the pins. (The other connections between NEWS ports are internal to the chip.)

For each of the 16 processors (see FIG. 30), the top-bottom ports are kept within a group of 25 pins (8-data lines and 2 control lines for the top port, and 8 data lines and 2 control lines for the bottom port; the remaining 5 pins are reserved for VCC and GND). Furthermore, the pin of Bit-0 of the top port is adjacent to the pin of bit-0 of the bottom port, and so on for all bits.

This could be of some advantage to the user who might not need to populate the entire board of 3D-Flow chips because of a simpler and faster trigger algorithm. In such a case, a simple jumper between the top and bottom ports would avoid the need to redesign the entire board.

For the 12 processors that have some NEWS ports connected to the pins of the chip, only a group of five pins is necessary; two transmit, two receive, and one is used either for VCC or for GND, depending on whether there are more neighboring pins of one type or another in a given area. The presence of two twisted-pair links enables simultaneous communication of data in both directions. In the case of very complex algorithms requiring little neighboring communication but longer programs, one could limit the communication to one direction at a time, saving 50% of the links and thus having for the same number of connections on the backplane twice as many layers in the 3D-Flow system.

5.4.3.1.6 Crate(s) for 3D-Flow Systems of Different Sizes

A 3D-Flow system of any size can be built even if it exceeds the number of channels that can be accommodated into a single crate.

5.4.3.1.6.1 Crate Backplane LVDS Links Neighboring Connection Scheme

FIG. 31, bottom right, shows how 6144 channels receiving signals from sensors from different subdetectors are mapped onto the boards in the needed set of crates, while on the left is shown the corresponding physical layout of the boards within the crate.

In order to minimize the connection lengths, the first board in a crate is followed immediately by the board containing the "below" processors (that was called "south" in the 3D-Flow nomenclature), and then by the "right" ones (e.g., the board 18, to the right of 17, in the physical layout occupies the position below board 17 in the logical layout, while next board (19) will be to the left of 18 in the physical layout and to the left of 17 in the logical layout, and so on). The corresponding backplane connectors link the bottom part of each odd-numbered board (3D-Flow south) to the top (3D-Flow north) of the even-numbered to its right, while the East-West links run between either even to even or odd to odd board-locations.

Since there are 10 layers of processors in a stack and each layer has four links to each direction (for a total of 16 links per layer), the 160 LVDS links are required from one board to its neighbor in any NEWS direction. Each LVDS link has two wires, thus requiring a total of 320 pins in each direction.

5.4.3.1.6.2 Number of NEWS Links for the Chip-to-Chip, Board-to-Board, Crate-to-Crate FIG. 32 summarizes the number of LVDS links between chip-to-chip, board-to-board, and crate-to-crate.

5.4.3.1.7 Implementation of the Backplane Crate-to-Crate LVDS Links (Option 1)

One option in the implementation of the interconnection scheme shown in FIG. 33 is to use AMP-646372-1 and AMP-646373-1 long feedthrough pins (through the backplane printed circuit) connectors.

At the rear part of the backplane one can insert female connectors into the long feedthrough pins, as shown at the left-bottom of FIG. 33 (Courtesy of AMP. Catalog 65911). The male shroud fitted with snap latches secures the female connector, preventing it from being accidentally pulled out. Even though this solution is compact and elegant, it is not very practical; it is difficult to find parts because it is not of a standard construction, and it is also very expensive.

5.4.3.1.8 Implementation of the Backplane Crate-to-Crate LVDS Links (Option 2)

This solution of option 2 is very low in cost and it is practical because it makes use of parts that are widely used in consumer computer electronics. The final aspect, however, will not look much different from the racks of the local area network (with many panels with female RJ-45 connectors and many RJ-45 cable/connectors) of a large company or of an internet service provider.

At the rear connector of each board (front-board), a second board (rear-board) is inserted into the long feedthrough pins of connectors AMP-646372-1 and AMP-646373-1. There will be no electronics on this rear-board—just female connectors RJ-45. Since the RJ-45 are widely used, they come in blocks of 8, or 4 assembled for printed circuit mounting. For each rear board two rows (positioned as shown in FIG. 34 to allow insertion of the male connector in between the two rows) of RJ-45 connectors (each with 20 female RJ-45 connectors) are needed. Each row is made of two parts AMP 557573-1 and one part 557571-1.

The rear-board will have only two blocks (out of seven male connectors installed on the backplane) of female connectors AMP 646372-1 or AMP 646373-1 on the backplane side, since only 320 pins are needed to carry 160 LVDS links to the board on the neighboring crates.

Should the overall 3D-Flow system need to be expanded to the east and west, the two boards at the far right and at the far left of the crate will make exceptions in having RJ-45 female connectors assembled on both sides, and they will have two more female connectors AMP-9-352153-2, or AMP-9-352155-2 on the backplane side, since they have to carry 160 links to the West, and/or to the East crates.

The total number of cables to the north and south crates will then be 640, while the cables to the east and west crates will number only 40. In the case of applications requiring a simpler real-time algorithm (e.g., requiring less then 20 steps, that is equivalent to 10 layers of 3D-Flow processors), than the number of connections for the inter-boards (north and south), and inter-crates (east and west) will also be reduced to the number of layers used by the simpler algorithm, thus not requiring all cables to with RJ45 connectors be installed (e.g., applications requiring only 9 layers of 3D-Flow processors will save 64 cables to the north, 64 to the south, 4 to the east, and 4 to the west crates).

The cable used for this solution can be found at any computer store. Such cables come assembled at different lengths (in our case, a standard 3 feet is needed), with two male connectors at both ends and tested at different categories for different speeds. The cost would be about $2 each.

5.4.3.1.9 The 3D-Flow Crate for 9U Boards

The 3D-Flow crate is built in such a way that allows connection of several crates to the four directions (North, East, West, and South—NEWS) in order to allow the user to build 3D-Flow systems of any size while keeping the maximum distance between components to less than 1.5 meters. It is very important to keep the maximum distance as short as possible in synchronous systems and where the overall performance depends on the data exchange with neighboring elements.

FIG. 34 shows the 3D-Flow crate as a modular part of a larger 3D-Flow system made of several crates. The overall features of a crate are based on the number of channels and the 3D-Flow processor speed. A conservative choice of components and technology sets the number of channels at 1024 (64 per board) and the processor speed at 80 MHz.

In summary, a 3D-Flow crate, built in standard 9U×84 HP×340 mm dimensions, accommodating 16 mixed signals processing 3D-Flow boards has the following features:

Backplane Communications Within the Crate:
The backplane of the crates establish the communication of four groups of 320-pins from the connectors of each of the 16 board with the neighboring (and off-crate) boards. The above connections implement the North, East, West and South 3D-Flow connection scheme. The backplane connectors link the bottom part of each odd-numbered board (3D-Flow south) to the top (3D-Flow north) of the even-numbered (board or connector) to its right, while the East-West links run between either even to even or odd to odd board-locations (See FIG. 31).

Off-Crate Communications:
communicates through 1280 LVDS links to North and South crates. In the case of applications requiring simpler real-time algorithm (e.g., requiring less than 20 steps, that is equivalent to 10 layers of 3D-Flow processors), the number of connections for the inter-boards (north and south) will also be reduced to the number of layers used by the simpler algorithm, thus not requiring all cables with RJ45 connectors to be installed (e.g., applications requiring only 9 layers of 3D-Flow processors will save 32 cables to the north and 32 to the south crates).

communicates through 160 LVDS links to East and West crates. For the same reason explained above, a simpler algorithm that does not require all 10 layers of 3D-Flow PEs will reduce the number of cables required to the east and west crates (e.g., applications requiring only 9 layers of 3D-Flow will save 4 cables to east and 4 cables to west)

5.4.3.2 EXAMPLE 2

VME 6U Boards/Crates

Figure 1:
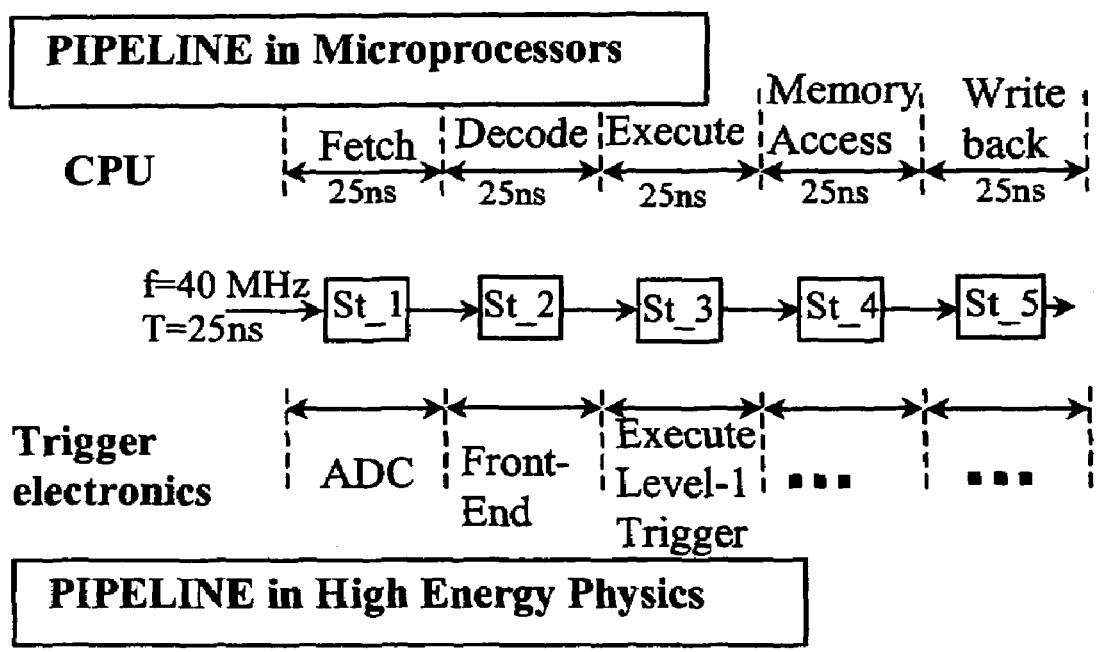
Figure 2:
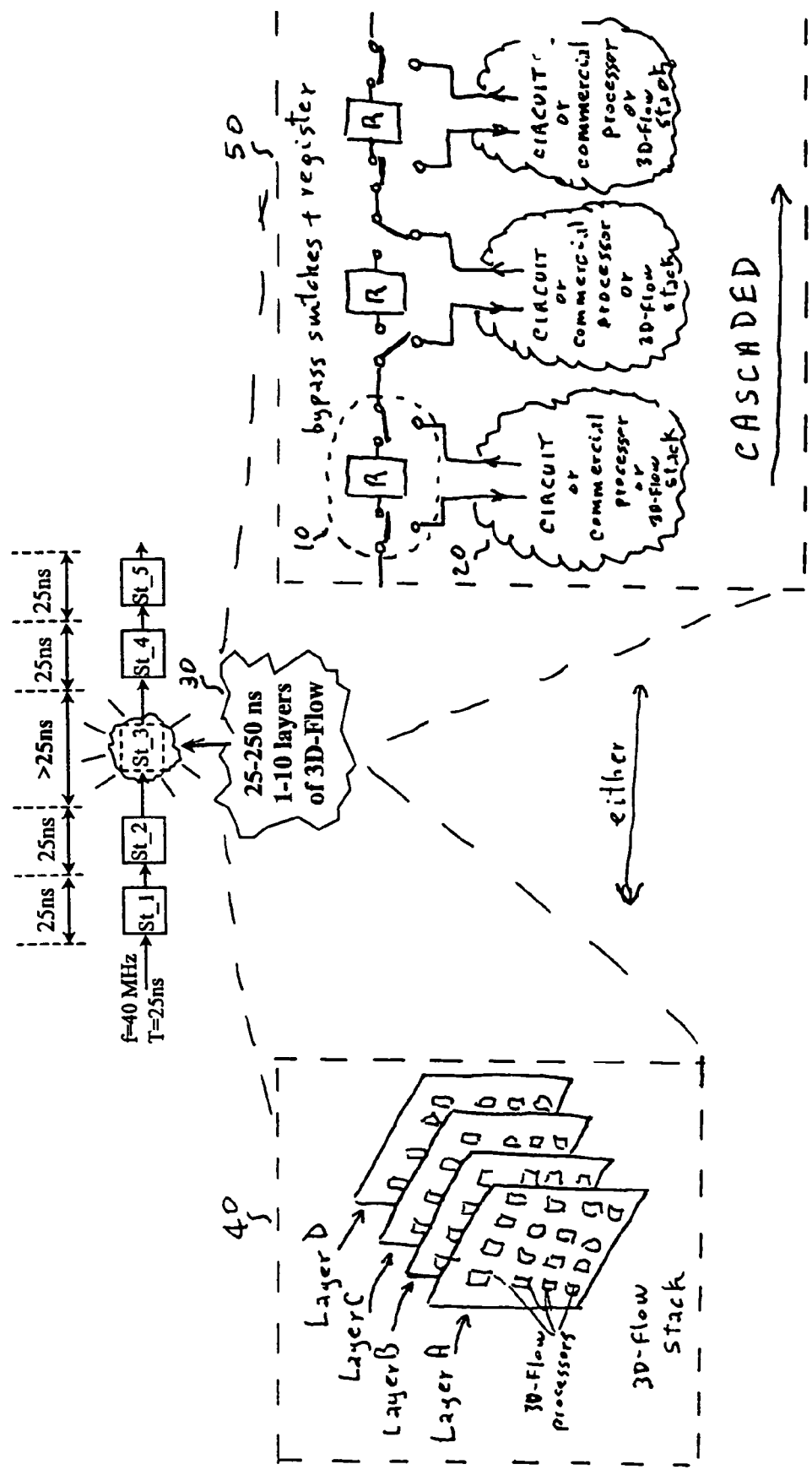
Figure 3:
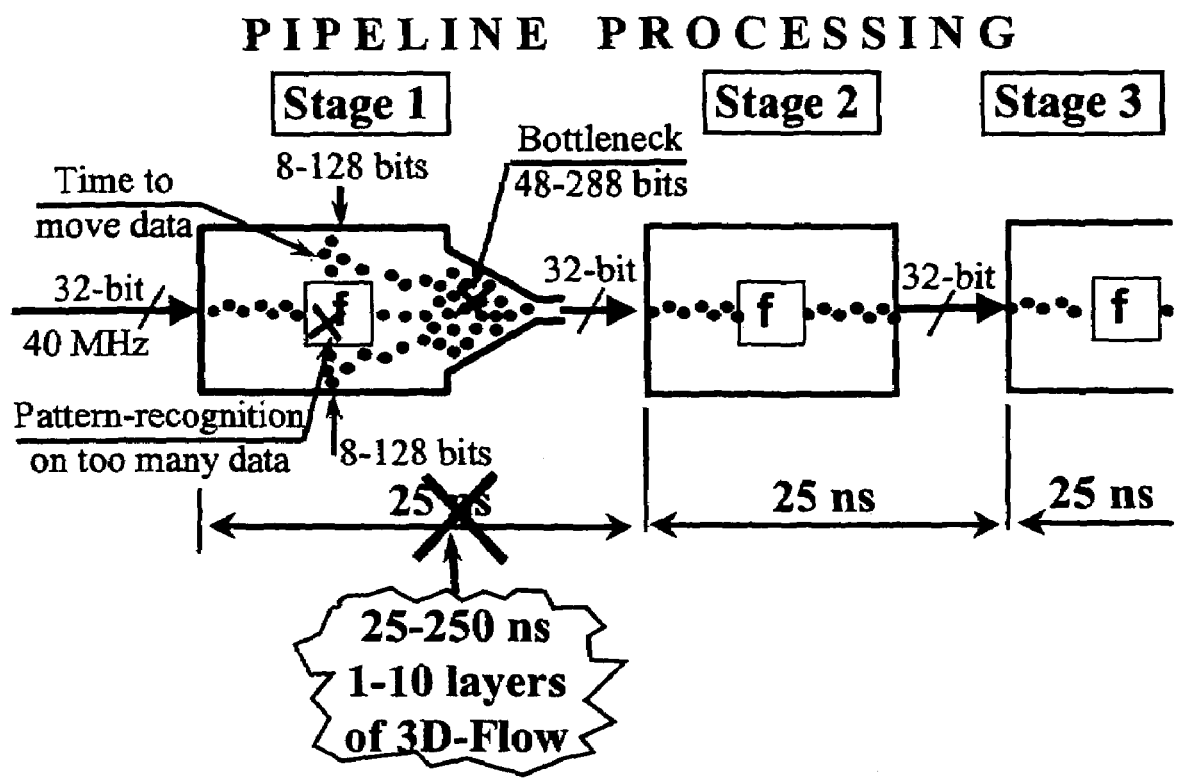
Figure 4:
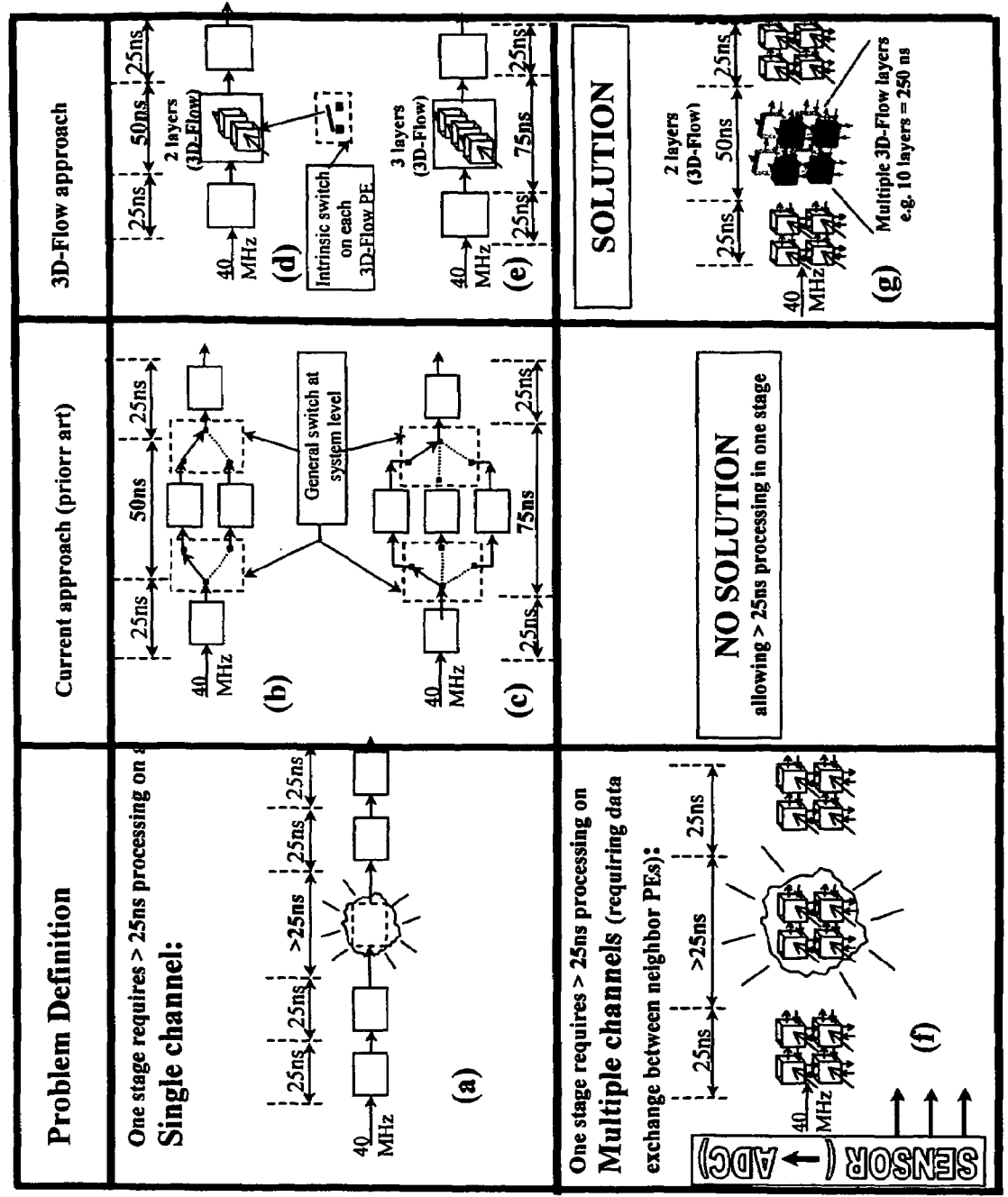
Figure 5:
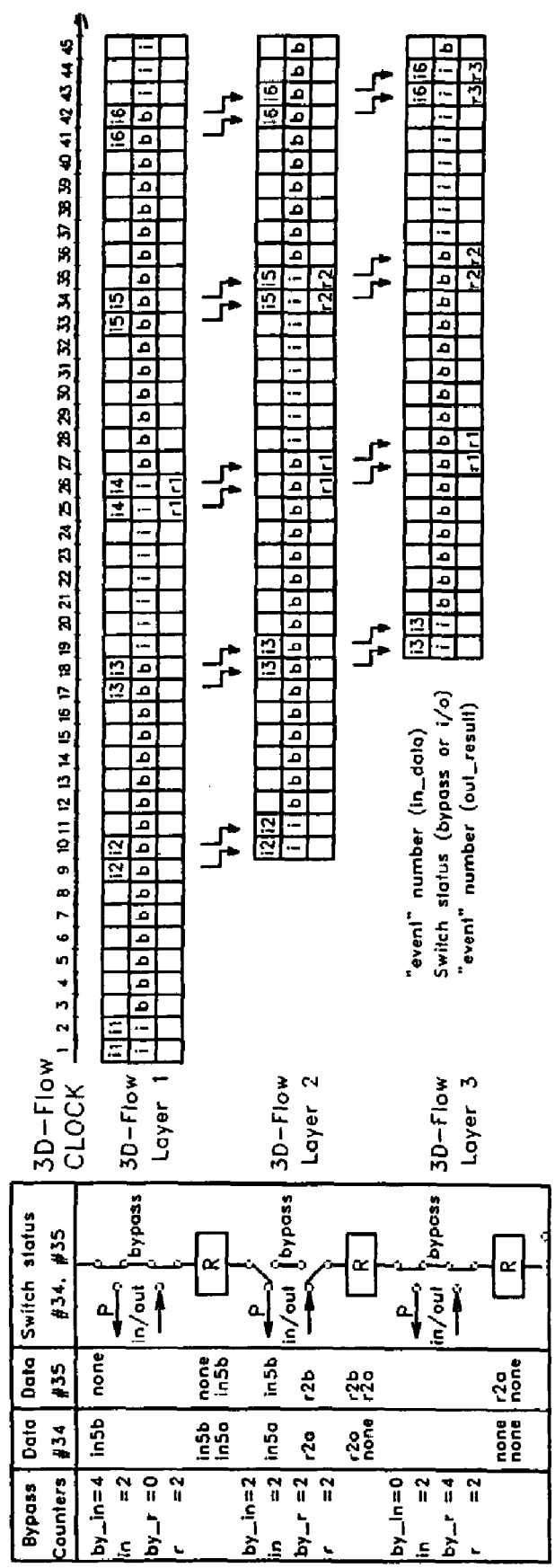
Figure 6:
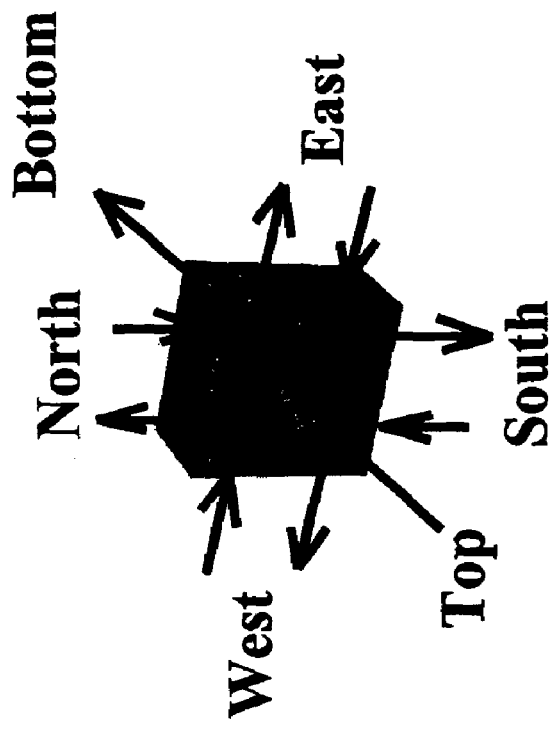
Figure 7:
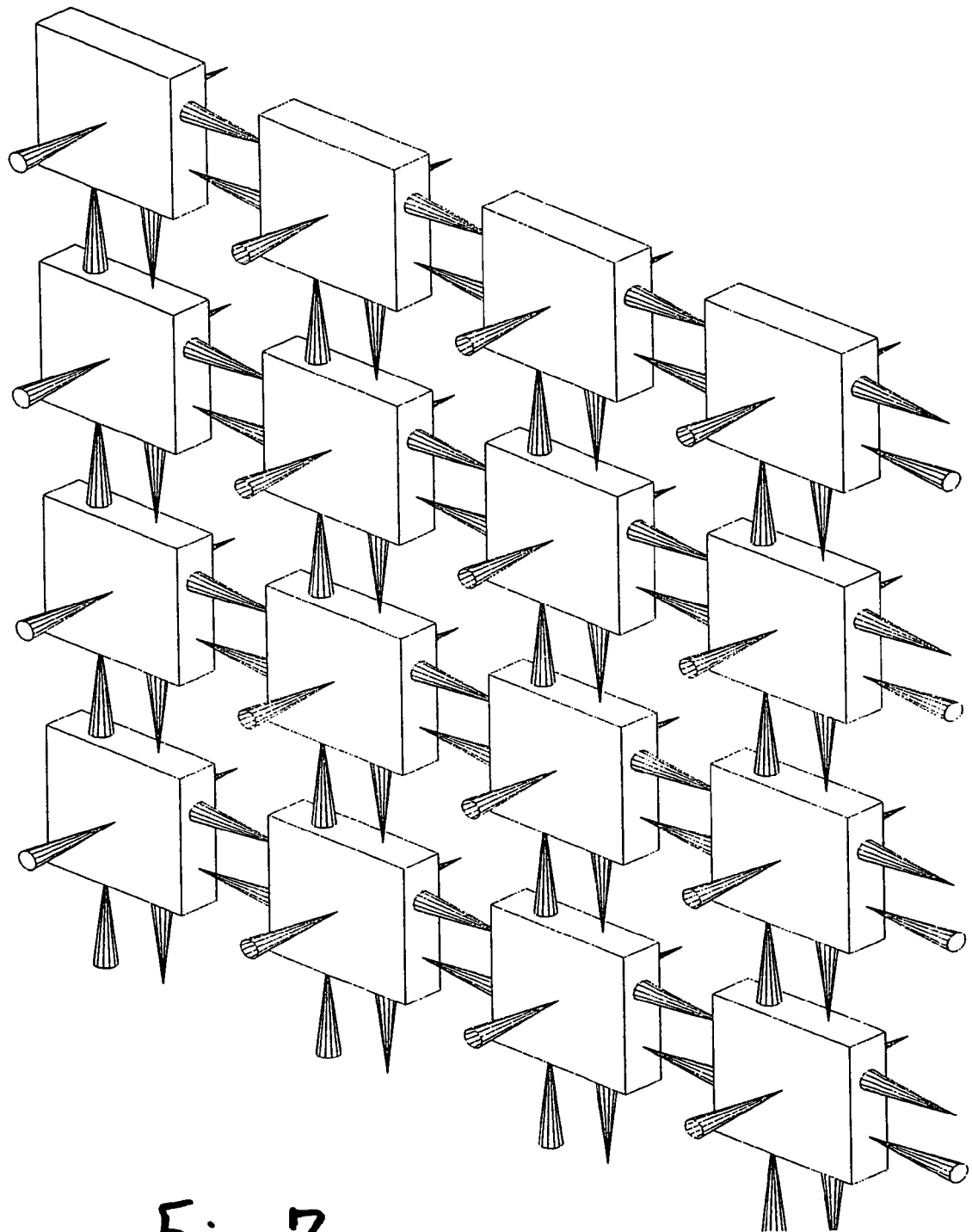

A crate with 16 such board will be sufficient for implementing the PET/SPECT/CT application described in Section 5.5.2.

5.4.3.3 EXAMPLE 3

IBM PC Compatible Boards/Crates

FIG. 38 shows the front and rear view of a mixed-signal 6U VME board accommodating 32 channels processed by a stack of 5 layers of 3D-Flow processors with a 3 layers filtering and channel funneling partial 3D-Flow pyramid.

A crate with 16 such board will be sufficient for implementing the PET/SPECT/CT application described in Section 5.5.2.

5.4.4 Software Development Tools 5.4.4.1 Design Real-Time: The Interface Between Application, FPGA, and ASIC for a System Designer The "link" between the third-party tools and the requirements of very high-speed real-time applications (with large volumes of data to be correlated and processed in parallel), such as the one of the HEP experiments, is provided by the "Design Real-Time 2.0 tools."

The 3D-Flow Design Real-Time is a set of tools that allows the user to:
create a new 3D-Flow application (called project) by varying size, throughput, filtering algorithm, and routing algorithm, and by selecting the processor speed, lookup tables, number of input bits and output results for each set of data received for each algorithm execution;
simulate a specified parallel-processing system for a given algorithm on different sets of data. The flow of the data can be easily monitored and traced in any single processor of the system and in any stage of the process and system;
monitor a 3D-Flow system in real-time via the RS232 interface, whether the system at the other end of the RS232 cable is real or virtual, and
create a 3D-Flow chip accommodating several 3D-Flow processors by means of interfacing to the Electronic Design Automation (EDA) tools.
A flow guide helps the user through the above four phases.
A system summary displays the following information for a 3D-Flow system created by the Design Real-Time tools:
characteristics, such as size, maximum input data rate, processor speed, maximum number of bits fetched at each algorithm execution, number of input channels, number of output channels, number of layers filtering the input data, number of layers routing the results from multiple channels to fewer output channels;

time required to execute the filtering algorithm and to route the results from multiple channels to fewer output channels.

A log file retains the information of the activity of the system when:
loading all modules in all processors;
initializing the system;
recording all faulty transactions detected in the system (e.g., data lost because the input data rate exceeded the limit of the system or because the occupancy was too high and the funneling of the results through fewer output channels exceeded the bandwidth of the system);
recording any malfunction of the system for a broken cable or for a faulty component.

A result window can be open at any time to visualize the results of the filtering or pattern recognition algorithm applied to the input data as they come out at any layer of the system.

The generation of test vectors for any processor of the system can be selected by the user at any time to create the binary files of all I/Os corresponding to the pins of a specific FPGA or ASIC chip. These vectors can then be compared with those generated by the chip itself or by the VHDL simulation.

5.4.4.2 Interrelation Between the Entities in the Real-Time Design Process

Figure 39:
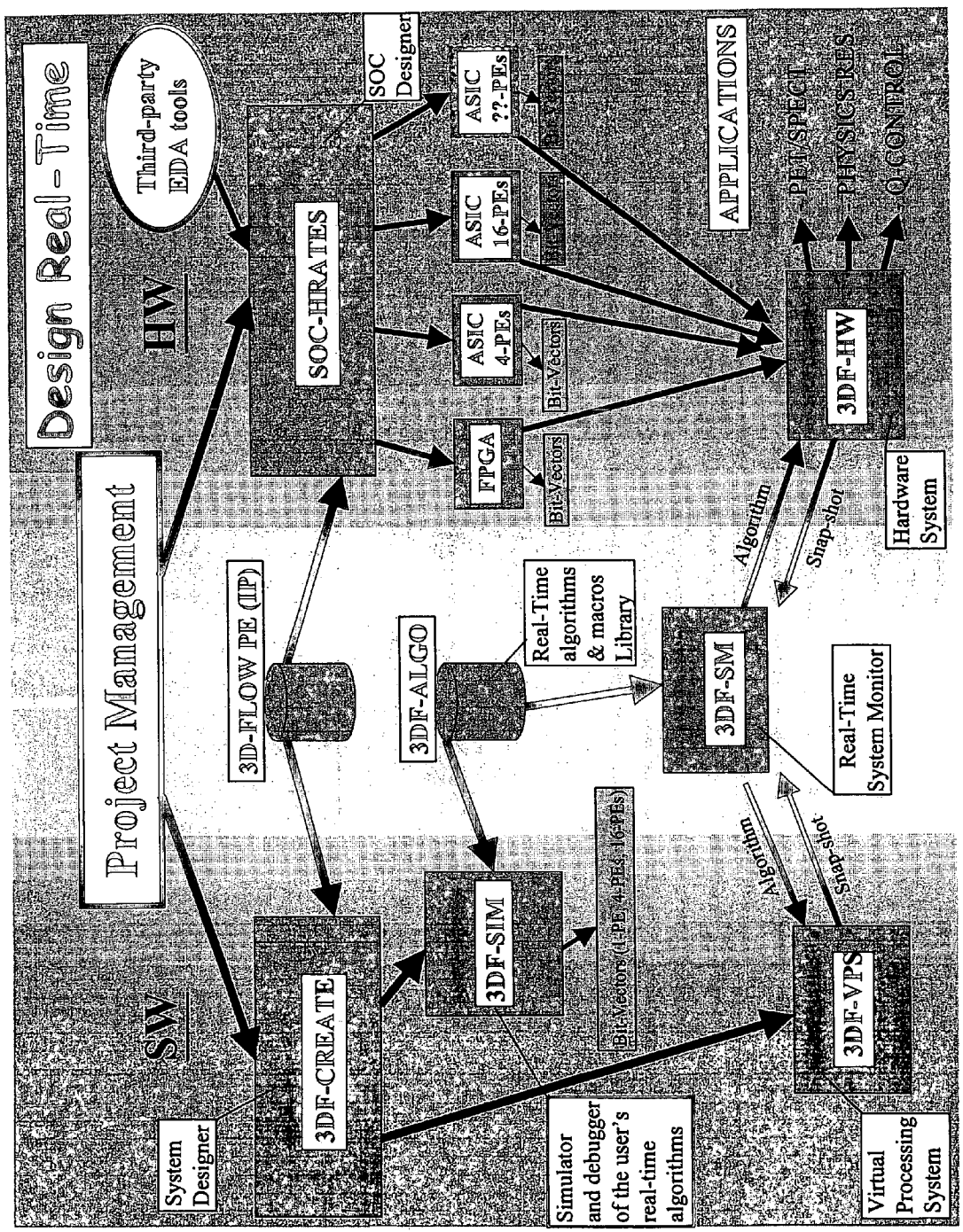

FIG. 39 is separated into two sections. On the left is shown the flow of the software design and simulation process to create and simulate a 3D-Flow system, on the right is shown the System-On-a-Chip for High-speed Real-time Applications and TESting (SOC-HRATES) hardware design process. The center of the figure shows the common entities of the system:

1. the IP 3D-Flow processing element as the basic circuit to which has been constrained the functionality required by different applications;
2. a set of 3D-Flow real-time algorithms and macros organized into a library;
3. the System Monitor software package that allows the user to monitor each 3D-Flow processor of the 3D-Flow system (hardware or VPS—Virtual Processing System—), via RS-232 lines. The System Monitor (SM):
    a) performs the function of a system-supervising host that loads different real-time algorithms into each processor during the initialization phase;
    b) detects malfunctioning components during run-time. (A sample of data is captured at the processor speed of 80 MHz at a preset trigger time for 8 consecutive cycles (called snap-shot), and is transferred at low speed (at the RS-232 speed of 230 KBaud) to the System Monitor for debugging and/or monitoring);
    c) excludes malfunctioning processors with software repair by downloading into all neighbors a modified version of the standard algorithm, instructing them to ignore the offending processor.

The "3DF-CREATE" software module allows the user to:
1. define a 3D-Flow system of any size;
2. interconnect processors for building a specific topology with or without the channel reduction stage ("pyramid");
3. modify an existing algorithm or create a new one. The complexity of the real-time algorithms for the first levels of trigger algorithms in HEP experiments, have been examined and fewer than 10 layers (corresponding to 20 steps, each executing up to 26 operations) of 3D-Flow processors are required;
4. create input data files to be used to test the system during the debugging and verification phase.

During the usual procedure to create a 3D-Flow system to solve an application problem, the user typically defines a size in "x" and "y" of the 3D-Flow system, based on the size of the detector to be interfaced, its number of channels, the number of bits per channel, and the correlation required between signals that is defined by the trigger algorithm.

The third dimension, "z", of the 3D-Flow system is determined by the complexity of the real-time algorithms (for the first levels of trigger algorithms in HEP experiments) such as the ones reported in the TP. Several algorithms have been examined and fewer than 10 layers are required.

The "3DF-SIM" module allows for simulation and debugging of the user's system real-time algorithm and generates the "Bit-Vectors" to be compared later with the ones generated by the third-party silicon foundry tools.

The "3DF-VPS" module is the Virtual Processing System that emulates a 3D-Flow hardware system.

The right side of FIG. 39 shows the hardware flow of the 3D-Flow system implementation in a System-On-a-Chip (SOC). The same common entity, the IP 3D-Flow processing element (PE), shown in the center of the figure and previously used as the behavioral model in the simulation, is now synthesized in a specific technology by using the same code.

The number of chips required for an application can be reduced by fitting several PE's into a single die. Each PE requires about 100K gates and the gate density increases continually. Small 3D-Flow systems may fit into a chip. For this reason, it is also called SOC 3D-Flow. However, when an application requires the building of a 3D-Flow system that cannot be accommodated into a single chip, several chips each accommodating several 3D-Flow PEs can be interfaced with glueless logic to build a system of any size to be accommodated on a board, on a crate, or on several crates 5.4.5 The Verification Tools The Design Real-Time tools offer the user the possibility to test, at the gate-level, the same system that was designed previously to solve a specific application and that was simulated before using a behavioral model.

Currently, the single 8-bit internal bus 3D-Flow PE version has been synthesized for FPGA, and four PEs with a 16-bit internal bus version have been synthesized for 0.5 $\Box$m and 0.35 $\Box$m technologies. Bit-Vectors generated by third-party tools have been compared with the Bit-Vectors generated by the 3D-Flow system simulator.

Figure 40:
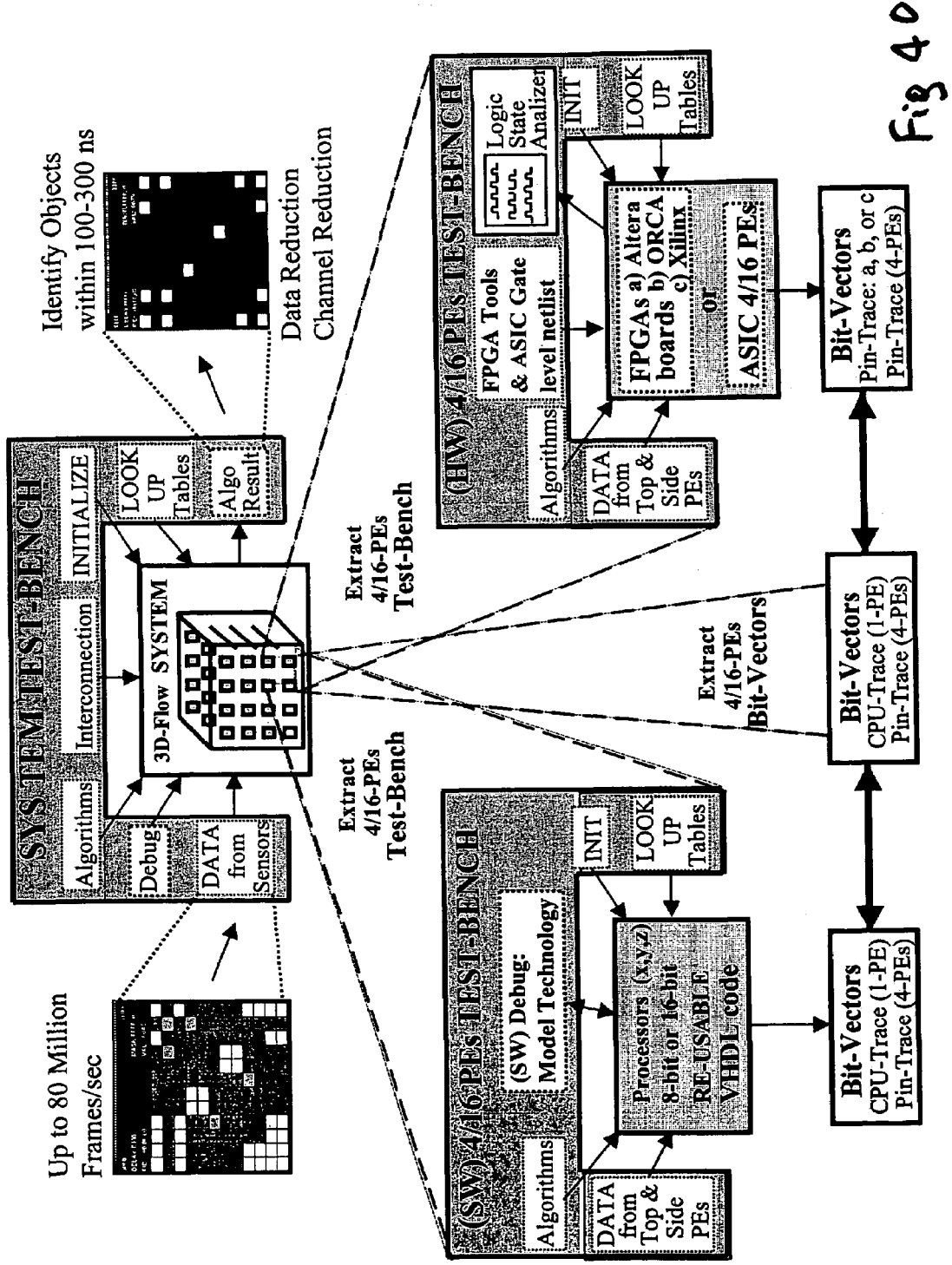

The verification process of an entire 3D-Flow system can be performed completely. It is just a matter of simulation time. The steps to be performed are those shown in FIG. 40.

The 3D-Flow system simulator:
extracts the input data for the selected 3D-Flow processor (or group of processors) for which has been created an equivalent hardware chip targeted to a specific technology (at present, one PE is targeted to FPGAs and four PEs are targeted to 0.5 and 0.35 $\Box$m technologies), and
b) generates the Bit-Vectors for the selected processor (s);

The same input data and the same real-time algorithm are applied to the hardware 3D-Flow model, and the simulation is performed using the third-party tools;

Bit-Vectors generated by the third-party tools using the hardware model are compared with the Bit-Vectors obtained by the previous software simulation;

Discrepancies are eliminated.

In reality, when a 3D-Flow system is made up of thousands of 3D-Flow processors, not all the single processors (or the group of four processors) of the entire system are simulated, but only the processors of the system that execute different algorithms.

Figure 41:
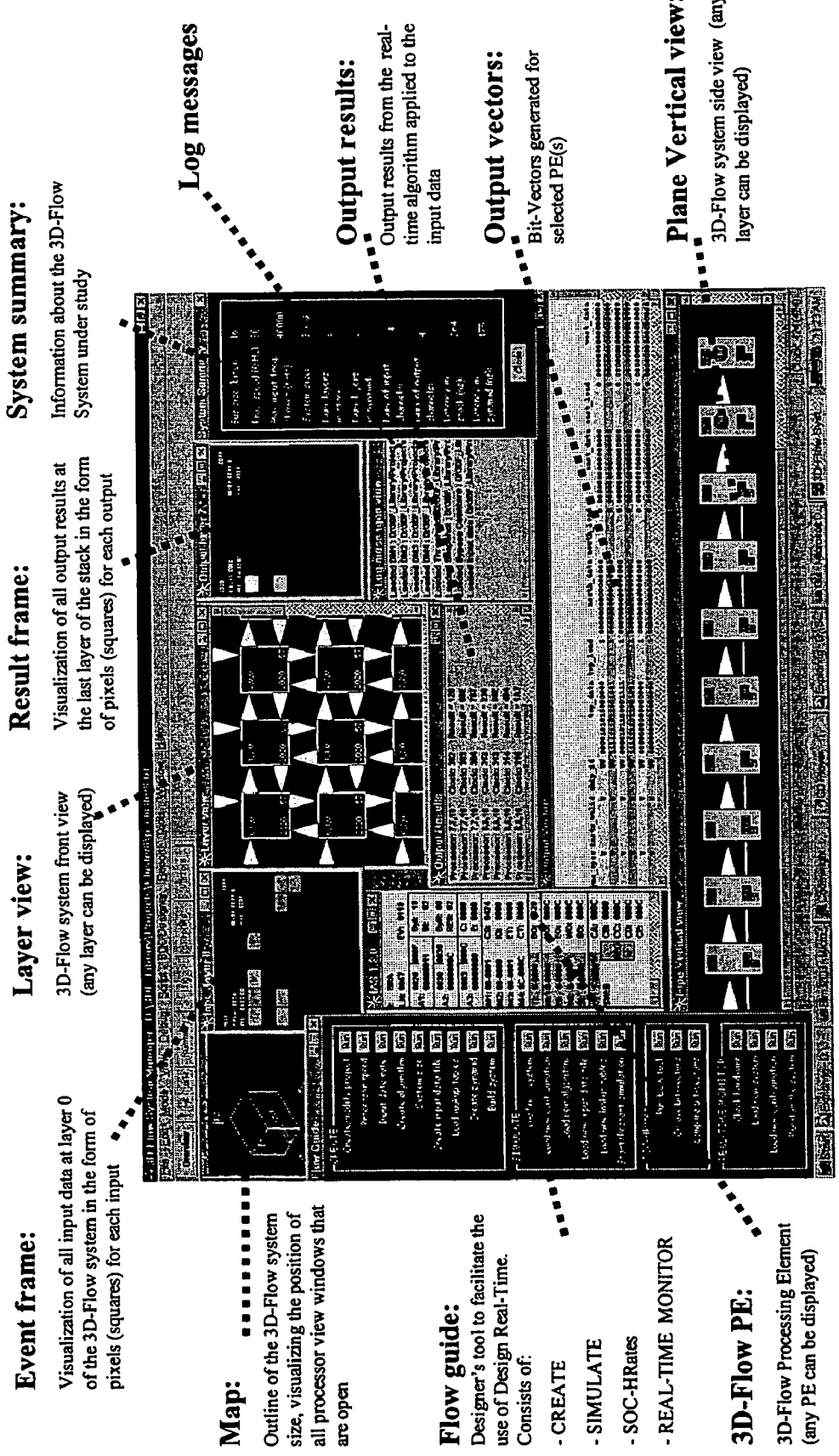

FIG. 41 shows some of the windows available to the user to create, debug, and monitor a 3D-Flow system with different algorithms of different sizes, and to simulate it before construction.

5.4.6 Timing and Synchronization Issues of Control Signals

The 3D-Flow system is synchronous. This makes it easier to debug and to build.

The most important task is to carry the clock, reset and trigger signals to each 3D-Flow component pin within the minimum clock skew. (The overall task is easier if each component accommodates 16 processors.)

Figure 42:
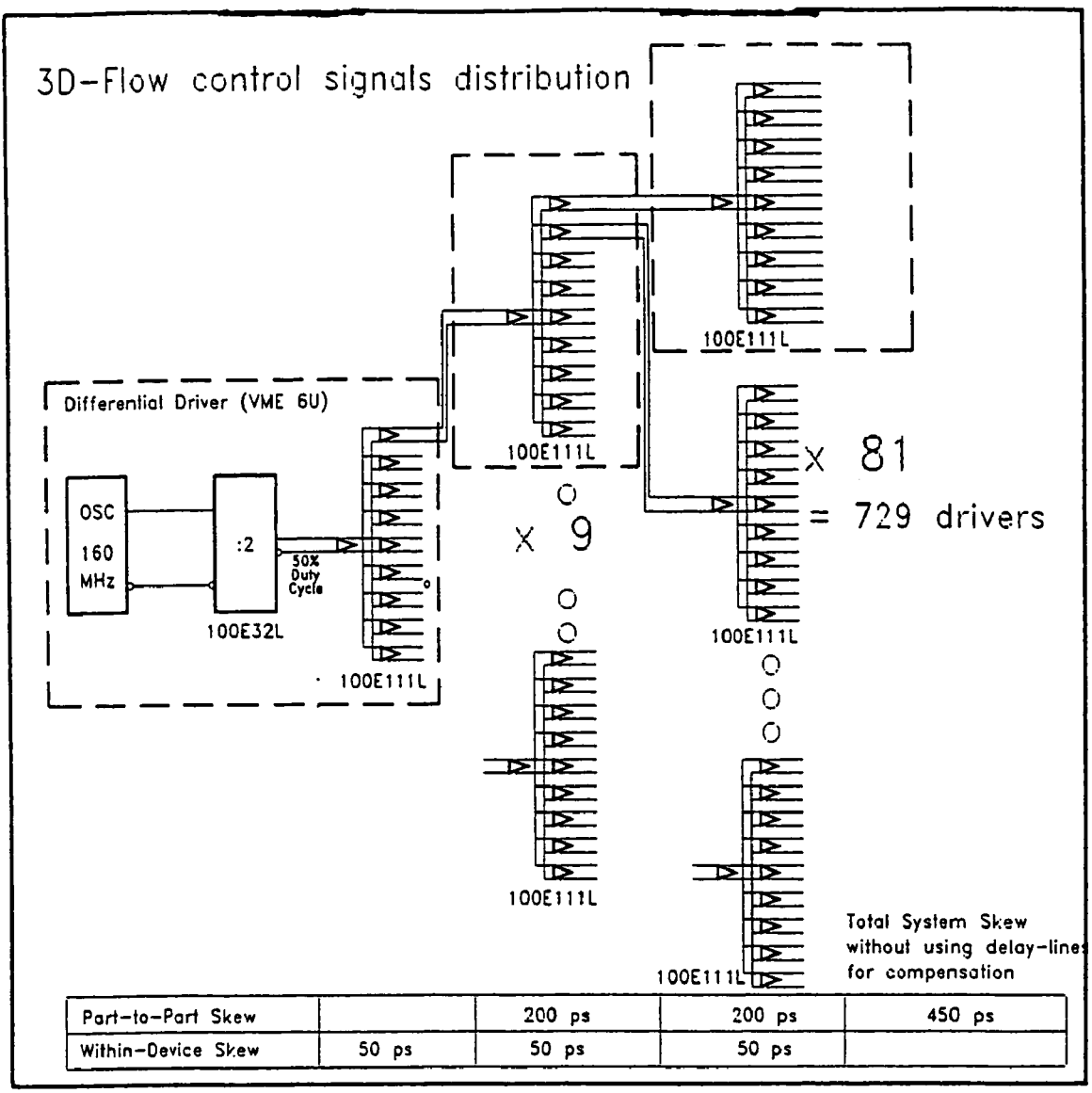

This task can be accomplished without using special expensive connectors, delay lines, or sophisticated expensive technology since the processor speed required to satisfy the design is running at only 80 MHz. The expected worst clock skew (see FIG. 42) for the distribution of one signal to up to 729 chips (equivalent to a maximum of 11,664 processors with a maximum skew of 450 ps. Fanout to 104,976 3D-Flow processors could be accomplished by adding one stage in the clock distribution, increasing the maximum signal skew to 650 ps), using components PECL 100E111L or DS92LV010A Bus LVDS Transreceiver, is less than 1 ns according to the worst skew between different components that is reported in the components data sheet.

Designing equal length printed circuit board traces, is not difficult to achieve with the aid of today's powerful printed circuit board layout tools such as Cadence Allegro.

The other consideration in building the 3D-Flow system is that all input data should be valid at the input of the first layer of the 3D-Flow system at the same time. This goal is achieved as described in Section 5.4.2.5.

All other signals in the 3D-Flow system are much easier to control than for any other system (given the modularity of the 3D-Flow approach) because they are of short distance, reaching only the neighboring components.

5.4.7 Host Communication and Malfuctioning Monitor

An essential part of the 3D-Flow design is that every single processor is individually accessible by a supervising host, via an RS-232 line (or through an RS-422 that is subsequently converted to RS232 if long distance not reachable by RS232 is required). One RS-232 serial port is controlling a group of four 3D-Flow PEs, including all PEs in subsequent layers behind the first layer (also called 3D-Flow stack. See FIG. 8). In addition to providing the ability to download and initialize the system, this feature also provides the capability to periodically test the processor's performance by downloading test patterns and/or test programs. A continuous monitoring can be performed by reading through RS232 the status of eight consecutive cycles of all processors and comparing them with the expected ones. These status bits are saved into a silicon scratch pad register at the same time in all processors at a pre-recorded trigger time corresponding to a selected line of the program executing the filtering algorithm in a selected layer.

In the case of suspected or detected malfunction, the processor performance could be tested remotely and its performance diagnosed. In the event of catastrophic malfunction (e.g. a given processor completely failing to respond, or a broken cable), normal operation, excluding the offending processor (or connection), can still be maintained by downloading into all the neighbors a modified version of the standard algorithm, instructing them to ignore the offending processor.

Figure 43:
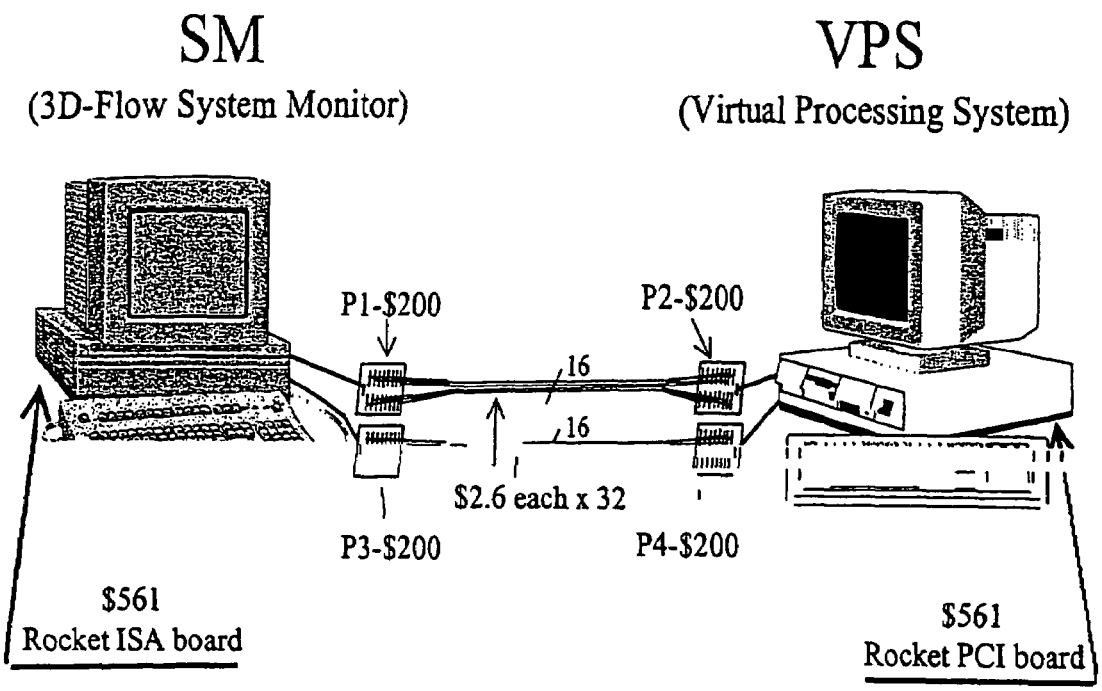

Obviously physics considerations would dictate whether such a temporary fix is acceptable, but it is a fact that the system itself does contain the intrinsic capability of fault recovery, via purely remote intervention. FIG. 43 shows the cost of one IBM PC workstation and peripherals/cables required to monitor one 3D-Flow crate.

Table 5 shows the performance of the System Monitor tested on 128 channels connected via 32×RS232 @ 230.4 Kbaud. The connection was made between two IBM-PC computers using one PCI RocketPort board with 32×RS-232 installed on the System Monitor and one ISA RocketPort board with 32×RS-232 installed on the Virtual Processing System (VPS) computer. The cost of each board was $561. Four 16-port switch selectable (RS-232/RS-422) interface boxes at a cost of $200 each and 32 cables with 32 null-modem were necessary to make the connections between the two computers.

Even if the board setting of the communication speed at each port allowed 460.8 Kbaud, the test was carried at 230.4 Kbaud because it was detected a bottleneck given by the multiplexing of the signals on the cable connecting the 16-port switch and the ISA, or PCI boards. When all 32 ports were used at the same time, there was a minimal increase in throughput performance if 230.4 Kbaud or 460.8 Kbaud were selected.

On one computer was installed the System Monitor program, while on the second computer was installed the Virtual Processing System program. The System Monitor was initializing and monitoring the VPS only through the 32 RS-232 serial ports. Control signals (3D-Flow system reset, input data strobe, etc.) to the VPS were generated by the System Monitor and sent through the standard COMI: of the two computers. The time one PC computer could execute all functions (loading, monitoring, etc.) on 1024 PEs was estimated by extrapolation (see Table 6).

TABLE 5

System Monitor Demonstrator test results for 128 channels.

| FUNCTION | # of PEs | Current [sec] | Ideal [sec] | Reachable [sec] |
|---|---|---|---|---|
| Loading & Initializing | 1280 | 112 | 2 | 6 |
| Monitoring | 4 | 1.6 | 0.001 | 0.5 |
| Monitoring one Layer | 128 | 8.65 | 0.1 | 4.8 (0.8)* |
| Monitoring all System | 1280^ | 86 | 1 | 30 (8)* |

^The system under test was made of 10 layers, each RS-232 is addressing a stack of 4 PEs (4 PEs × 32 RS-232 × 10 layers = 1280 PEs)
*In parenthesis is the timing using the 3D-Flow hardware at the place of the VPS.

TABLE 6

System Monitor estimated timing for 1024 channels.

| Function | # of PEs | Estimated time [sec] |
|---|---|---|
| Loading & Initializing | 10,500 | ~60 |
| Monitoring | 4 | ~0.5 |
| Monitoring one Layer | 1024 | ~2 |
| Monitoring all System | 10,500^ | ~20 |

^The estimated 3D-Flow system includes: 4 PEs × 256 RS-232 × 10 = 10,240 + 3D-Flow pyramid = 10,500 PEs.

5.5 Applications

5.5.1 High Energy Physics

The importance of flexibility and programmability for the trigger systems of today's sophisticated High Energy Physics (HEP) experiments has been recognized repeatedly. As a recent example, in an article presented at the 1998 workshop on electronics for LHC experiments, Eric Eisenhandler states that "Triggering of LHC experiments presents enormous and unprecedented technical challenges [and that] . . . first level or two of these trigger systems must work far too fast to rely on general-purpose microprocessors . . . . Yet at the same time must be programmable . . . . This is necessary in order to be able to adapt to both unexpected operating conditions and to the challenge of new and unpredicted physics that may well turn up."

The 3D-Flow system was conceived to satisfy exactly such stringent requirements. The result was a system suitable for application to a large class of problems, extending over several fields in addition to HEP, for which it was originally devised.

In the following, after a description of the general architecture and properties of the 3D-Flow concept, all the aspects of its application to LHCb Level-0 trigger are discussed in detail. In particular, all the details of the circuits, components and assembly, as they can be achieved with today's technology, are provided. When compared with competing proposals, the 3D-Flow solution offers system sizes and costs at least 50% lower than the alternatives, while maintaining the important advantages of full programmability, modularity, scalability and ease of monitoring.

The style of the description is in a bottom-up fashion: circuit, architecture vs. trigger needs (see Table 7), chip, board, crate, system, global trigger decision unit, timing and synchronization of control signals, real-time malfunctioning monitor, development and design verification tools.

Figure 51:
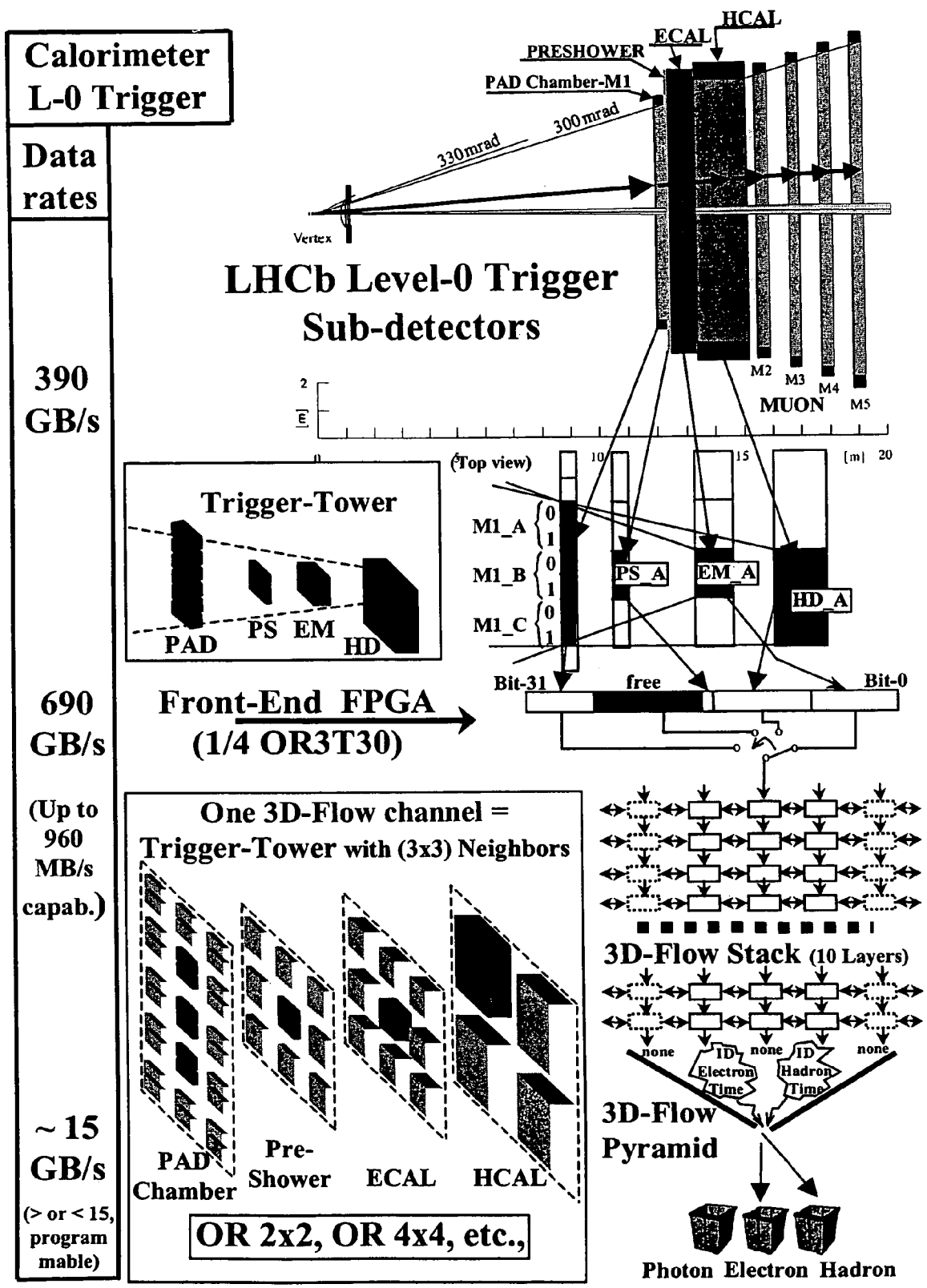

FIG. 51 show the LHCb calorimeter Level-0 trigger layout.

First Level Trigger Algorithms

Typical first level trigger algorithms at the Large Hadron Collider (LHC) experiments at CERN, Geneva, need to sustain the input data rate at 40 MHz with zero dead-time, providing a yes/no global level-0 (or level-1) trigger output at the same rate; need to exchange—for about 10% of the duration of the algorithm—data with neighboring elements; need to find clusters with operations of multiply/accumulate; and need to have a special unit that should be a combination of registers/comparators capable of executing in one cycle operations such as ranging, local maximum, and comparing different values to different thresholds. While short, the first level trigger algorithms need a good balance between input/output operation and several other operations of moving data, data correlation, arithmetic, and logical operation performed by several units in parallel. Typical operations also include converting ADC values into energies or a more expanded 16-bit nonlinear function that is quickly accomplished by lookup tables. The internal units of the 3D-Flow processor have all these capabilities, including powerful I/O.

Figure 44:
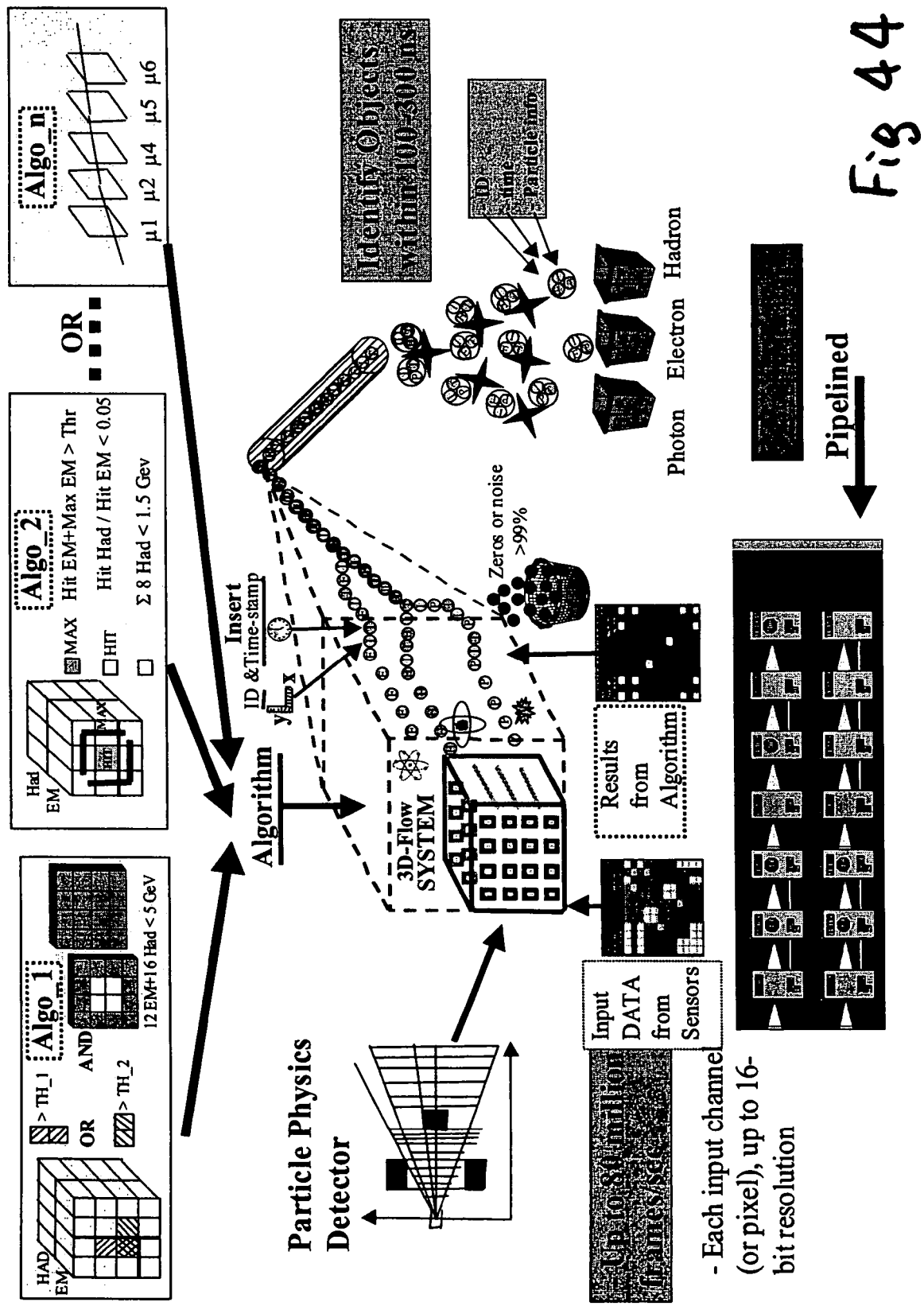

The desired performance, programmability, modularity and flexibility of the 3D-Flow are represented schematically in FIG. 44. With a 3D-Flow processor running an 80 MHz clock speed, it has been shown that the calorimeter trigger requirements can be met by a 3D-Flow system of 10 layers, each layer comprising about 6000 Processing Elements (PE's), one element per ECAL block (sometimes referred to as "trigger tower," that is corresponding to all signals from ECAL, HCAL, Preshower and Muon detectors contained in a specific view angle from the interaction point). Each PE executes the user's defined trigger algorithm on the information received from the detector, at the bunch crossing 40 MHz rate (requiring a time interval ranging from 100 ns to 300 ns, depending on the complexity of the algorithm.). The ten-layer stack is then followed by a data collection "pyramid", where the information from any trigger tower (3D-Flow input channel) where an event of interest was found is routed to a single exit point. The data routing that provides channel reduction is accomplished via the NEWS ports within a time of the order of a microsecond, depending on the size and number of channels in the system.

The present document provides a detailed description of all the components, and their layout, required to build the 3D-Flow system appropriate for the implementation of the calorimeter trigger (the muon trigger implementation details cannot yet be fully defined, since the actual detector configuration is still under discussion, and it will be the subject of a future note).

While utilizing existing technology in each individual step, the resulting system is very compact in the total number of crates (e.g. 6 crates for the calorimeter trigger) and is less costly than other proposed solutions. And this, while conserving the intrinsic properties of full programmability and ease of expansion.

The full simulation of the algorithm can be verified from the system level to each component gate level by comparing the bit-vectors generated by system simulation tools and the tools provided by the Electronic Design Automation (EDA).

5.5.1.1 The 3D-Flow Architecture Optimized Features for the First Levels of Triggers.

The following list of Table 1 shows the most important features of the 3D-Flow that make it very efficient to solve algorithms of first level of triggers in High Energy Physics.

TABLE 7

The 3D-Flow architecture optimized features for first level trigger algorithms

| A Typical Level-0 Algorithm Requires: | The 3D-Flow Architecture Offers: |
|---|---|
| 100% of the time during algorithm execution it is required to input data and output results | Top and Bottom ports are: multiplexed only 2:1, propagating, by means of the by-pass switches, either input data or output results at each cycle. Outputs are required to drive only up to 6 cm. |
| Only 10% of the time of the algorithm execution it is required to exchange data with neighbors | North, East, West, and South ports are: multiplexed 10:1, do not require many cables, have very low power consumption with LVDS (Low Voltage Differential Signaling) I/O requiring to drive only up to 1.5 meters. |

TABLE 7-continued

The 3D-Flow architecture optimized features for first level trigger algorithms

| A Typical Level-0 Algorithm Requires: | The 3D-Flow Architecture Offers: |
| --- | --- |
| Operation of comparing with different thresholds, finding local maximum | A special unit with 32 registers/comparators can compare 4 values, find their range, or find the local maximum, or the greater between pairs, all in one cycle. |
| Short programs | 128 words of program memory. |
| Lookup table to convert ADC values | Four data memories, each for lookup tables of 256 locations of 16-bit, or for buffering. |
| Arithmetic and Logic operations (multiplying by calibration constants, adding to calculate cluster energies) | All Arithmetic, Logical and data move operations are provided by parallel units executing up to 26 operations per cycle. (Including Multiply-Accumulate and Divide at variable precision) |

5.5.1.2. LHCb Level-0 Trigger Overview

5.5.1.3 Physical Layout

Figure 45:
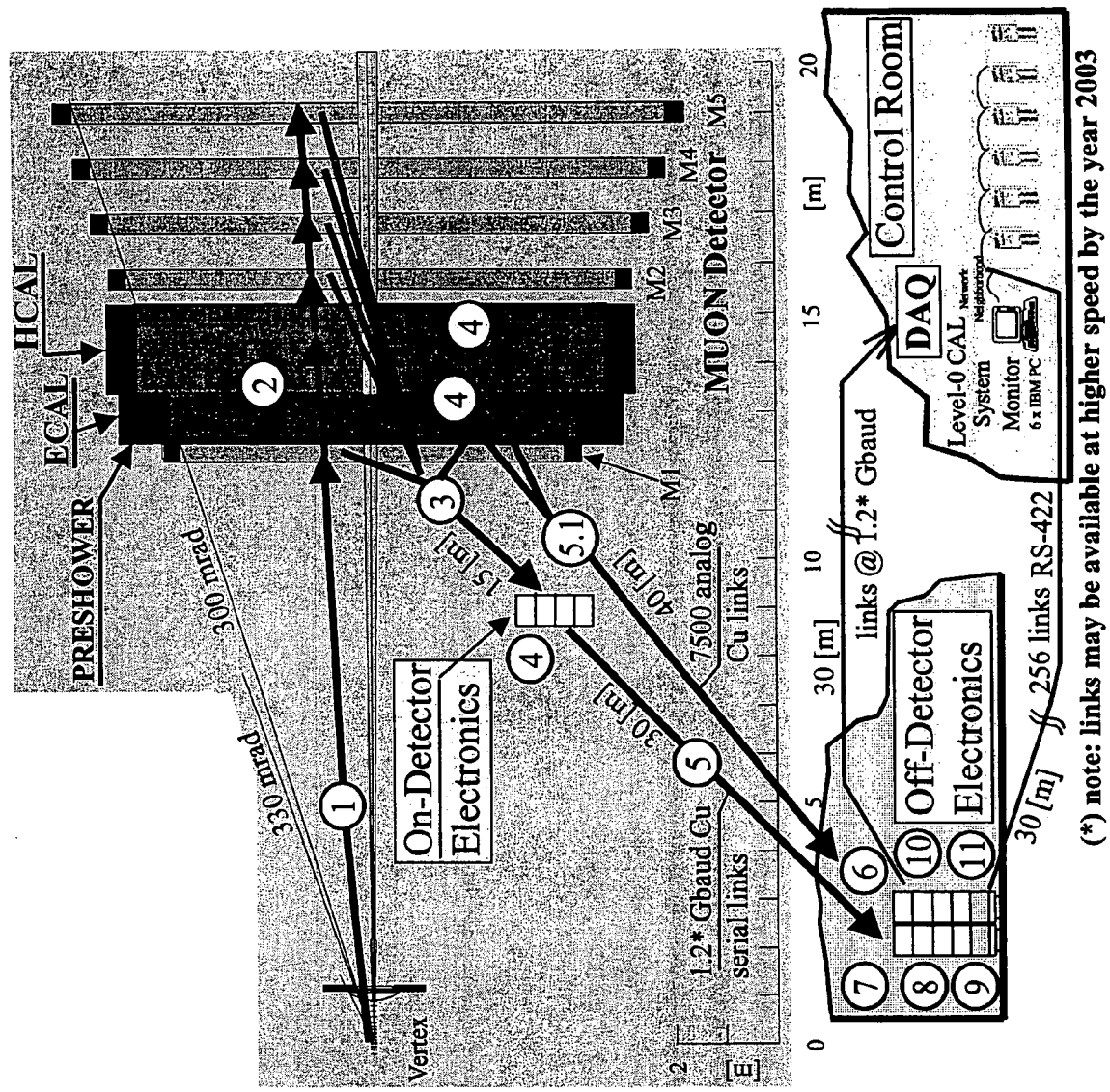

The preferred layout for the LHCb level-0 trigger is to have all decisions taken in electronics racks located on the "balcony" at some 40 meters from the detector. In this configuration, the only link from the control room, located about 70 meters from the detector, to the level-0 trigger electronics is given by the trigger monitor, operating through slow control on RS-422 links. FIG. 45 shows the path of the signals from the different sub-detectors to the electronics, and the corresponding time delays (the numbers identifying each step in FIG. 45 correspond to the same numbers in FIG. 46).

An alternative scheme would call for locating all the level-0 trigger electronics in the control room. This scheme would have the advantage of easier access for maintenance; its disadvantage is that it would be necessary to run longer cables, that will require longer latency. What follows is the first option having the level-0 trigger electronics on the balcony.

Another choice has to be made on whether to convert the signals from analog-to-digital on-detector or off-detector. The selection of one scheme instead of another will consequently require some changes in the electronics. The current preferred solution among the LHCb collaboration seems to be the one which foresees a mixture of analog and digital signals to be received from the detector; however, for maximum flexibility, a 3D-Flow level-0 trigger system that foresees receiving signals from the detector solely in digital form is also reported (See Section 6.2—3D-Flow digital processing board—Option 2). The current LHCb approach is more similar to that used in the Atlas experiment, in which the analog signals are transported for about 60 meters and are converted to digital in a low radiation area. On the contrary, the first level trigger of the cmS experiment receives all digital information. The conversion is being made on-detector by means of the radiation resistant QIE analog-to-digital converter (Q for charge, I for integrating, and E for range encoding), which was developed at Fermi National Laboratory.

Figure 24:
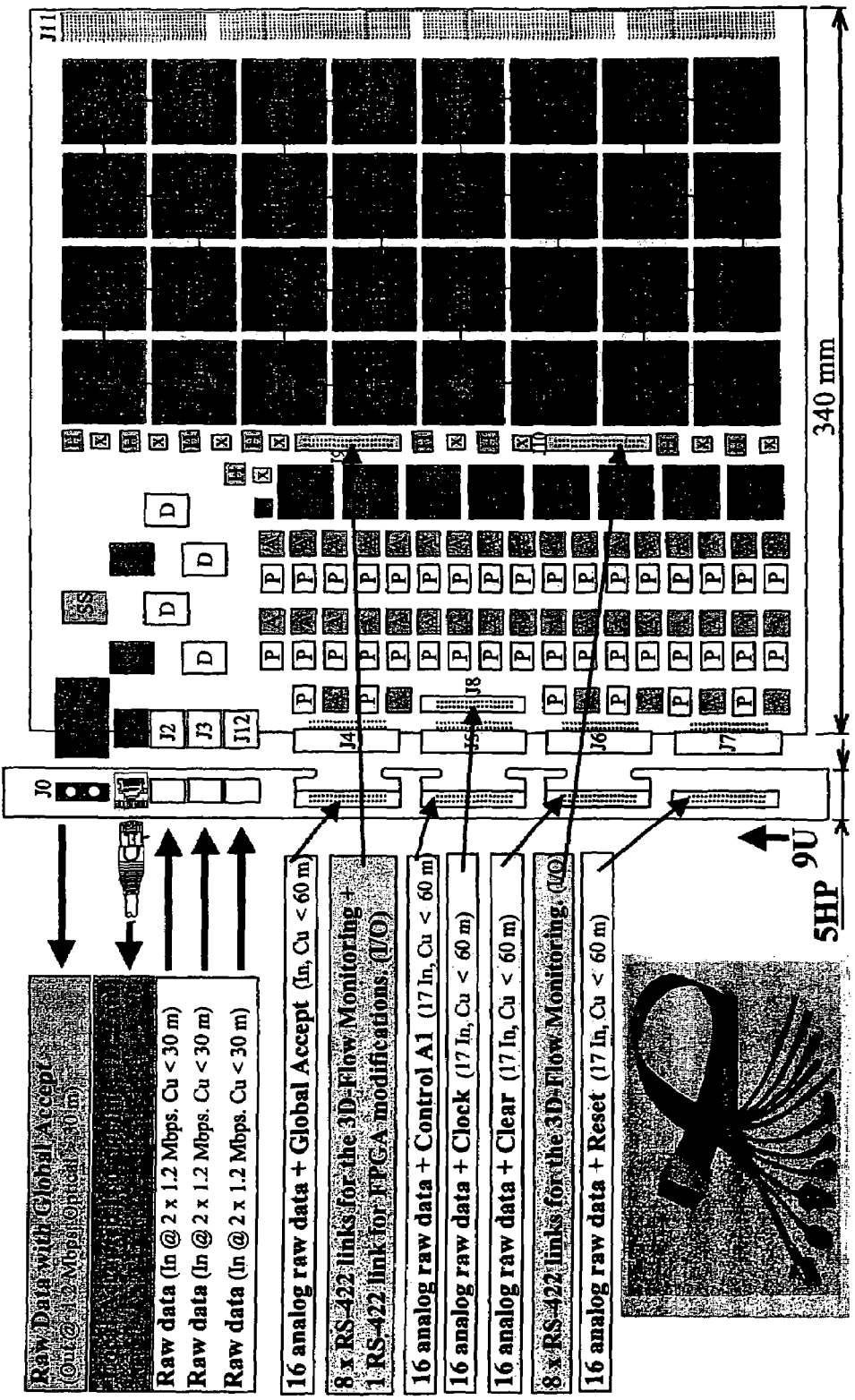
Figure 25:
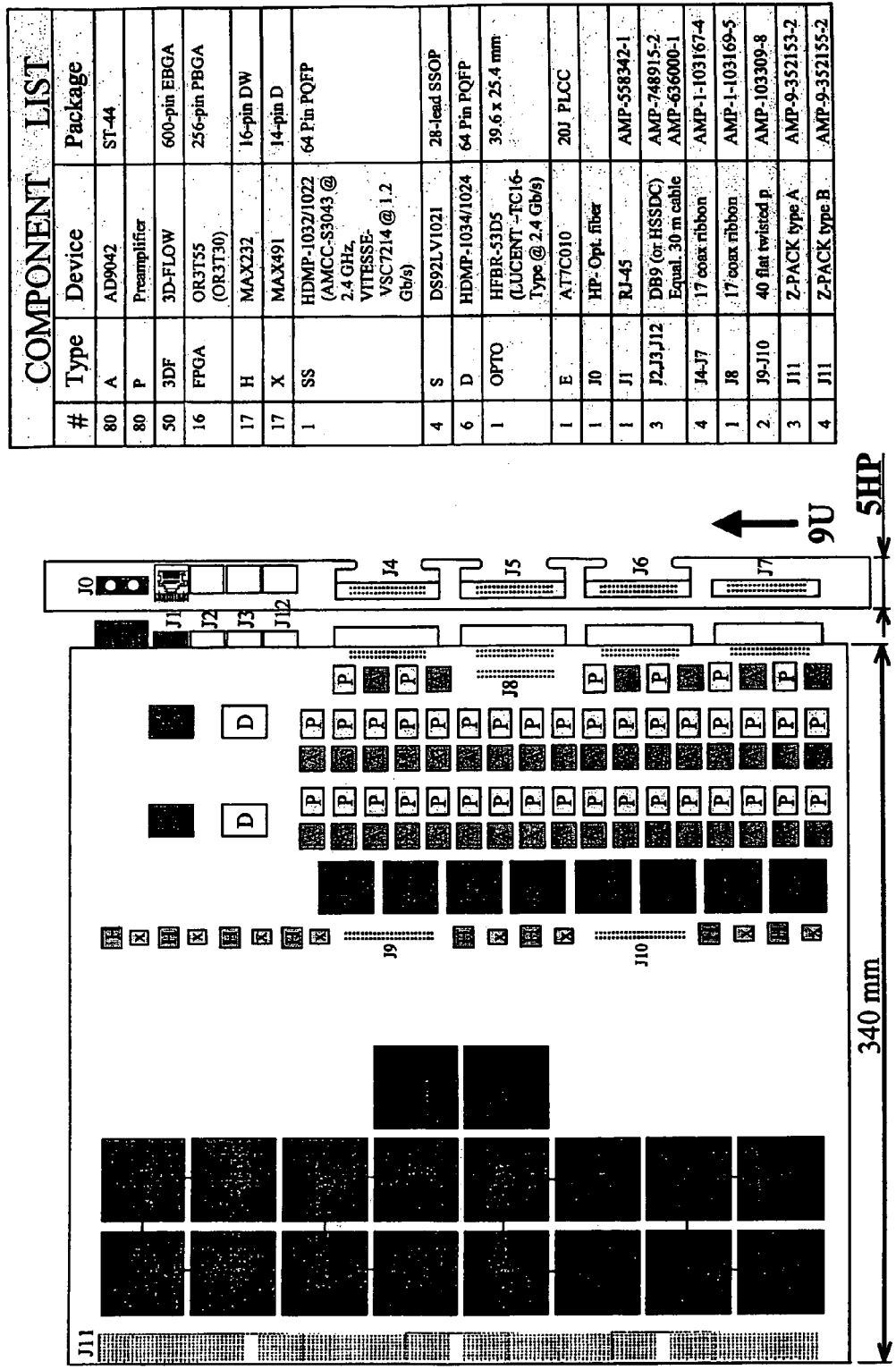
Figure 26:
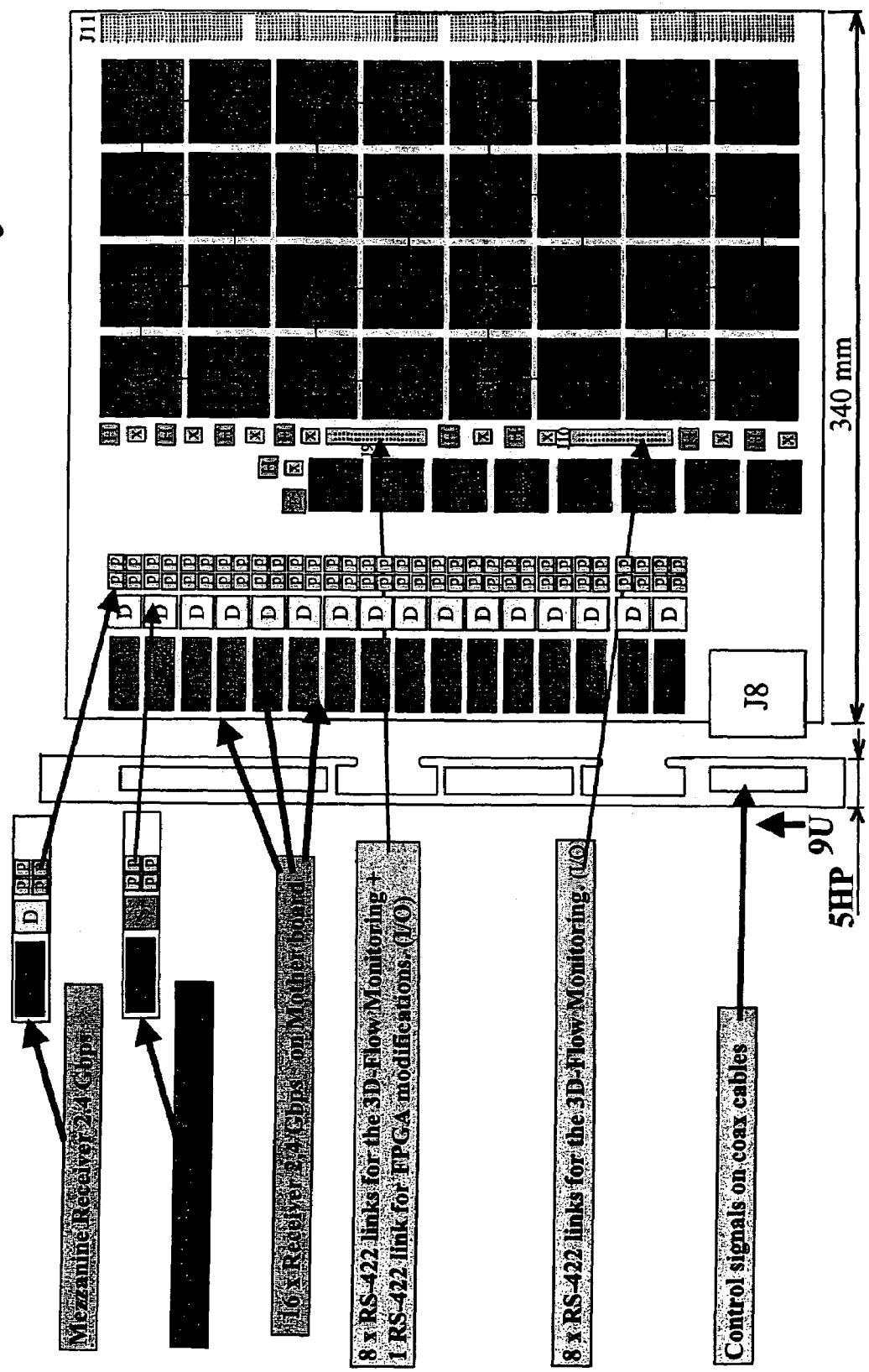
Figure 27:
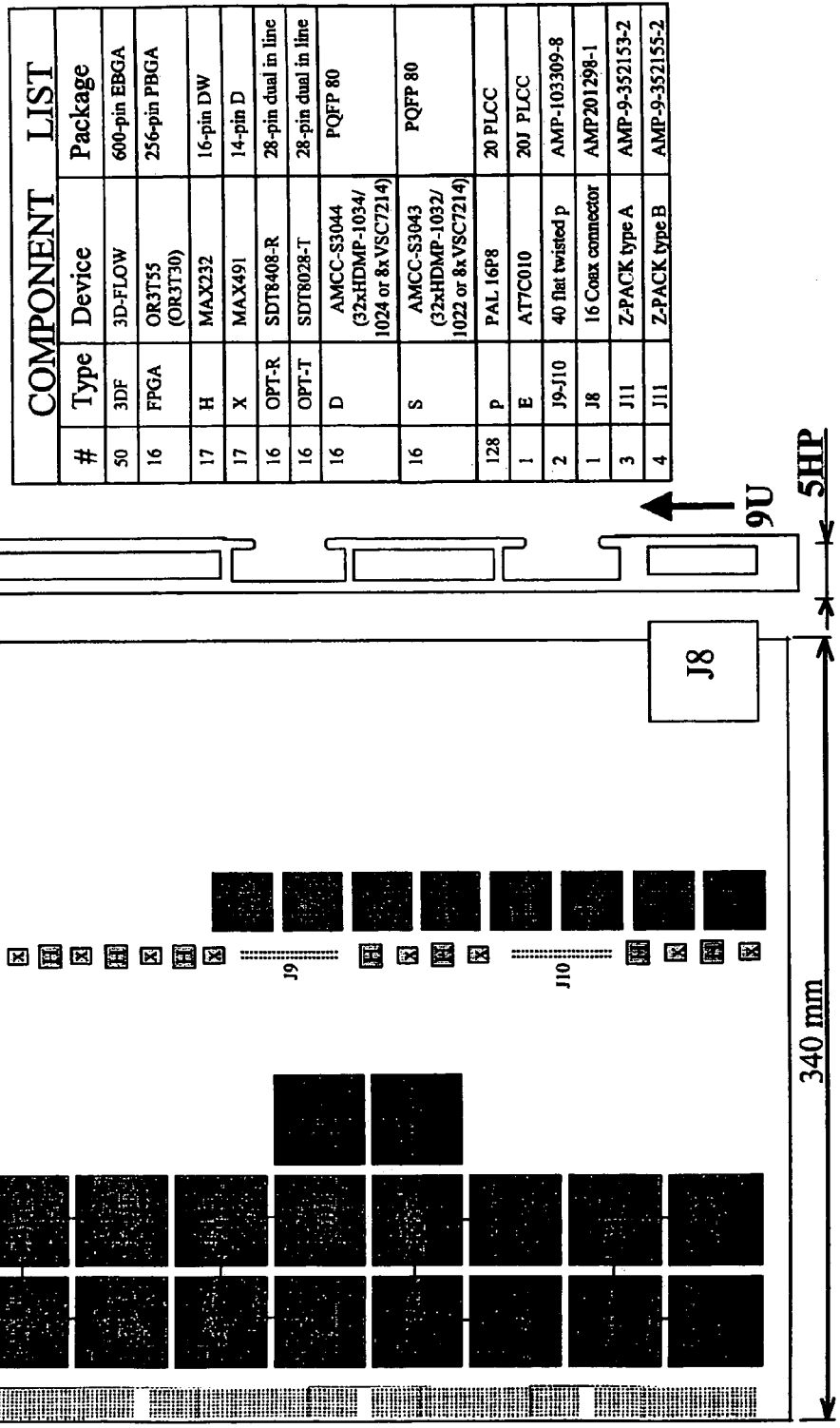
Figure 28:
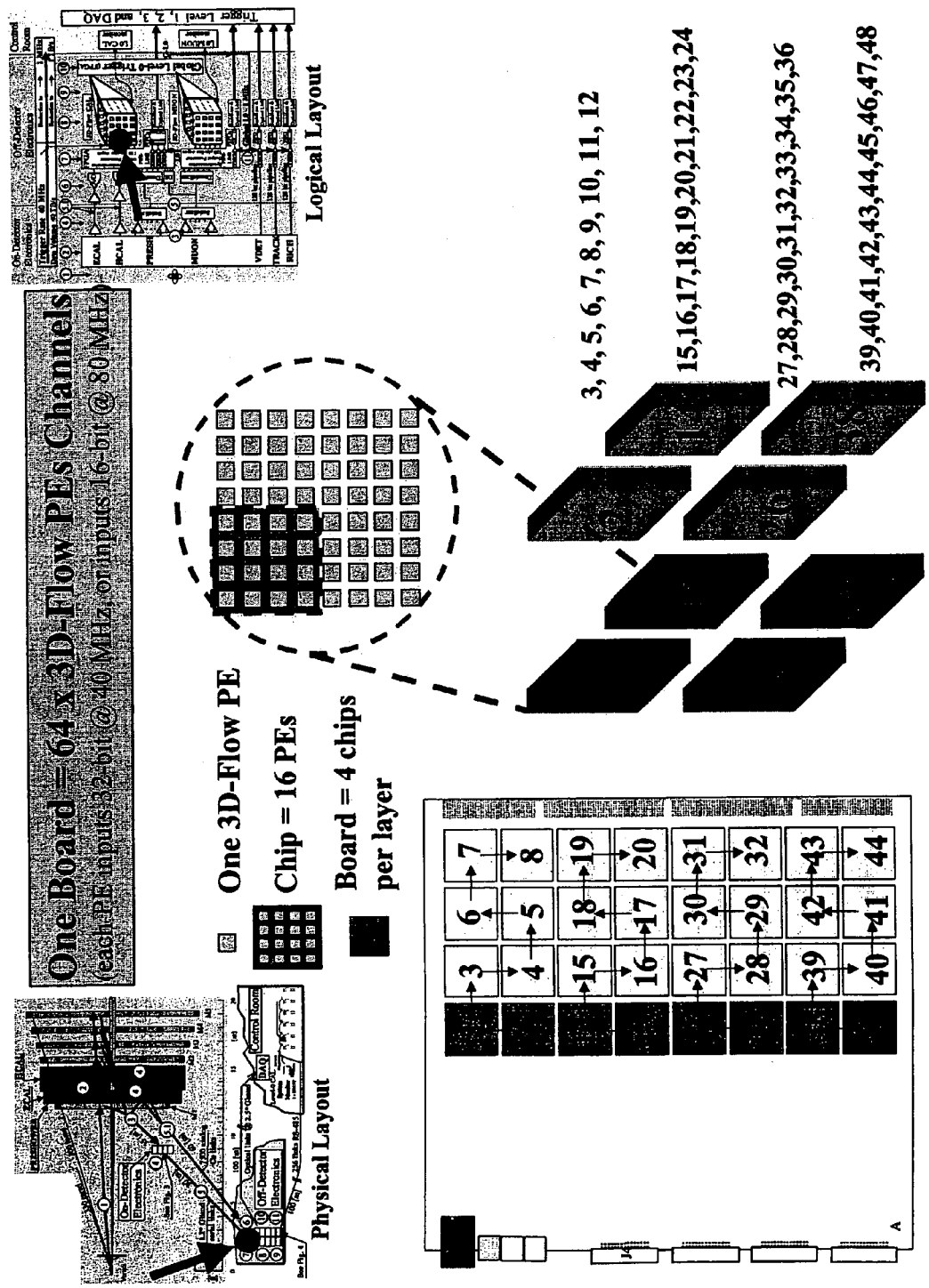
Figure 31:
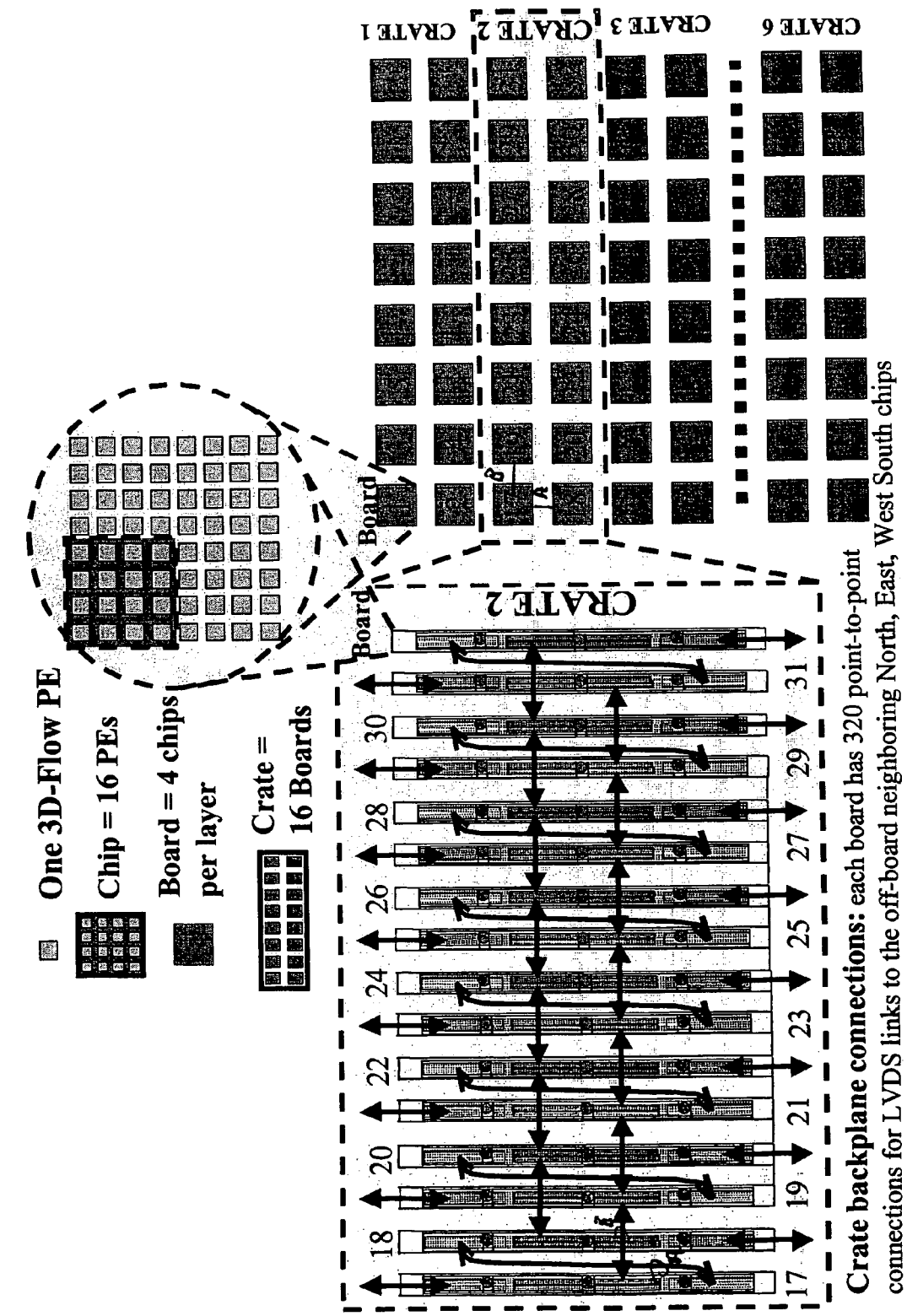

After the particles have traveled from the interaction point to the calorimeter, and the signal is formed by the photomultipliers (steps 1 and 2), a minimum of analog electronic circuit with line driver will be installed close to the photomultiplier). The signal is then transported through a coaxial 17-position ribbon cable (part number AMP 1-226733-4) to the 3D-Flow mixed-signals processing board (shown in FIG. 24).

These analog signals are foreseen to be converted to 12-bit digital form with standard components such as Analog Device AD 9042. For the analog signals available at the preshower sub-detector it will be desirable, because of lower cost, to use a shorter cable set from the different sensors to a location where the signals can be grouped together in sets of 20-bits or more. The above analog signals, as well as the ones from the muon stations, are foreseen to be converted to only one-bit digital value. Once the digital signals have been grouped, they can be sent in digital form on standard copper cables (e.g. equalized cables AMP 636000-1), through one of the available serializers at 1.2 Gbps. (Serializers at 2.4 Gbps are also available; however, they are limited to 10 meters in copper or at longer distances in optical fiber and are more expensive.) In the case the radiation is too high where the transmitter (or serializer) has to be installed, radhard components should be considered.

5.5.1.4 Logical Layout

Figure 46:
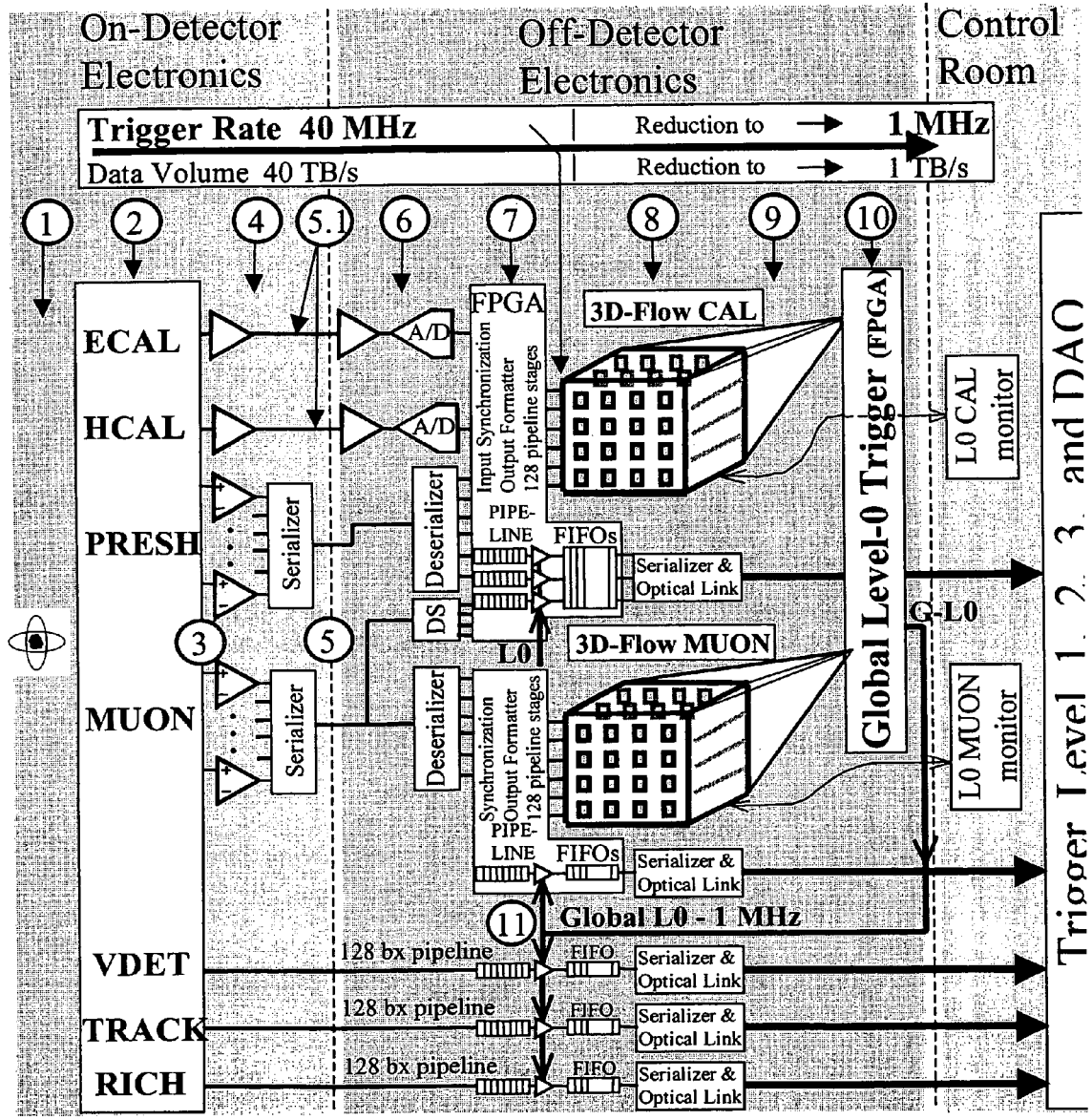

The scheme of the entire Level-0 trigger system for the event selection ("trigger") for the LHCb High Energy Physics experiment is summarized in FIG. 46.

FIG. 46 shows the logical function performed by the different signals and electronics previously shown in FIG. 45 (see also the timing information indicated by the number inside the circle in FIG. 45). It is divided into three sections. The section at the left shows the electronics and signals on the detector. The center section shows the electronics and signals in the racks located off-detector (where all decision electronics for the level-0 trigger are located). The section on the right shows the cables/signals carrying the information to the DAQ and higher level triggering system that are received at the control room. In this scheme, only the monitoring electronics of the level-0 trigger is located in the control room.

The LHCb detector, consisting of several sub-components (ECAL, HCAL, PreShower, Muon, VDET, TRACK, and RICH) monitors the collisions among proton bunches occurring at a rate of 40 MHz (corresponding to the 25 nsec bunch crossing rate). At every crossing, the whole information from the detector (data-path), is collected (indicated in the figure by the number 4), digitized (indicated by the number 6), synchronized and temporarily stored (indicated by 7) into digital pipelines, (conceptually similar to 128 deep, 40 MHz shift registers), while the Trigger Electronics (indicated by 8 and 9), by examining a subset of the whole event data (trigger path), decides (indicated by 10) whether the event should be kept for further examination or discarded. In the LHCb design, the input rate of 40 Tbytes per sec11 (see top of the figure) needs to be reduced, in the first level of triggering, to 1 Tbytes/sec, i.e. a 1 MHz rate of accepted events. The selection is performed by two trigger systems (indicated by 8) running in parallel, the Calorimeter Trigger, utilizing mainly the information from the ElectroMagnetic and Hadronic Calorimeters (ECAL and HCAL) to recognize high transverse momentum electrons, hadrons and photons; and the Muon Trigger, utilizing the information from five planes of muon detectors to recognize high transverse momentum muons.

The resulting global level-0 trigger accept signal (indicated by 10 in the figure) enables the data in the data-path to be stored first into a derandomizing FIFO and later to be sent through optical fiber links to the higher-level triggers and to the data acquisition (see in FIG. 8 the signal Global L0 distributed to all front-end 128 bunch crossing (bx) pipeline buffers). Real-time monitoring systems (L0 CAL monitor and L0 MUON monitor) supervise and diagnose the programmable level-0 trigger from the distant control room.

5.5.1.5 Electronic Racks (Functions/Locations)

Figure 47:
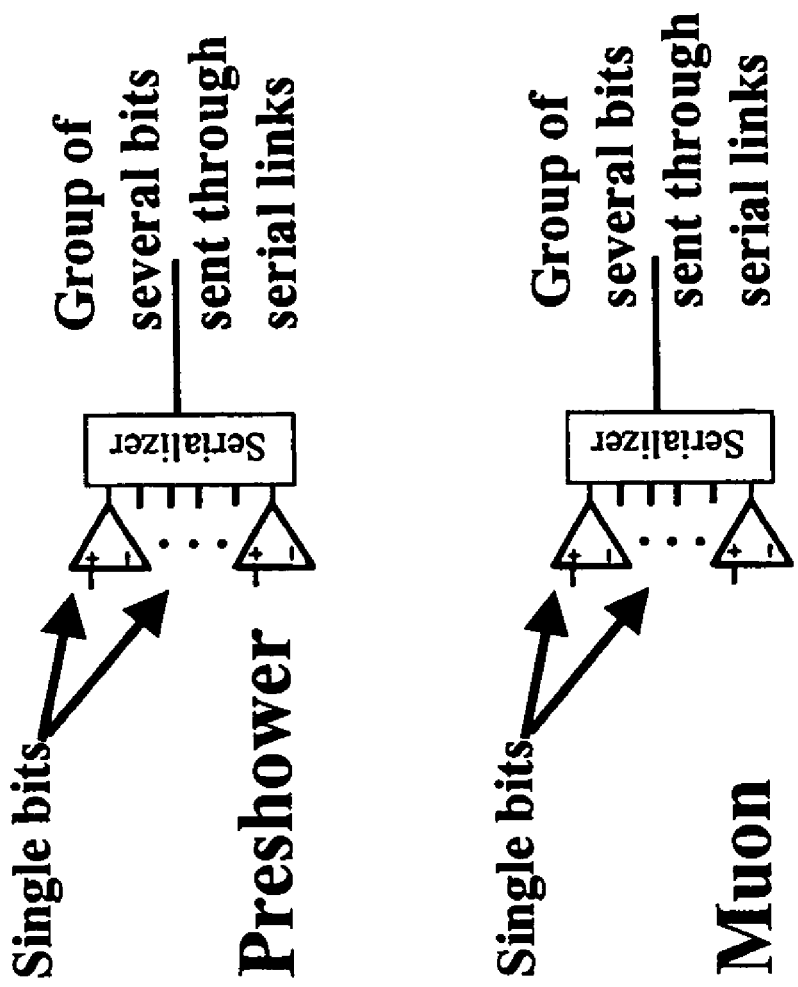
Figure 48:
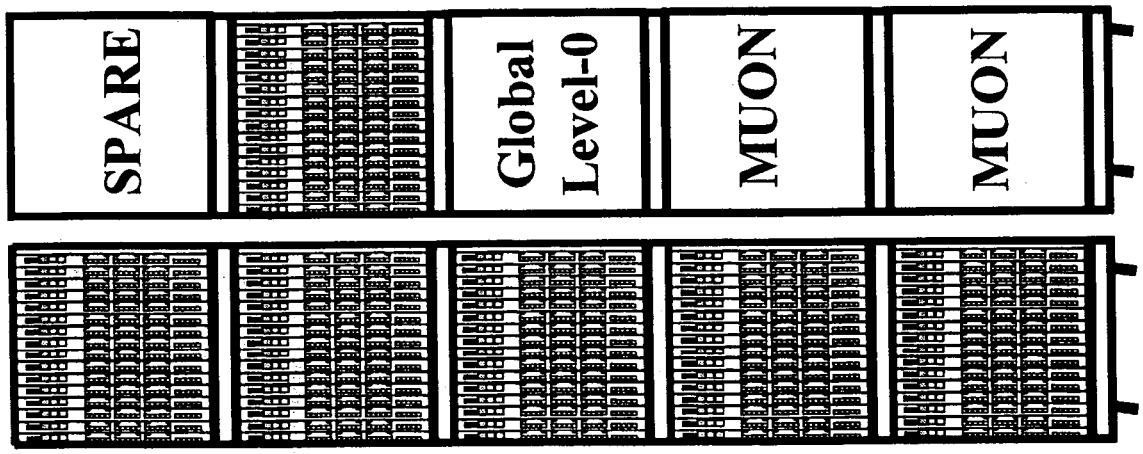
Figure 49:
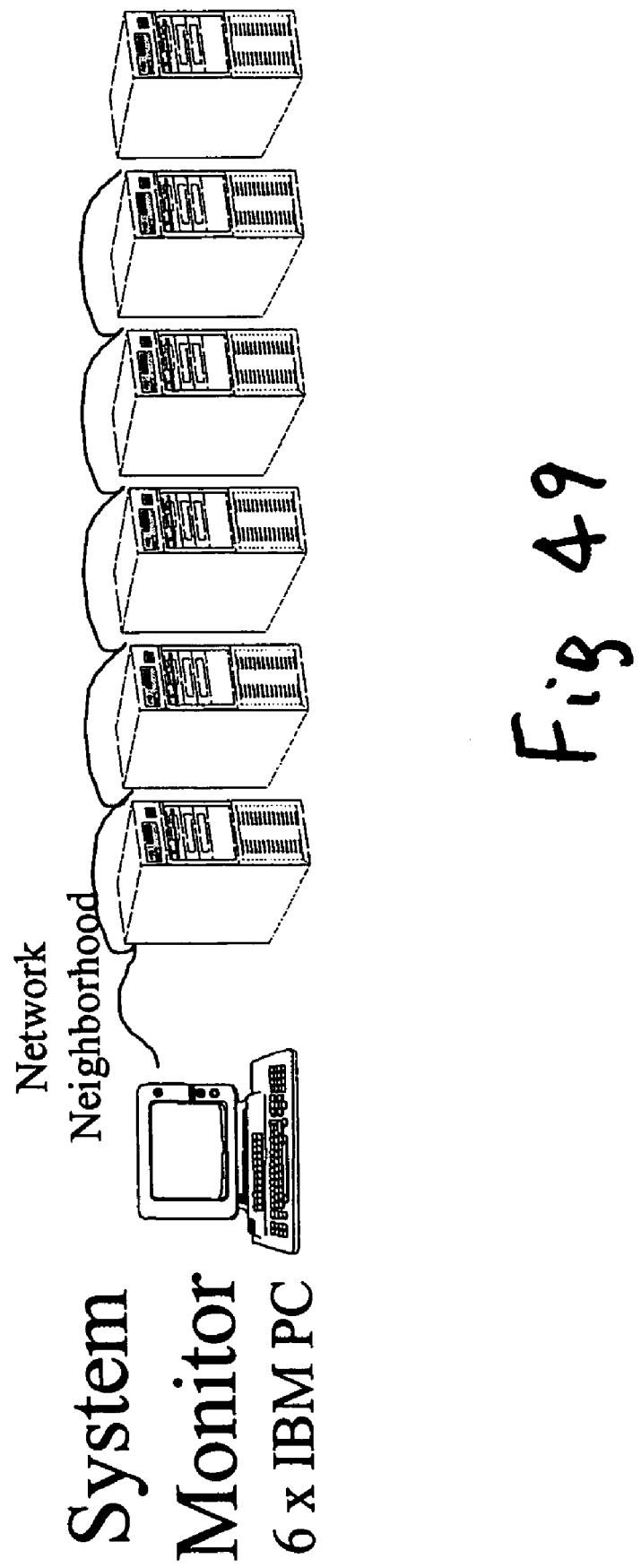

FIG. 47 shows the estimate of the type of electronics that will be needed on-detector for Level-0 trigger. FIG. 48 shows the number and functionality of the crates and racks located off-detector that will be required to accommodate the level-0 electronics. A fully programmable calorimeter Level-0 trigger implemented with the 3D-Flow requires 6 crates (9U). This is to be compared with the less flexible 2×2 trigger implementation option by the LAL group of Orsay (see http://lhcb.cern.ch/notes/98-058.ps), requiring 59 VME crates, or with a third, HERA-B experiment at Desy like solution requiring 14 crates (9U). FIG. 49 shows the monitoring system for the 3D-Flow calorimeter trigger. This, together with any other monitoring of the level-0 muon trigger and of the global level-0 decision unit should be accommodated in the control room.

5.5.1.6 APPLICATION EXAMPLE

LHCb Level-0 Calorimeter Trigger FE Circuit

5.5.1.7 LHCb Calorimeter Level-0 Trigger Overview

The front-end chip described in Section 5.4.2 was specifically designed to meet the requirements of calorimeter Level-0 front-end electronics of the LHCb experiment; however, it can also be viewed as a more general-purpose design configurable to a) satisfy the requirements of the front-end electronics of other subdetectors of the LHCb experiment, b) meet the requirements of the front-end electronics of other experiments, c) accommodate future changes within the same experiment. It can also be viewed as a general-purpose front-end circuit of the 3D-Flow programmable system for very high-speed real-time applications.

FIG. 46 shows the components of the calorimeter Level-0 trigger of the LHCb experiment.

The left column of FIG. 46 summarizes the data rates at the different stages of the calorimeter trigger.

The raw data input is 12-bit×6000 EM, 12-bit×1500 HAD, 1-bit×6000 preshower, and 2-bit×6000 PAD every 25 ns, corresponding to 540 Gb/s (The above sum is 108,000-bit received by the 3D-Flow system every 25 ns. This is equivalent to 540 Gb/s). All of these need to be pipelined during trigger execution, but only a subset is actually needed by the trigger, specifically 8-bit×6000 EM, 8-bit×1500 HAD, 1-bit× 6000 preshower, and 2-bit×6000 PAD, corresponding to 390 Gb/s (The above sum is 78,000-bit received by the 3D-Flow system every 25 ns. This is equivalent to 390 Gb/s). In reality, the front-end electronics increases this amount to 690 Gb/s, since some of the information needs to be duplicated in order to feed each trigger tower with the complete set of information relative to the solid angle it subtends. As an example, the information from each HCAL block has to be repeated four times, in order to make it available to each of the four ECAL blocks it covers. The figure of 690 Gb/s is derived from providing every 25 ns each of the 6000 trigger towers with 8-bit ECAL, 8-bit HCAL, and 1-bit preshower and 6-bit PADs. In turns, this corresponds to a 23-bit word received at every bunch crossing by each processor in the stack, as shown in FIG. 8 (23-bit×6000=138,000-bit received by the 3D-Flow system every 25 ns, is equivalent to 690 Gb/s).

Given that each processor can receive 16 bits of data at 80 MHz (i.e. 32 bits per bunch crossing or 960 Gb/s for 6000 processors), the presently envisaged 23 bits still leave a good margin for possible future expansions. The flexible design of both front-end and 3D-Flow processor can easily accommodate such expansions, as it allows the user to redefine a) the trigger tower segmentation, b) the trigger word definition, and c) the real-time trigger algorithm, provided that the modified algorithm can still be accomplished in 20 programming steps (not a hard limitation, since each 3D-Flow processor can execute up to 26 operations per step, inclusive of compare, ranging, finding local maxima, and efficient data exchange with neighboring channels). A much larger margin exists for the sustainable output rate. As discussed in reference 8, the allowed output bandwidth from the 3D-Flow level-0 accepted events is 1 MHz. Even if we allow a much larger rate of candidates (for instance 5 MHz) to be sent for final decision to the global level-0 decision unit, and even allowing for as many as 4 clusters in a candidate event and 64 bits per candidate, the resulting rate of 320 Mb/s is two orders of magnitude below the system capabilities.

Figure 8:
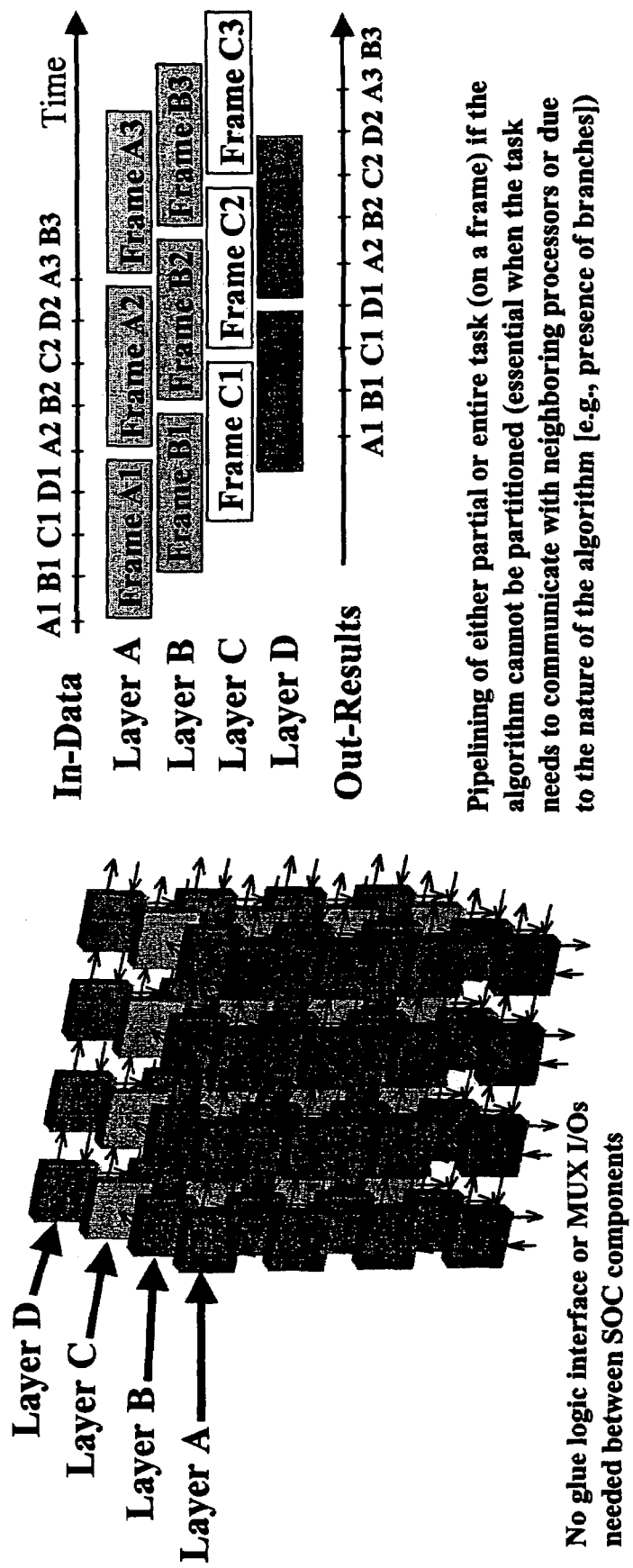

The center of FIG. 8 shows the components of a "trigger tower word." From right to left we have: 8-bit from the electromagnetic calorimeter, 8-bit from the hadronic calorimeter, 1-bit from the preshower, 9-bit free, and 6-bit from the PADs. Further on the left of the figure, there is a 3D representation of the elements of a trigger tower viewed from the top of the detector.

The bottom-left of FIG. 46 shows the 3D representation of the elements of a trigger tower with all the adjacent elements used by the 3×3 level-0 trigger algorithm.

The information of the elements shown in the bottom-left part of FIG. 46 will be available on each 3D-Flow processor after acquisition and data exchange with the neighbors. Equally, it is possible to implement the trigger algorithm with 2×2, or 4×4, or 5×5, etc. data exchange and clustering.

The bottom-right section of FIG. 46 shows the 3D-Flow system from the first layer of the stack which is connected to the front-end chip that receives the data from the detector, down to the last layer connected to the pyramid performing the function of channel reduction.

5.5.1.8 Global Level-0 Trigger

Figure 32:
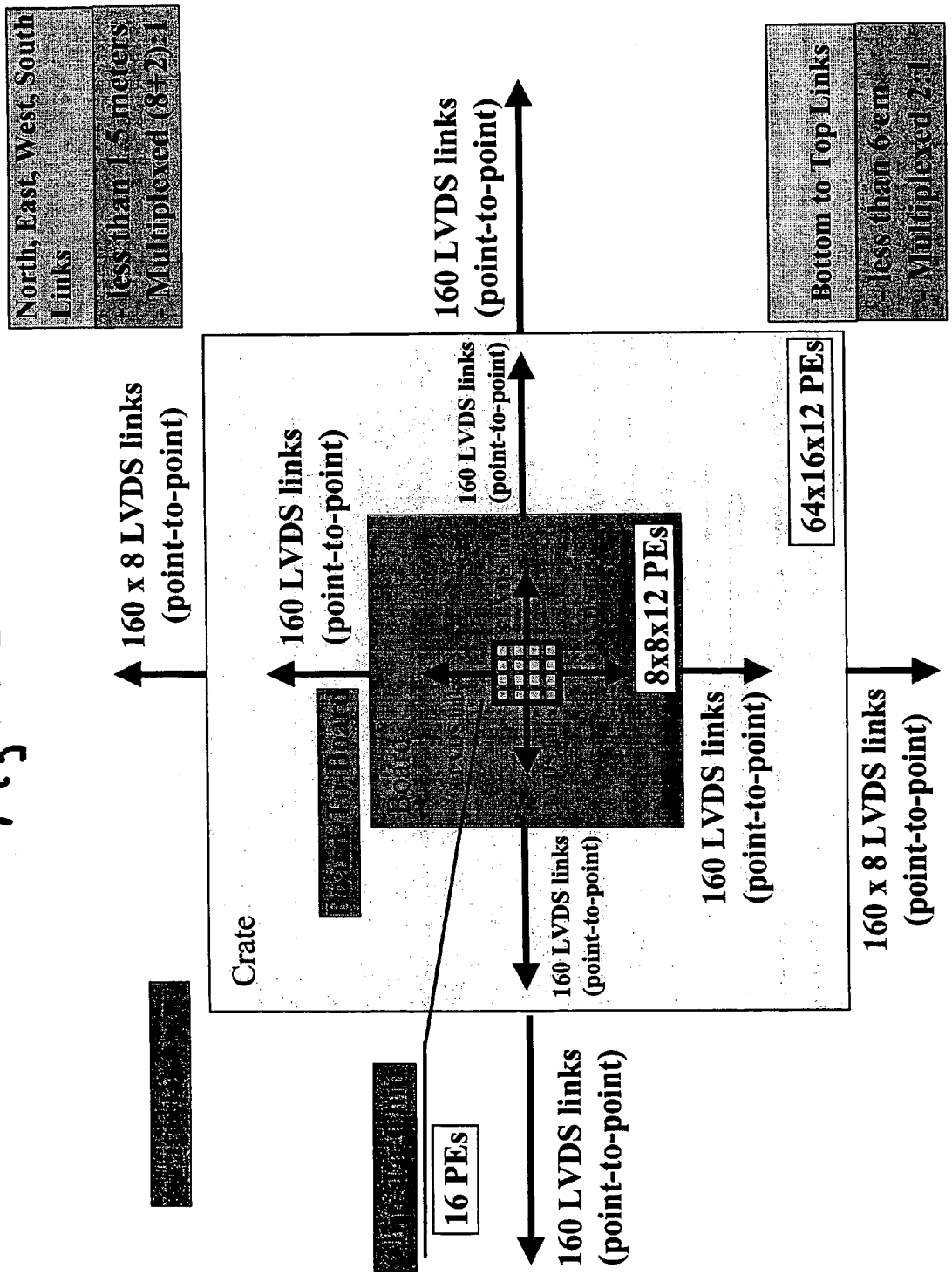
Figure 33:
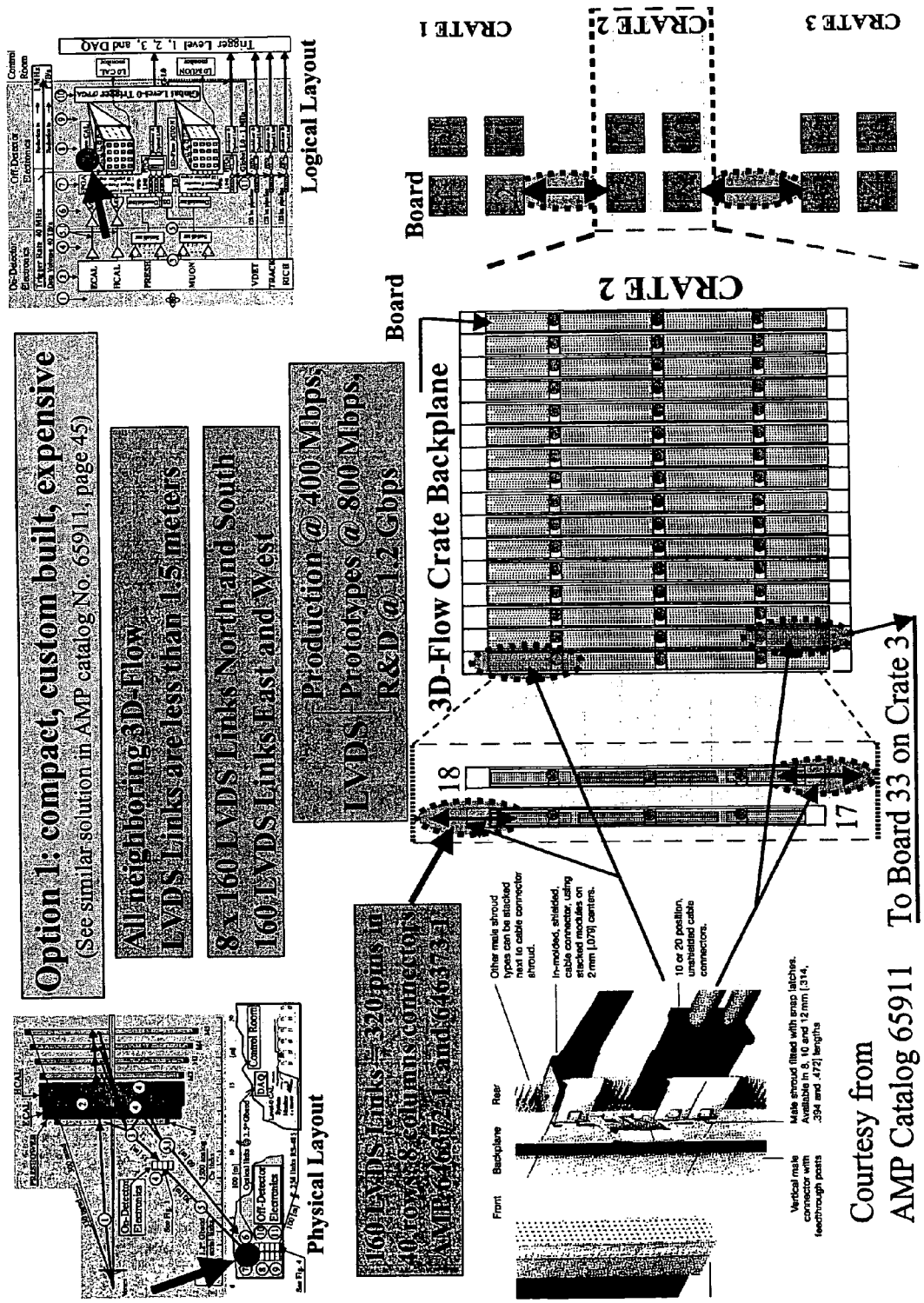
Figure 34:
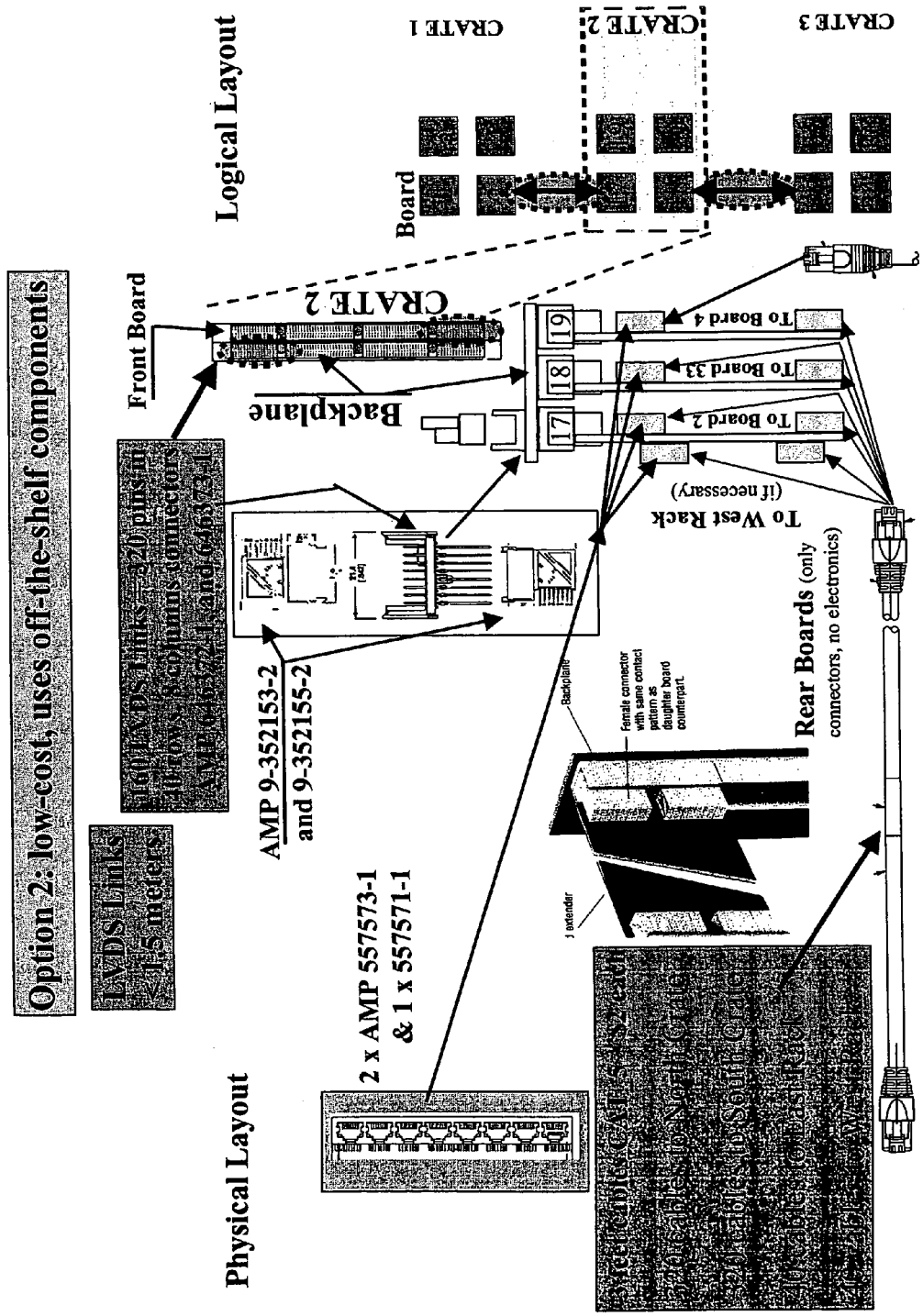
Figure 35:
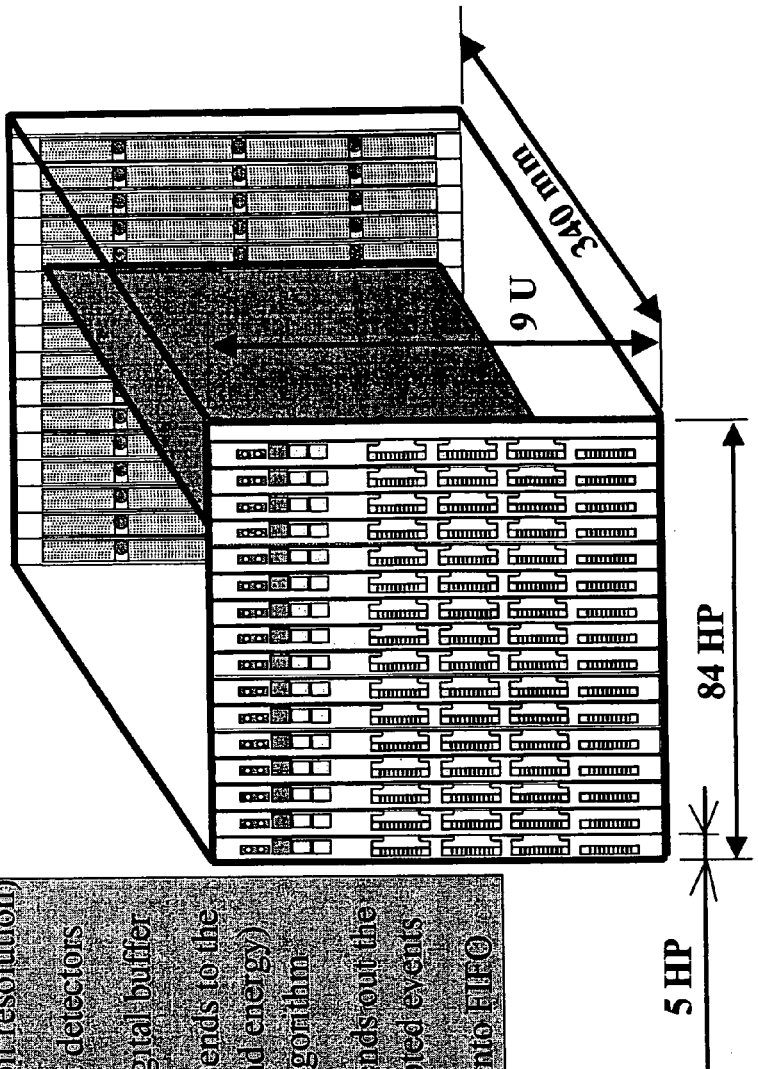
Figure 50:
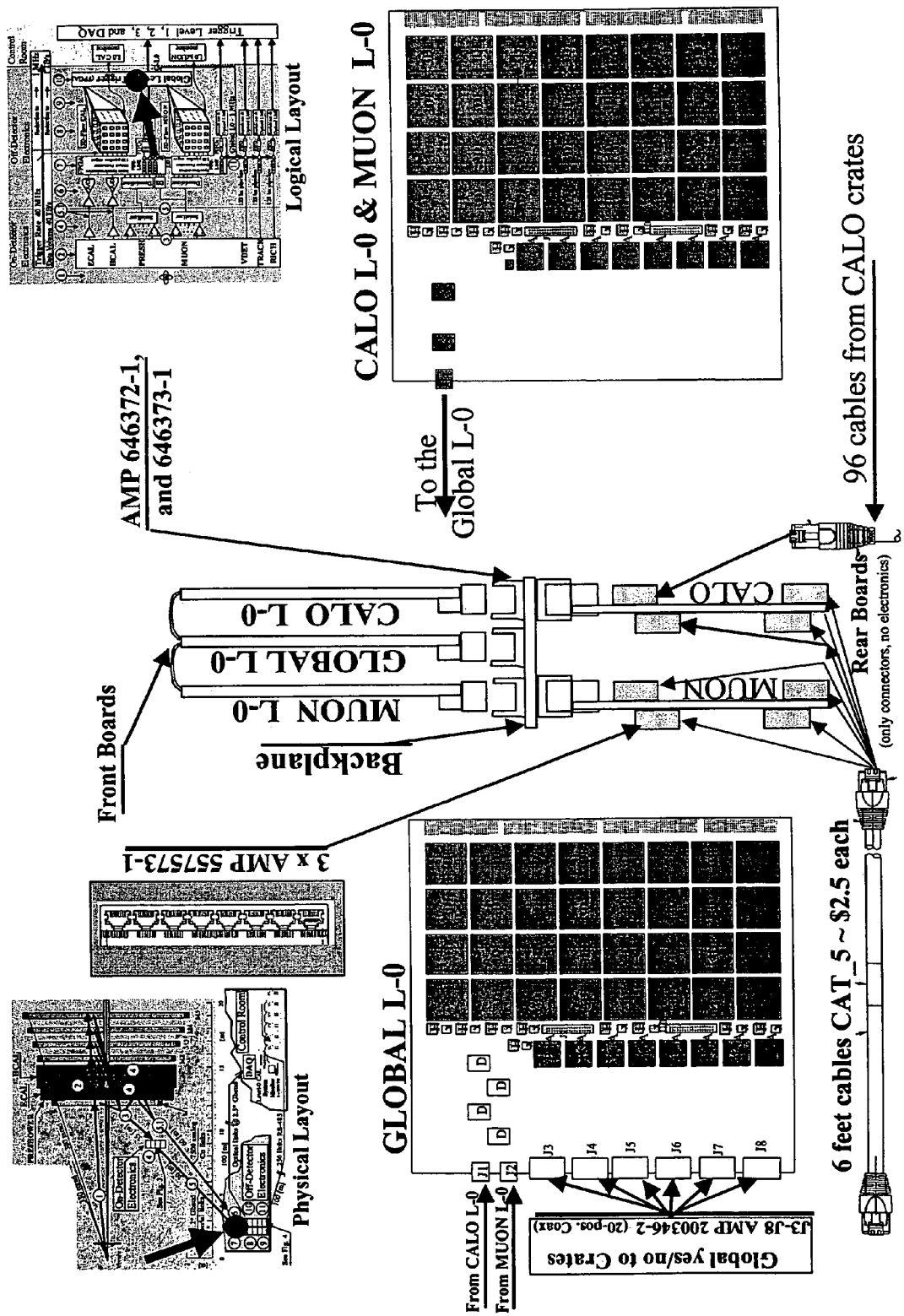

FIG. 50 shows the Global Level-0 trigger decision units. It consists of two rear-boards with no electronics, but only connectors. The board receiving the candidate particles from the calorimeter level-0 trigger crates has 96 cables (one per mixed-signal processing board). The information goes through the backpanel connector through connectors AMP 646372-1 and AMP 646373-1 to the board at the front of the crate called CALO L-0. This board is shown at the bottom-right of FIG. 32. The programmable global level-0 trigger decision board for the calorimeter (or the candidates that need to be validated by the other muon global level-0 decision unit) sends out through the front panel connector RJ-45 to the Global level-0 calorimeter board the calorimeter information.

The CALO L-0 board contains 3D-Flow chips and FPGA chips that allow a global level-0 trigger algorithm to be implemented in a programmable form. The Muon L-0 board has the same functionality as the CALO L-0 board. Finally, the Global L-0 decision unit shown at the bottom-left of the FIG. 32 receives the data through two RJ45 connectors on the front panel from Calo L-0 and Muon L-0, it performs further sorting and global level-0 trigger algorithm in order to generate a single signal yes/no that will be sent to all the units in the calorimeter crates and to the muon crates. These signals are sent through AMP 200346-2 connectors on the same coaxial ribbon cable used at the front panel of each mixed-signal processing board. (Only one coax cable out of the 17 in each coax ribbon cable is attached to this connector from each mixed-signal processing board. See how coax cables are split at one end in FIG. 24).

5.5.2 Three Dimensional Medical Imaging (PET/SPECT-PET/SPECT/CT-PET/SPECT/MRI, etc.) Applications The method and apparatus of this invention is advantageous when used in acquiring and processing signals received from detectors detecting radiation (x-ray, gamma, etc.) from medical imaging devices for 3D images reconstruction.

A system with an extended processing time in a pipeline stage, such as the one made available by this invention which allows for the execution of complex algorithms to distinguish Compton scattering, randoms, and noise from true events, can be built for a multiple channel PET/SPECT device, or for multi-modality devices requiring high sensitivity at different energies.

For devices with low radiation activity which generate a low input data rate of signals from the detector to the Data Acquisition (DAQ) electronics, a system can be built using off-the-shelf commercial processors interfaced with the "bypass switch" described in this invention.

For devices with a more demanding input data rate (corresponding to a higher radiation activity), a system based on the highly efficient 3D-Flow processor (which is efficient in moving as well as processing data in parallel) replicated several times can satisfy all needs.

For example, if we consider one of the devices in medical imaging such as the PET, the technological improvement during the last 8 years yields an average improvement in sensitivity of the devices of 3 times every 5 years by reaching the capability of detecting 10 million counts per second with the new devices that will be on the market in the next one or two years.

An improvement in the electronics in this field is needed by many experts in the field. As stated by M. Phelps and S. Cherry on page 41 of the first issue of the 1998 journal of clinical positron imaging "Dramatically improved count rate performance is the most critical design goal of the dual-purpose gamma camera. Without this, the critically important advances in efficiency cannot be made."

With the advent of this invention coupled with the special 3D-Flow processor, the statement by the same authors "It is likely that further optimization of the gamma camera electronics will improve count rate capabilities by more than a factor of two over present systems." is overcome and solved providing dramatic increases, and many benefits can be derived for the patient and for the nation, because a system capable of sustaining 10 billion events per second for 3D imaging data acquisition and processing can easily be built at a cost not exceeding that of current systems.

Figure 52:
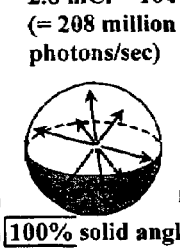

The efficiency of the PET devices for humans today is 0.02% at the most, (because the radiation of the patient is going to the patient areas that are outside the Field Of View—FOV—of the PET device), while the highest intrinsic sensitivity on the true events of today's best PET devices measured on radioactivity uniformly distributed in a phantom of 4700 ml in the FOV is about 0.3% (see FIG. 52). For example, for current devices tested on singles, in order to obtain 500,000 true events per second, today's electronics detect 2.8 million hits total per second out of 167 million gamma rays per second generated by the isotope given to the patient. (See performance of ECAT EXACT HR and reference of F. Jones et al. IEEE, TNS, 1998, second page). The difference between 167 million gamma rays per second generated by the source and the 500,000 detected by the PET camera is due not only to the limitation by the solid angle of the area covered by the detector, but is largely due to the limitation of the current electronics that cannot efficiently distinguish (by executing complex pattern recognition algorithms in real time) a true event from noise, random or scattering at high data rate.

The above 167 million gamma rays used in a transmission test of the device as reported in the article cited above, is far from the maximum radiation given to the patient during exams. Depending on the radioisotope used, today's exams use water with 150 (half-life time is 2 minutes) for a brain study in a maximum dose of about 10 injections of 70 mCi each. This means the patient is exposed to less radiation (315 mrem), but also that 5,550 million photons/sec are generated to the PET, compared to 10 mCi of 18F-FDG which is a higher radiation dose to the patient (1,100 mrem), but generates only 740 million photons/sec (the half-life time of the FDG is 110 minutes). Given that 1 Ci=3.7 1010 Becquerel [Bq] or disintegration per second, one exam ranges from 370 million to 2,590 million disintegrations per second. Considering that one disintegration in this case is the annihilation of a positron with an electron generating two photons traveling at 180 degrees in the opposite direction, the hits of the true events to be detected by the detectors should be doubled. The above maximum figure is in the event that there will be a spherical detector that would cover the full solid angle around the radioactive source. However, PET is made of several rings of detectors (a cylinder of about 80 cm in diameter and about 15 to 25 cm long) which cover about 18 to 30% of the entire solid angle. In addition to the hits of the true events from the annihilation, the detector should have a bandwidth at least four times higher in order to handle the noise, the scattering, and the randoms.

This invention is a breakthrough in providing a solution at a similar cost as the current system but that can sustain an input data rate of 10 billion hits per second and that at that rate complex can perform pattern recognition algorithms on a single hit as well as on correlated hits for better identification of the true events thus for better sensitivity in 3D imaging of the device.

The following is an example of the use of the method and apparatus of this invention for applications in this field. The 3D-Flow system can input data from different detectors types: e.g. photo-multipliers coupled to crystals, or avalanche photo diodes coupled to crystal, multi-wire proportional chambers (MWPC), silicon microstrip hodoscope (see U.S. Pat. No. 5,821,541, October, 1998, Tumer) and others. It can distinguish, track signals of different energy typically detected nowadays from different devices such as CT scan, PET, SPECT, etc. It can combine several medical imaging devices in a single instrument providing a combined 3D picture of the opacity of the tissues and of the biological methabolism occuring in real time in different parts of the body.

A description is provided of the interface of the 3D-Flow electronic apparatus of this invention to the signals (analog and digital) received from different types of detectors. Two examples of implementation (one consisting of 16 IBM PC boards, each with 32 electronic channels and the other consisting of 16 VME 6U boards each with 32 channels) with a total of 512 electronic channels that can handle signals from a detector having a granularity from 4K to 128K small detector areas (the information of each small area can be represented in 64-bit and corresponds to all signals in a small view angle: e.g. crystal, microstrip hodoscope, MWPC, and others).

5.5.2.1 A 60 Times Less Radiation Dose to the Patient or 1 Minute at the Place of 60 Minute Exam Duration.

The replacement of the electronics of the today's PET devices with the electronics described herein which implements the method of this invention to, is providing a 60 times less radiation to the patient or reduces to 1 minute (at the place of 60 minutes) the duration of an exam in the following manner:

The description of two typical PET exam on humans with long duration are reported in two articles, one using the Siemens ECAT EXACT HR (JCAT, vol. 18, No. 1, 1994 pp. 110-118) and another using the GE Advance (JNM Vol. 35, No. 8, August 1994, pp. 1398-1406). The Siemens PET exam acquired a total of 6 million counts per slice (in a total of 47 slices, less counts were acquired in the peripheral slices) over a 60 minutes scanning after injection of 10 mCi FDG. The GE PET acquired 3 million counts per plane for 20 minutes after injection of 8.5 mCi FDG. In the first case about 282 million counts (6 million counts×47 slices) have been acquired during the entire exam, while in the second case 105 million counts (3 million counts×35 planes) have been acquired during the entire exam.

The same number of counts could be acquired with the 3D-Flow system using 60 times less radiation, or by reducing the acquisition time of 60 time. In more detail, by analyzing the exam with more stringent requirements such as the one that is using a 10 mCi FDG and acquiring 282 million count, since the 3D-Flow system (see FIG. 52) can detect over 5 million counts per second with 10 mCi source The overall 3D-Flow apparatus of this example has a sampling rate of 20 MHz with a time resolution of 0.5 ns. The sampling rate has been selected in reference to the LSO crystal which is among those with the fastest integration time of about 45 ns. The 0.5 ns resolution time has been selected as a good compromise between cost and performance of the digital Time to Digital (TDC) converted suitable for high-rate data acquisition systems.

The above features provide the capability of analyzing up to 10 billion hit candidates per second (20 MHz×512 channels) from different subdetectors. The signal from each hit can be analyzed in shape, energy, correlated to neighboring signals and thresholds, and can be correlated to other hits far away in the detector with a time resolution of plus/minus 0.5 ns for time intervals of 8 ns. Each of the 512 small area detector has an average occupancy of receiving a hit every 1 microsecond when there is a radiation activity of 1 billion hit candidates per second. In the event two consecutive hits occur in a time interval shorter than 50 ns, a pileup algorithm could be incorporated in the 3D-Flow processor. The TDC can memorize times of multi-hits when the interval between them exceeds 50 ns. The flexibility of the system to provide the possibility to execute algorithms for resolving pileup and the capability of the TDC to memorize the time information of multi-hits make this system dead-time free. However, the probability of having two consecutive hits on a single small detector area within 50 ns is very small and the hits lost for pileup with the LSO crystal will not justify a radiation activity lower than 1 billion hit candidates per second, the complexity increase in the real-time algorithm. In that case, even without the pileup algorithm, it would still be accurate to state that the dead-time introduced by the 3D-Flow system of 50 ns on a single small detector area when this area has already received a hit is irrelevant and close to zero compared to the current medical imaging devices which have over one microsecond dead-time after receiving a hit on a small detector area.

In summary, the use of the method and apparatus of this invention for applications in this field provides a digital programmable electronics for single photon and positron imaging systems, enabling physicians to enhance the quality of images, reduce patient radiation exposure, and lower examination cost, by means of the use of increased processing rate on data collection from larger detector arrays made of low-cost novel detector technologies.

The increased processing capability directly on each input channel with correlation features on neighboring channels allows for optimization of single photon attenuation correction, better noise and randoms rejection, and for increasing spatial resolution.

Enabling data collection from different detectors and processing them in a programmable form by the user defined real-time algorithm, results in an optimal use of several low-cost novel detector technologies: one providing the best timing, another the best spatial and energy information for obtaining the most accurate spatial resolution, depth-of-interaction (DOI) and time-of-flight (TOF) at the minimum cost.

5.5.2.2 PET/SPECT/CT or PET/SPECT/MRI Electronics System Specifications/Cost

The following is an example of the design of the hardware implementation of the method and apparatus of this invention for medical imaging built either with a) 16+1 VME boards each of the 16 VME boards having 32 electronic channels, or with b) 16 IBM PC compatible boards, each having 32 electronic channels. The total cost of a VME crate or an IBM PC compatible computer with 16 special cards is comparable to the cost of today's electronics for similar medical imaging devices with much lower performance:

16 VME boards (or 16 IBM PC compatible boards) with the 3D-Flow system similar to the one described in Section 5.1. All boards are identical and each performs: a) in FPGAs, the function (similar to the one described in Section 5.4.2) of interfacing the input signals between the detector and the 3D-Flow system, b) in the 3D-Flow stack, the front-end electronics functions listed in FIG. 1, and c) in the 3D-Flow pyramid 1-2, the functions listed in the same figure. Since in this application, the particle identification algorithm is simple, requiring only the identification photons, the cost of the board is lower than the similar board for HEP described in Section 5.5.1. In high energy physics application, the input data rate is twice fast, the algorithm needs to recognize photon, hadron, and electron, and has to do so by analyzing signals from 4 to 5 different types of subdetectors. The cost of the 3D-Flow board for PET/SPECT/CT, etc., requiring only 4 layers of processors can thus be estimated less than half price the cost of a similar board for HEP.

1 VME board (or one IBM PC compatible board) for the second level of "coincidence logic, unmatched hits forwarding, filtering and corrections of the electron/positron annihilations found" implemented in the 3D-Flow pyramid 3-4 (or in a dedicated fix algorithm cabled logic, or FPGA).

1 IBM PC compatible (this is required only in the VME version implementation because in the IBM PC compatible version, these functions are implemented through the motherboard PCI or ISA bus) controlling 17 boards, implementing the function of "3D-Flow System Monitor" described in Section 5.4.7. In summary, the "System Monitor" loads the programs into each processor, detects malfunctioning components during run-time, excludes a malfunctioning processor with software repair by downloading into neighboring processors a modified version of the standard algorithm, instructing them to ignore the offending processor.

Every 50 ns the entire electronic system can acquire up to 64-bit of information from 512 electronic channels from several subdetectors (LSO/APD, or LSO/PMT, and/or photodiodes, and/or different functional devices such as MRI, or CT for multimodalities device implementation). The operations to be performed on the data received on the input channels at the rate of up to 10,240 million hits/sec (for a system with 512 channels) are programmable and are those typically performed such as signal analysis and correlation.

Besides operating in a general pipeline mode which allows the input data rate of 20 MHz to be sustained, with no dead-time, there is also the provision to execute stages with indivisible complex operations which require an execution time of more than 50 ns (such as the one requiring information from a neighboring element for Compton-scattering correction, or for full energy reconstruction of the hit.

The choice to run in listmode at 20 MHz was dictated by the LSO detector response of about 45 ns and thus it was not necessary to acquire data at a faster rate. Any hits, however, on any detector channel within the time window of 50 ns are recorded with their time information with a resolution of 500 ps (see details of the time-to-digital operation later in this section). The 3D-Flow system is scalable in size, speed, and performance, allowing it to run at a higher sampling rate in the event other faster detectors are used in the future.

Figure 53:
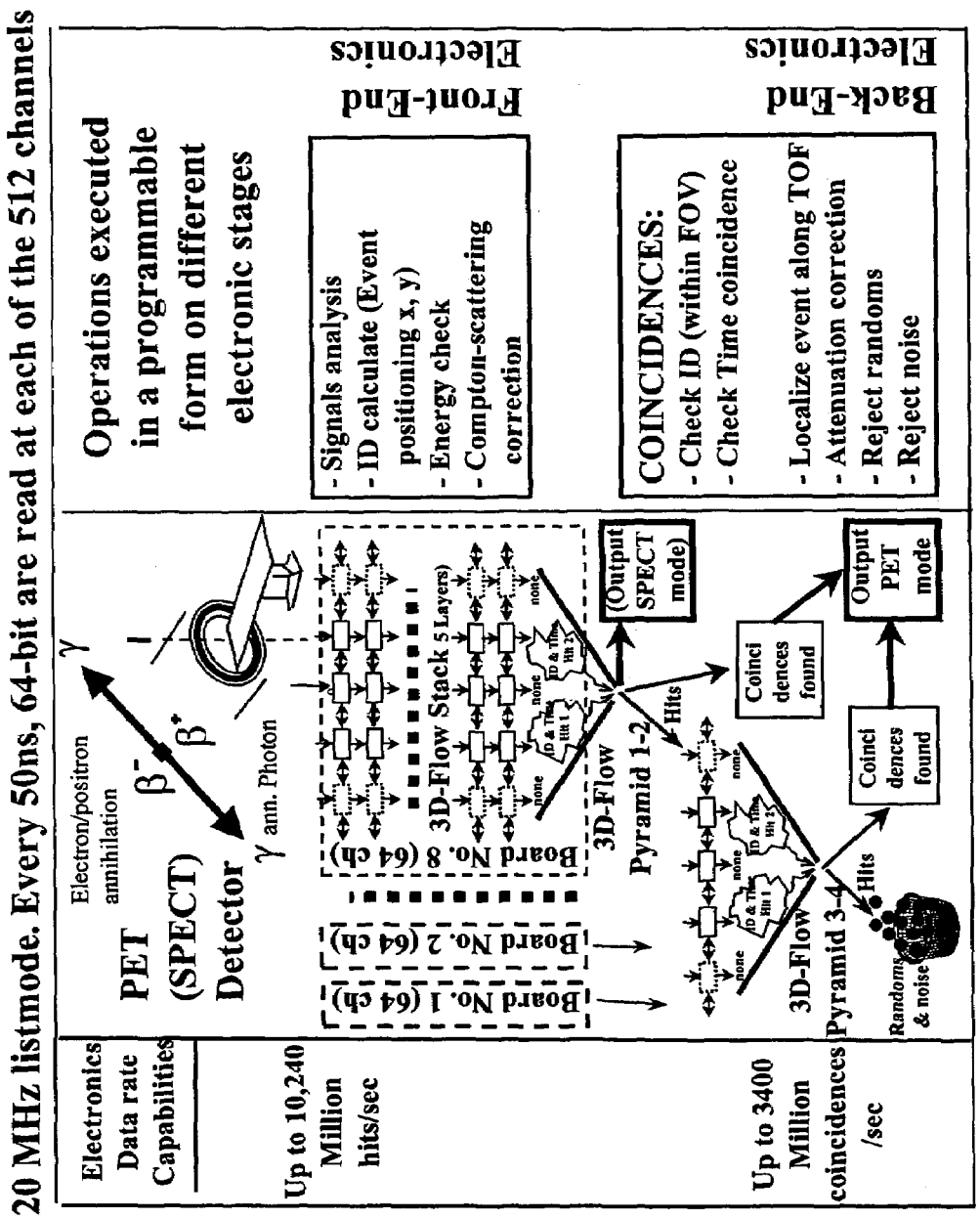

FIG. 53 illustrates the programmable 3D-Flow system for real-time data analysis and correlation from PET/SPECT/CT, etc., devices. The electronics data rate capabilities (10,240 hits/sec=512 channels×20 MHz sampling rate) are dictated by the radiation activity of the source given to the patient and the overall volume covered by the PET/SPECT detector.

The signals from the PET/SPECT/CT, et., detector are converted into digital and formatted to be interfaced to the 3D-Flow system via ADC and FPGA in a similar way as described later in this section. One additional element, i.e. the time-to-digital converter (TDC) chip/function is described later in this section.

Each 3D-Flow VME board handles 32 electronic channels (each with 64-bit information every 50 ns), 16 VME boards (or 16 IBM PC compatible boards) handle the total 512 channels from the detector. The reason for having more than one layer of 3D-Flow processors (called stack) is that the front-end algorithm is envisioned to require a processing time longer than the 50 ns time interval between two consecutive input data thus the technique of extending the processing time in a pipelined stage described later in this section is applied. (See later in this document for a description of the functions typically implemented by the stack unit of the 3D-Flow on the front-end data).

Within the same 3D-Flow board where the stack is implemented the first two layers of the pyramid are also implemented. This is for the purpose of reducing the number of cables that carry out the results of the no-matching hits and coincidences found. Of the total 512 input channels, there are only 32 channels (4 pair of wires in a single cable carry out the information with LVDS signals from each of the 8 VME boards) going out from the system to the next layers (3 and 4) of the pyramid implemented in the ninth VME board. (The IBM PC compatible implementation would have only 2 pair of wires from each board carrying out the results of the coincidences and of the no-matching hits).

In SPECT operation mode, a different real-time algorithm recognizing hits at lower energy is loaded into the 3D-Flow processors of the stack and a different real-time algorithm that will output all the hits found is loaded into the pyramid. The functionality of the additional ninth board with pyramid layers 3 and 4 is not used in this mode of operation.

The electronics of the 3D-Flow pyramid layers 3 and 4 in the ninth board, further checks for coincidences in groups of 4+4 hits in opposite detector areas (the detector area of the search for coincidences the opposite location of the detector increases at each layer).

At the last layer of the pyramid, the search is made over the entire detector and all noise and randoms are rejected, while the coincidences found along the way of the different layers of the pyramid are collected for display of the image in PET mode.

5.5.2.3 Calculation of the System Throughput

The limiting factors for the throughput of the system are: the 3D-Flow processor speed (80 MHz), the 3D-Flow input/output speed of the Top and Bottom ports (160 Mbyte/s), the sampling speed of the PET/SPECT/CT, etc., detector (20 MHz), and the input and output data word size (64-bit).

The output word of the bottom ports of each 3D-Flow processor must not exceed 64-bit. Several criteria have been taken into consideration in order to optimize the throughput while providing flexibility for the system.

First the extraction of the coincidences is done in parallel on small opposite fields (or area) of the detector with the highest probability to have an electron/positron annihilation.

Figure 54:
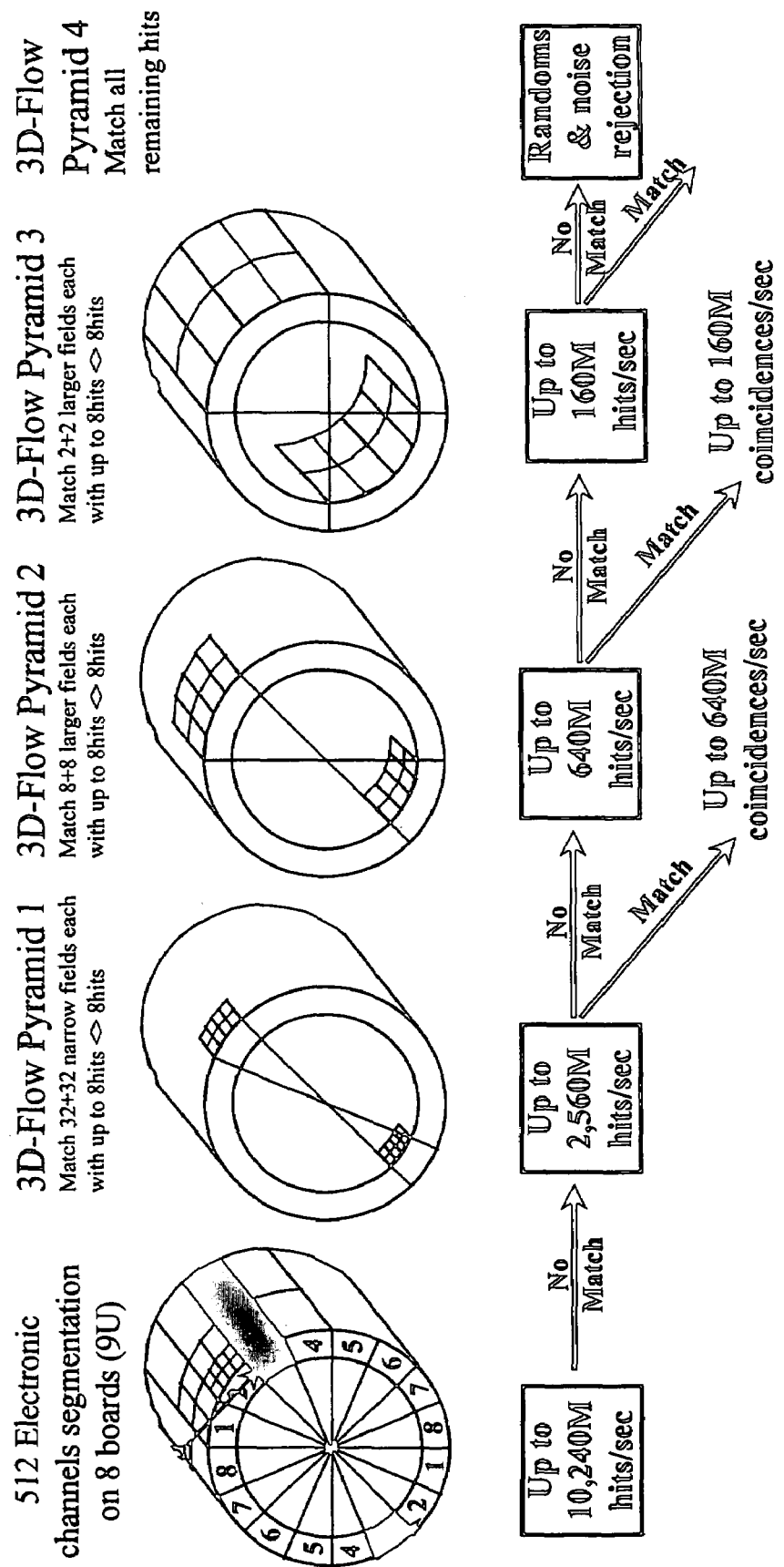

The 3D-Flow system of the pyramid checks (see FIG. 54) for coincidences in groups of 4-hits against 4-hits on the opposite side of the detector. In the event some hits have not found a coincidence, they are forwarded to the next layer of the 3D-Flow pyramid for a check against a larger area of detector channels in the opposite location.

At each layer, for every pair of 4-hits checked, the system allows for the output 2-coincidences to be found and sent and for 4-unmatched hits to be forwarded to the next layer in the pyramid.

The hits in each layer that did not find a coincidence with hits in the opposite side of the detector are not discharged but are checked again in the next layer of the pyramid with hits belonging to a larger detector area in the opposite side of the detector.

The search area for hits with coincidences progressively increases at each layer of the pyramid until the search for coincidences is made among all hits remaining in the entire detector.

Since the system is pipelined, it can sustain the input data rate of 20 MHz.

This approach allows for each hit in one semi-barrel detector to be checked for coincidence against almost all the hits in the opposite semi-barrel detector. In order to increase the probability of the hits at the border of the semi-barrel (arbitrary defined) finding a match in the opposite location of the barrel, the entire system should be rotated of some angle, say 11.25 degrees, 22.5 degrees, or 45 degrees as the coincidence finding function moves toward the last layers of the pyramid.

Figure 9:
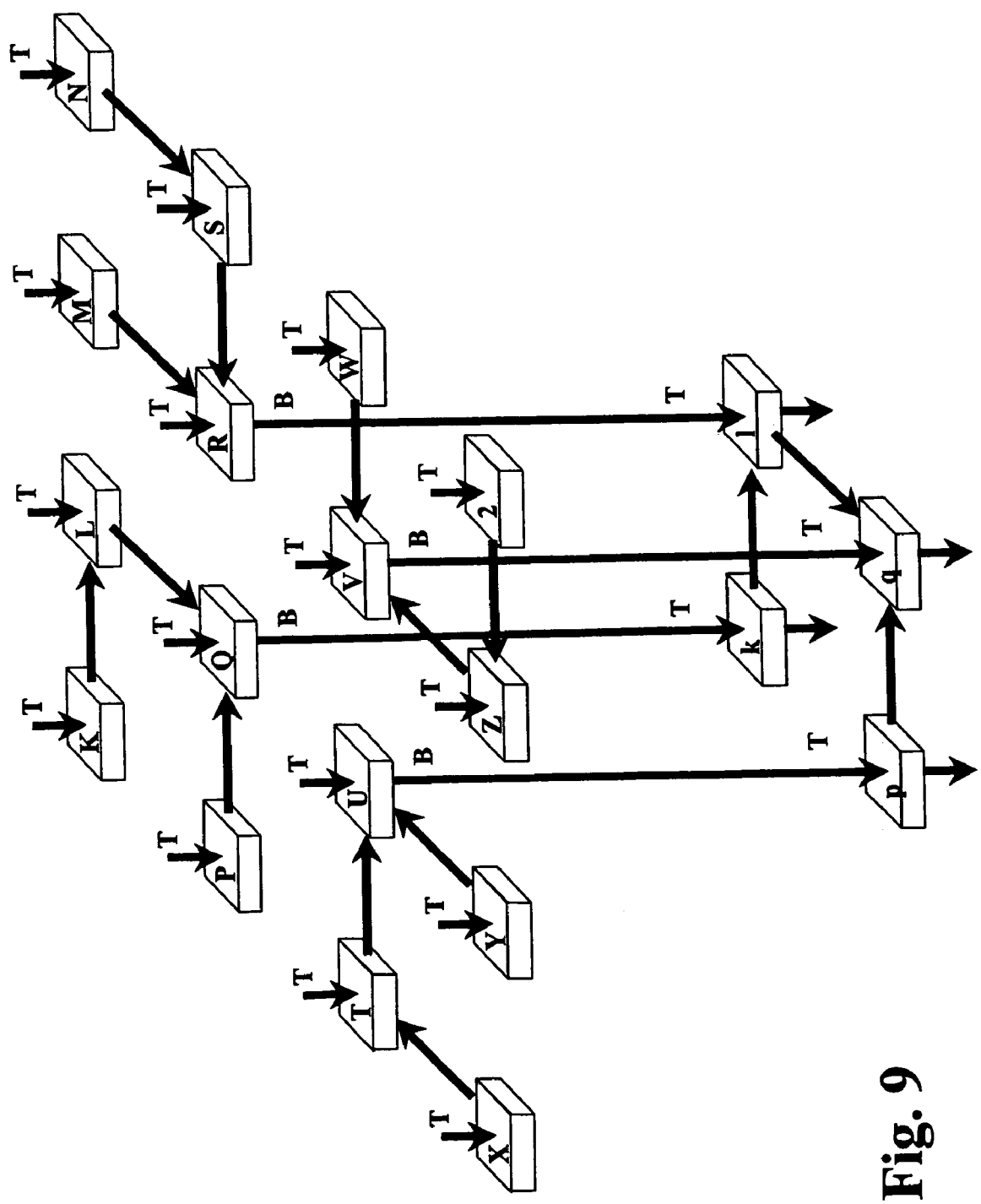

Second, the 3D-Flow processor has the programmability that allows for the operation of multi-compare, add, subtract, multiply-accumulate and data move to be executed efficiently. While it moves the data at each layer of the pyramid from 16-processors to 4-processors as shown in FIG. 9 (for the implementation of the function of channel reduction), it can also execute all the back-end operations listed in FIG. 53 in a programmable form. In the event the back-end operation turns out to be simple and there is no need of programmability, the coincidence circuit could be replaced with cable logic; however, for fast development and optimization on different types and sizes of detectors, the programmability of the 3D-Flow system may be very useful.

The output word from the Bottom port of the pyramid that carries the information of one possible coincidence and one unmatched hit is estimated as follows (changes could be made, depending from the size of the detector, the number of elements, the resolution of the TDC, etc. At this stage of the electronics, the information of a coincidence and an unmatched hit can be carried on 64-bit, while at the last stage of the electronic chain, the data can be written in the format according to the PETLINK protocol proposed by CTI):

Every 50 ns, the 64-bit output word is sent to the output Bottom port.

Consequently, the maximum throughput of the system can be calculated as follows (The intermediate figures of the calculation of the throughput have been applied to the VME version. The IBM PC compatible version, even if it has the intermediate figures of this calculation which differs due to the double number of boards, the total throughput is the same):

The output of the first layer of the pyramid contains ¼ of the 512 input channels of the system (128-output Bottom ports). Each output channel may have a coincidence found, and/or an unmatched hit. The throughput at this layer will then be 128*20 MHz=2,560 million coincidences or/and unmatched hits.

The output of the second pyramidal layer will have a 32-output Bottom ports, which is equivalent to 32*20 MHz=640 million hits/sec.

The next pyramidal layer will have an 8-output Bottom ports, which is equivalent to 8*20 MHz=160 million hits/sec.

The pyramidal layer after that will have a 2-output Bottom ports, which is equivalent to 2*20 MHz=4 million hits/sec.

The sum of all possible outputs at the different stages of the pyramid is 3,400 million coincidences per second.

5.5.2.4 Operations Executed in a Programmable Form on Different Electronic Stages Each of the 512 channels receives data from the detector which contain some information on the particle that hit the detector. The purpose is to recognize photons at 511 keV that have a match in time and position with another hit in another location of the detector. All criteria of the two particle found should respond to the characteristic of an annihilation electron/positron.

Among the 64-bit of information that each channel receives every 50 ns there is information on timing, energy, geographical location of the hit, or the shape of the signal from a given detector may provide a combination of the above and additional information. (not all bits are expected to be used, however, the 3D-Flow system gives the possibility to the detector designer to use any combination of subdetectors which could provide useful additional information to identify the event)

Typical operations of fetching data associated to pattern recognition with neighboring information for particles identification range from 4 to 16 steps. Since the 3D-Flow processor runs at 80 MHz and the input data rate from the PET/SPECT/CT, etc., detector is set to be 20 MHz in this application example, 16 steps will require 4 layers of 3D-Flow processors. (This is a conservative number of steps since only one type of particle has to be recognized).

The operations (see list in top right of FIG. 53) executed on the front-end electronics (stack of the 3D-Flow) require fetching data from input, normalizing input values by multiplying by a calibration constant or by using lookup tables (each 3D-Flow processor has four data memories for buffering or lookup tables), exchanging data with neighbors, adding, or adding-multiplying while moving data, comparing with different thresholds, finding local maxima (a special 3D-Flow instruction can execute this operation in a single cycle), finding the center of gravity of the hit in order to increase spatial resolution.

The 3D-Flow processor has the functionality to execute the above operation in a sequence of 10 to 20 128-bit wide instructions. To facilitate the writing of the 20 lines of code and to simulate them a set of macros has been developed. A set of software tools described in Section 5.4.4 has been developed to create the real-time algorithm and simulate it. The user creates a new algorithm by copying one macro after another from a library of macros, (e.g. input data, send to neighbors, receive and add, find local maxima in a 3×3, find a local maxima in a 5×5), in a user defined area and then simulates it.

A different set of 3D-Flow macros has been defined for the operation to be executed in the back-end electronics in the pyramid. An example of macros to implement the functionality of the operations listed at the bottom right of FIG. 1 is the following. The processor checks for data (hits) at the 5 input port of the processor. In the event a new hit-data arrive, its field of the time-stamp is checked against the ones in its circular buffer, if a match is not found within a given time-range, it is copied in the circular buffer and passed on to the next layer for further checks. In the event a match is found, a check is made with a preloaded value in one of the lookup tables for the verification that the hit belong to an area with an acceptable field of view (FOV). Next, the localization of the annihilation along the time of flight is calculated by subtracting the normalized time of the two hits. Finally, having calculated the location of the annihilation, the attenuation correction within a precision of 15 cm (corresponding to 500 ps resolution of the TDC) is applied, it is validated and sent out as a valid coincidence.

5.5.2.5 Achieving the Time Resolution of 500 ps at an Affordable Price

Before the digital TDC were on the market, only analog TDCs which normally have a better accuracy (<50 ps) were available. They have a very long dead-time, however, and usually can record only one hit. These TDC cannot be used in high-rate data acquisition. Most recently, however, digital TDC have been developed that can record multi-hits with a resolution of 50 ps. The cost of such digital TDC will be too high and will also increase the cost of the associated electronics. For the above reasons, a multi-hit digital TDC with a resolution of only 500 ps and 24 or 32 channels per chip is the most appropriate for the proposed project. The TDC, the cost of which is about $2 per channel, come in a 144 PQFP package of 22 mm×22 mm. Only 16 chips (two per board) will be needed for the proposed project.

At any time during the time interval of 50 ns between the acquisition by the 3D-Flow system of two consecutive sets of digital input data, the TDC can memorize a signal received from the detector by the analog interface with a time resolution of 500 ps.

The simplified operation of the TDC can be described as a continuous running counter (a single counter for each group of 32-channels in a chip). When a signal is received from one of the 32-inputs, the current value of the counter is copied into a buffer. More hits could arrive within 50 ns, thus more values are copied into the TDC buffer. Typically the rate of hits at a single channel of the detector is much lower than 20 MHz.

While there is no problem of relative time measurement between channels within the same chip because there is only one counter, there might be a problem of counter alignment between different chips residing on the same board or on different boards. This problem can be overcome by making an accurate distribution of the signal of the reset of the counters of the TDC. The skew of the signal at the different location of the components should be minimal as described in Section 5.4.6.

A calibration of the system will correct all discrepancies from the different channels. A possible calibration of the system could be the following: a radioactive source is placed and moved longitudinally along the center of the detector barrel. The time measurement on one end of the detector (TDC counter value) should correspond to the time measurement of the sensor along the line passing through the radioactive source and located in the opposite side of the detector. Any count difference between the two counters should be memorized as a counter offset during subsequent measurements.

5.5.2.6 Feasibility of the Construction of the Above Described VME and IBM PC Compatible Versions with the Current Technology The IBM PC compatible version of the example of implementation described above can be built because similar hardware integration on an IBM PC board is proved to be possible with current technology. FIG. 38 shows a layout of the components on an IBM PC compatible board for the functions described in the example above. All dimensions are scaled to the real sizes of boards, components and connectors. The problem of carrying 32 analog channels with some digital channels through the small back panel of an IBM PC compatible board is not a problem because there exist on the market PCI boards with 64 analog inputs (e.g. CYDAS 6400 from 2HR from CyberResearch has 64-channels A/D with 16-bit resolution, 8 digital input and 8 digital output in a single connector). The mother board accommodating 16+1 special 3D-Flow board in the version IBM PC compatible could be accommodated on a standard motherboard PBPW 19P18 from CyberResearch (this motherboard has 18 PCI+1 slot for CPU, or one ISA and 17 PCI). FIG. 38 show the layout of the components on the 3D-Flow IBM PC compatible version. The interconnections among the 16+1 IBM PC compatible boards can be accomplished with cables on the long top side of the IBM PC compatible board.

Figure 36:
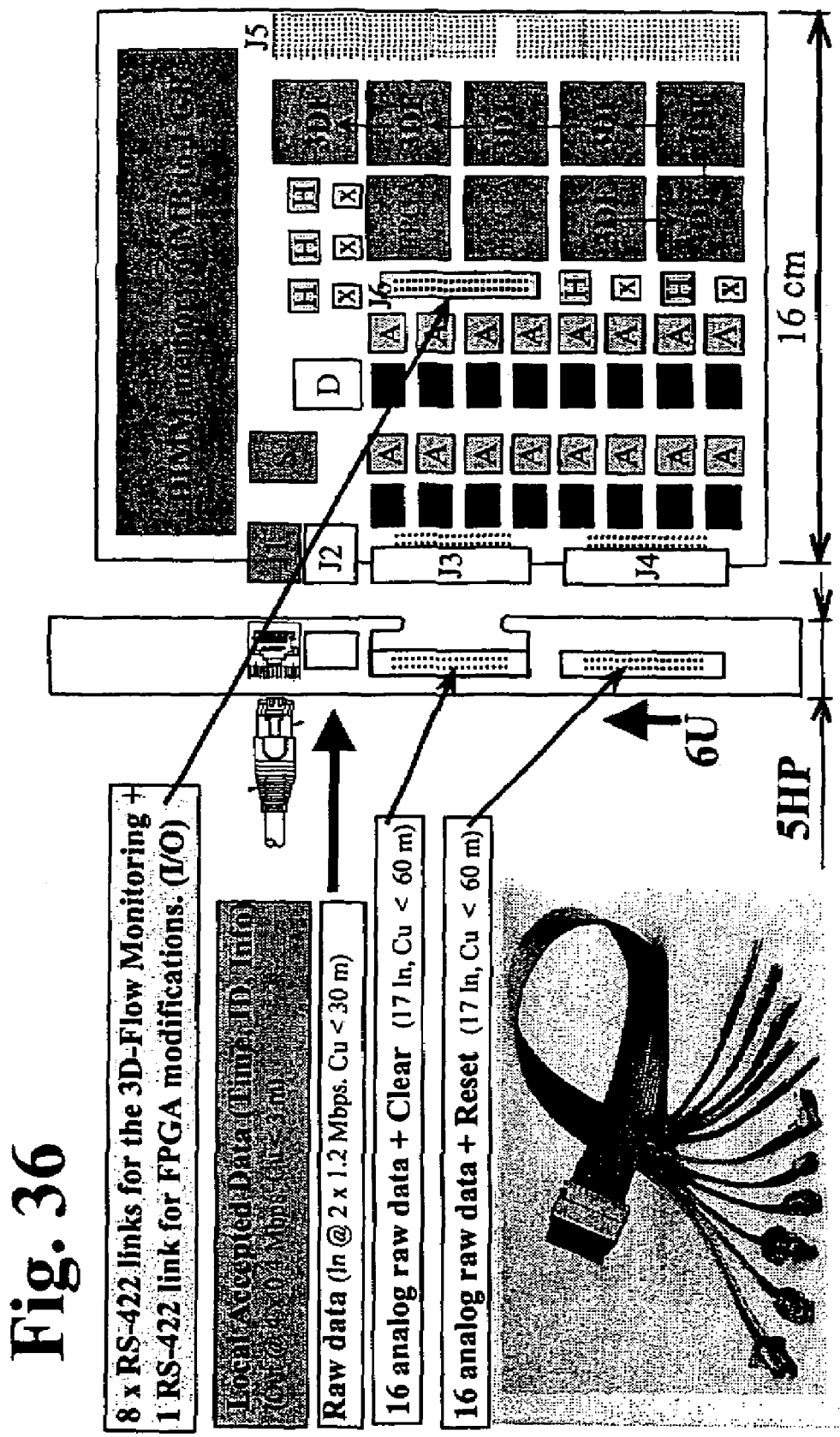
FIG. 36 shows the front view of a mixed-signal 6U VME board accommodating 32 channels processed by a stack of 5 layers of 3D-Flow processors with a 3 layers filtering and channel funneling partial 3D-Flow pyramid.
Figure 37:
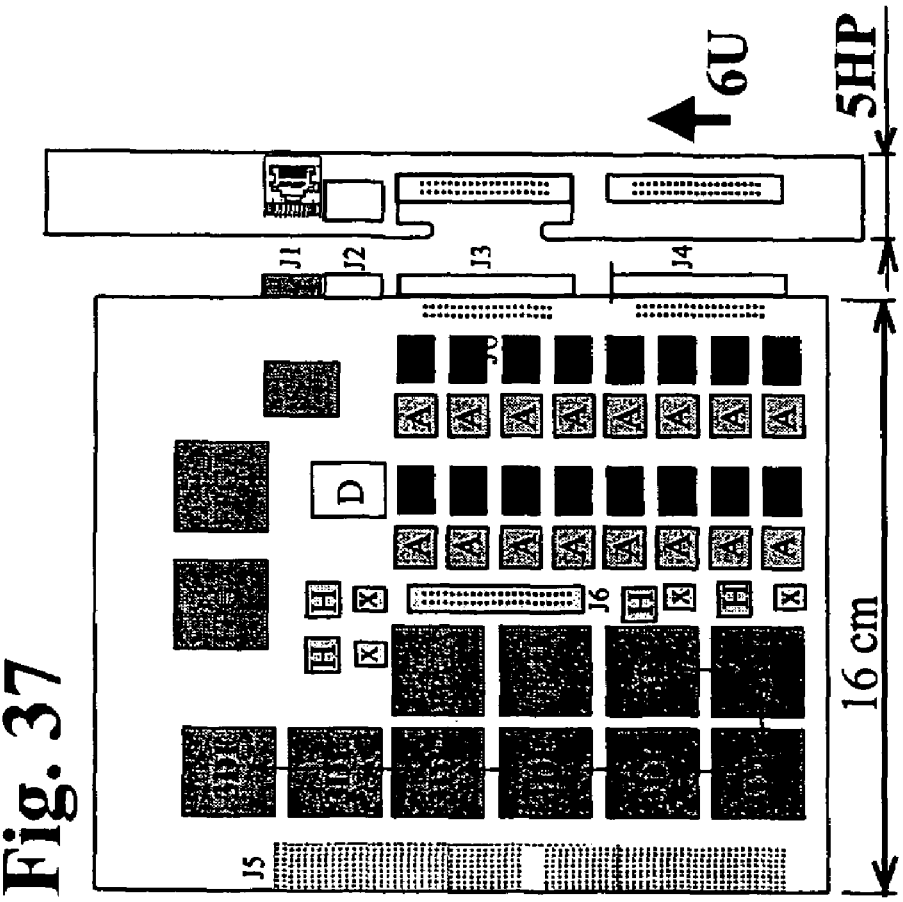
FIG. 37 shows the rear view of a mixed-signal 6U VME board described above. A table with the list of component is provided on the right of the figure.

The VME version with 32-channels is shown in FIGS. 36 and 37.

5.5.3 Robot Applications

In this type of applications, the method of this invention does not require a specialized processor such as the 3D-Flow be designed, but the architecture can be implemented with the construction of external "bypass switches" interfaced to commercial processors such as DSP TMS320C40, or DSP TMS320C80.

Figure 10:
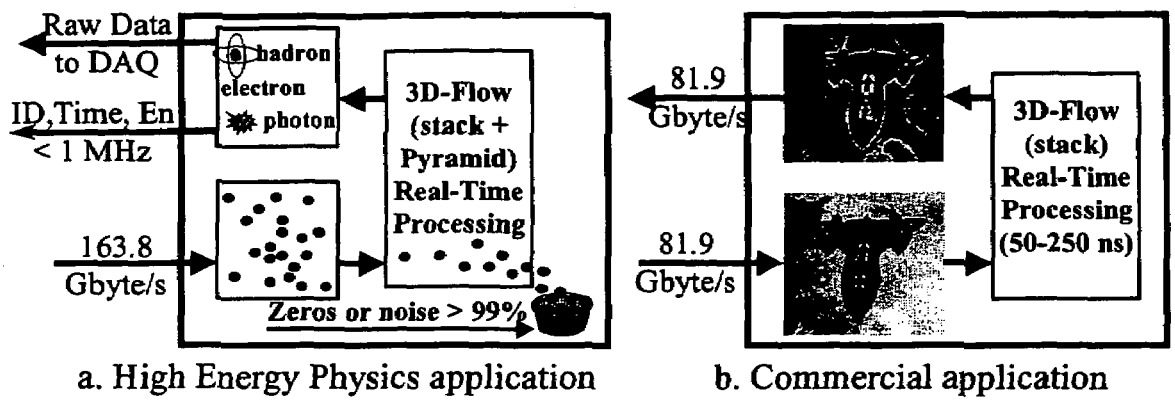
Figure 11:
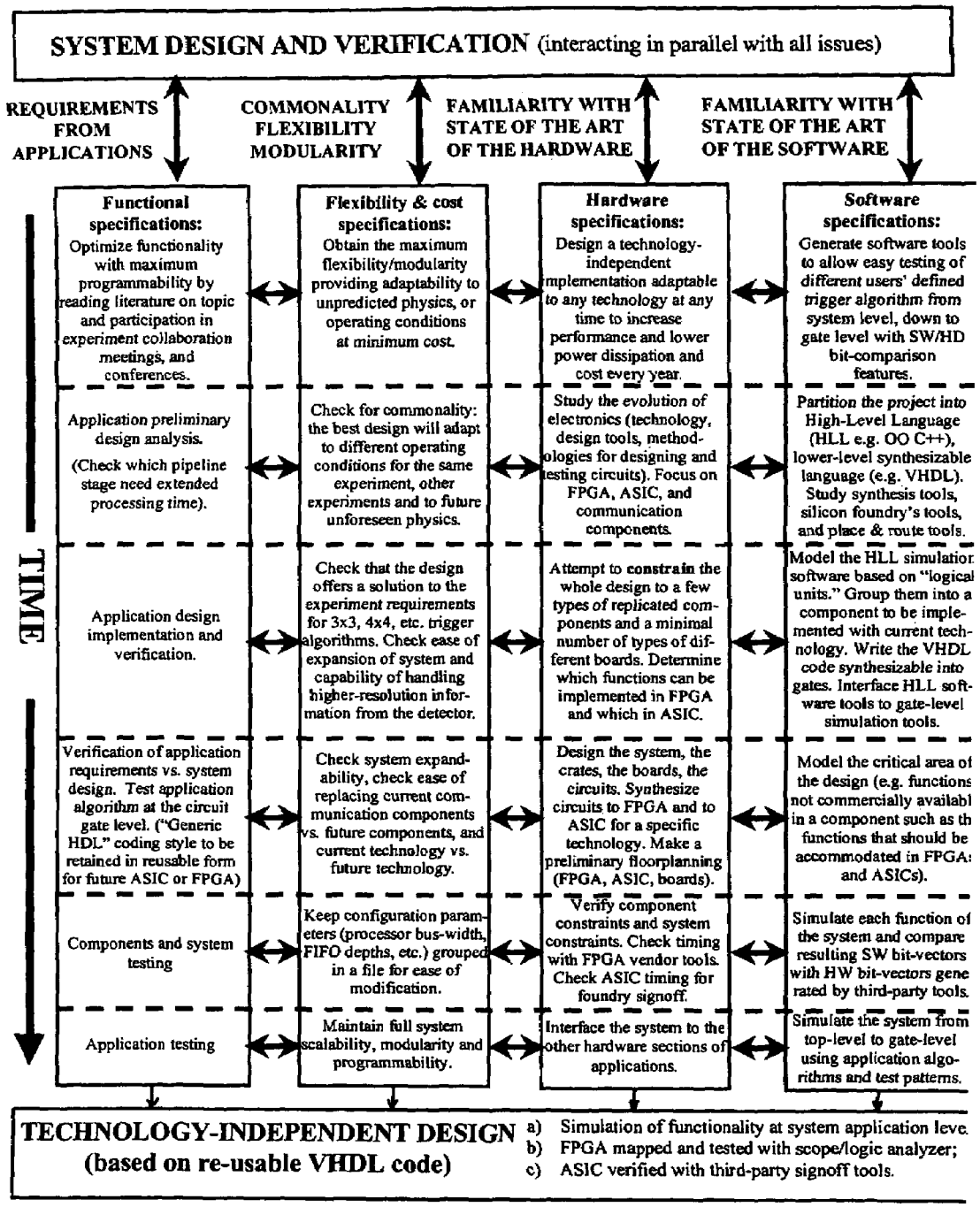
Figure 13:
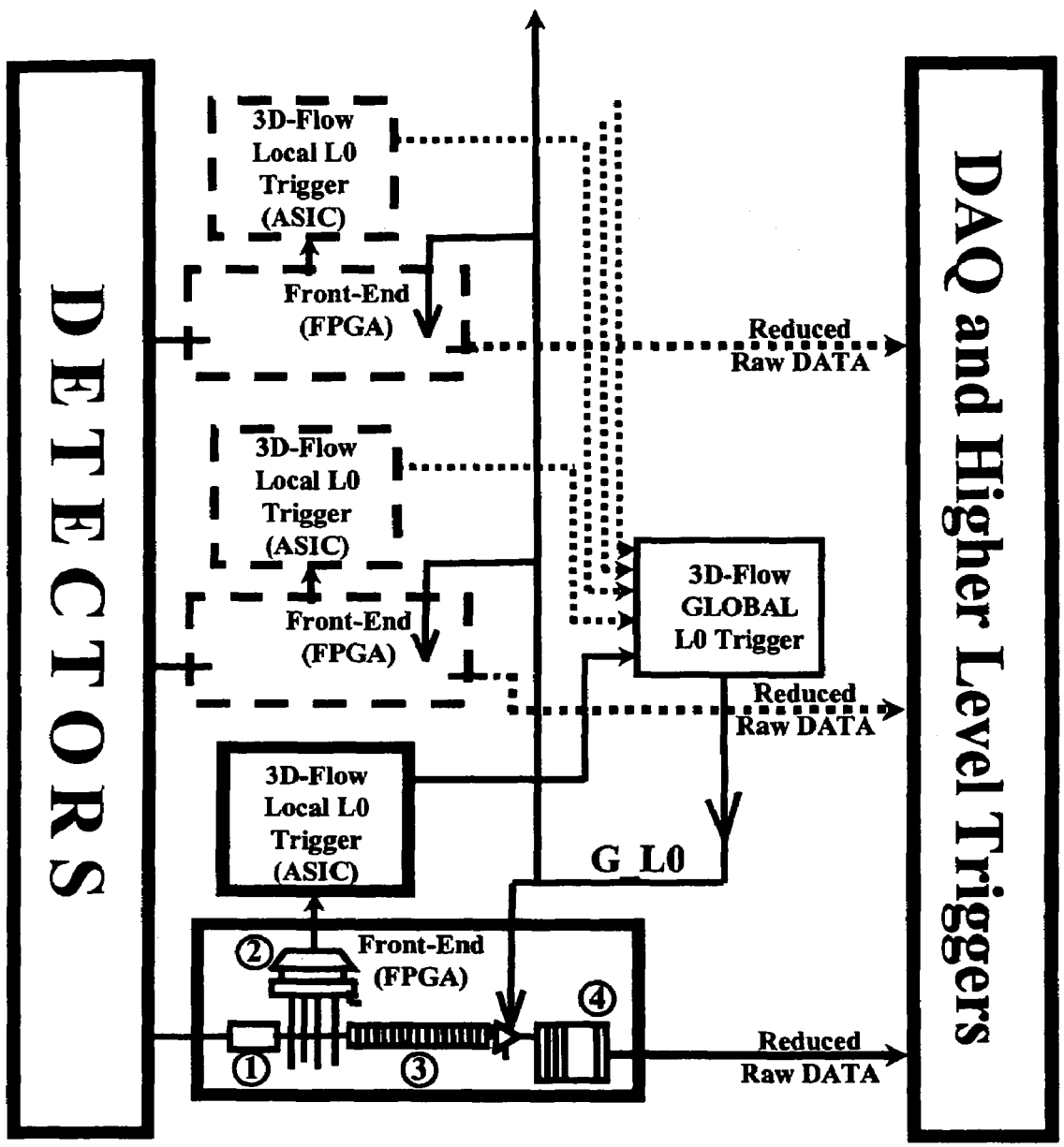
Figure 14:
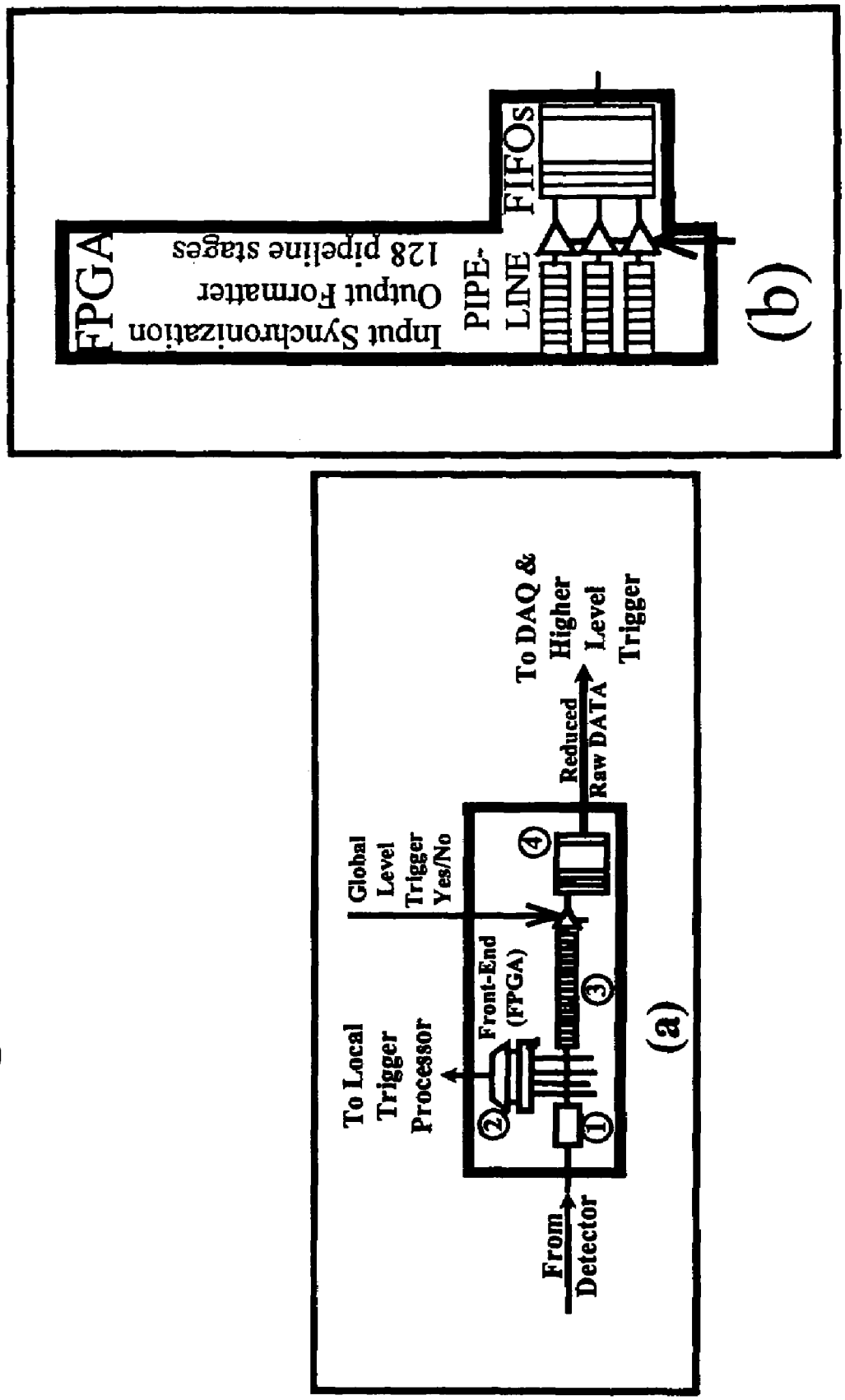
Figure 15:
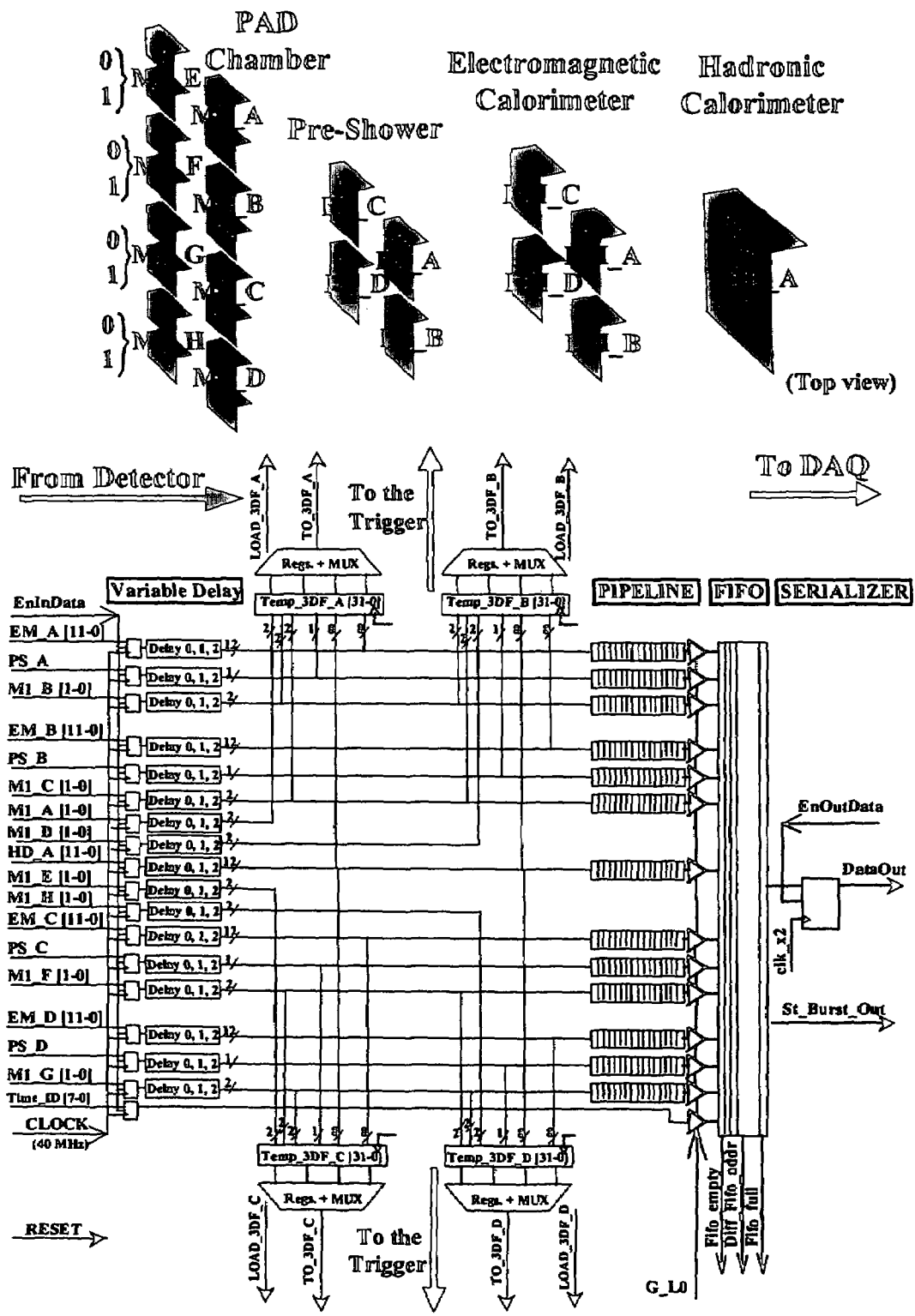
Figure 16:
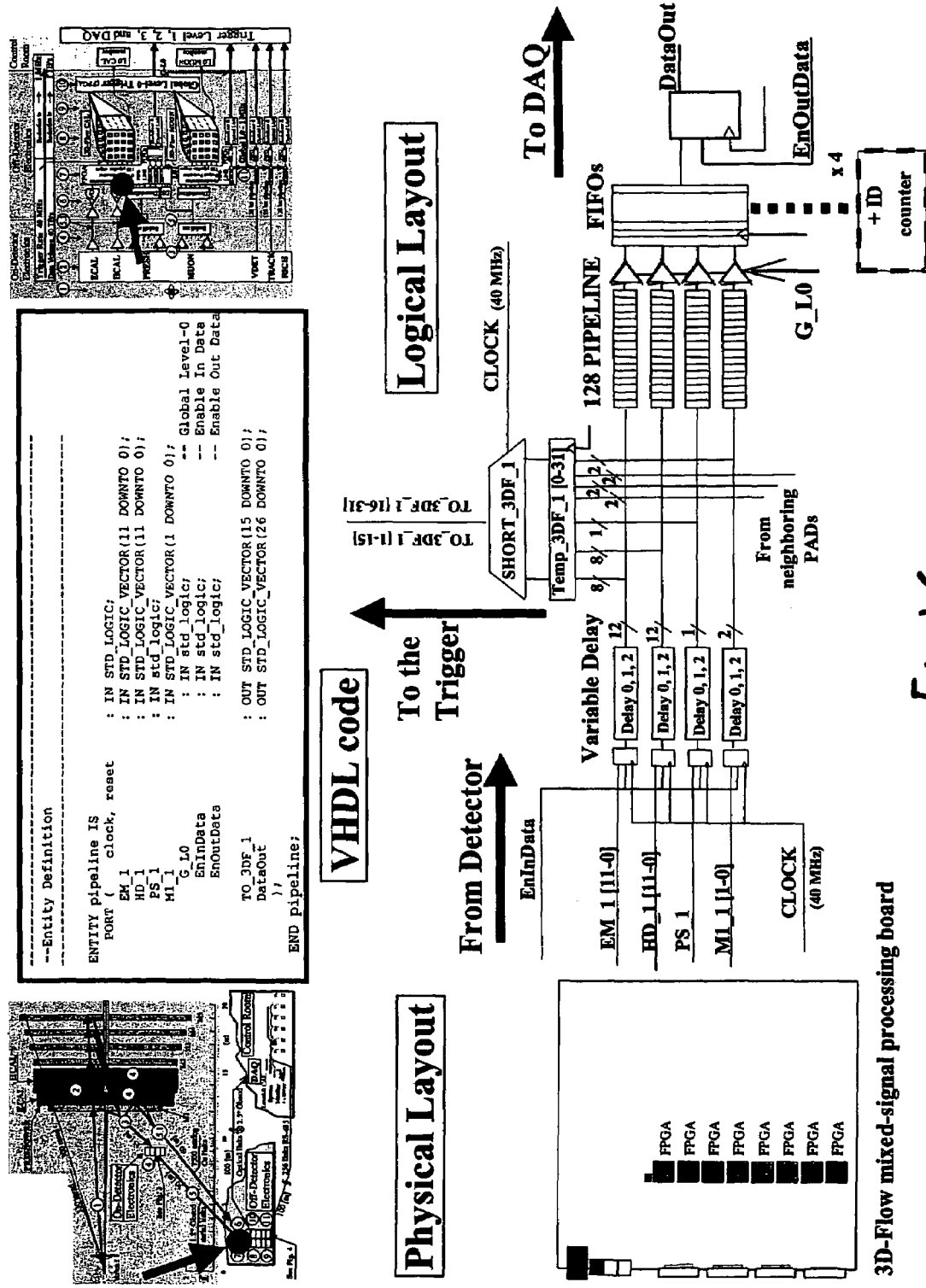
Figure 17:
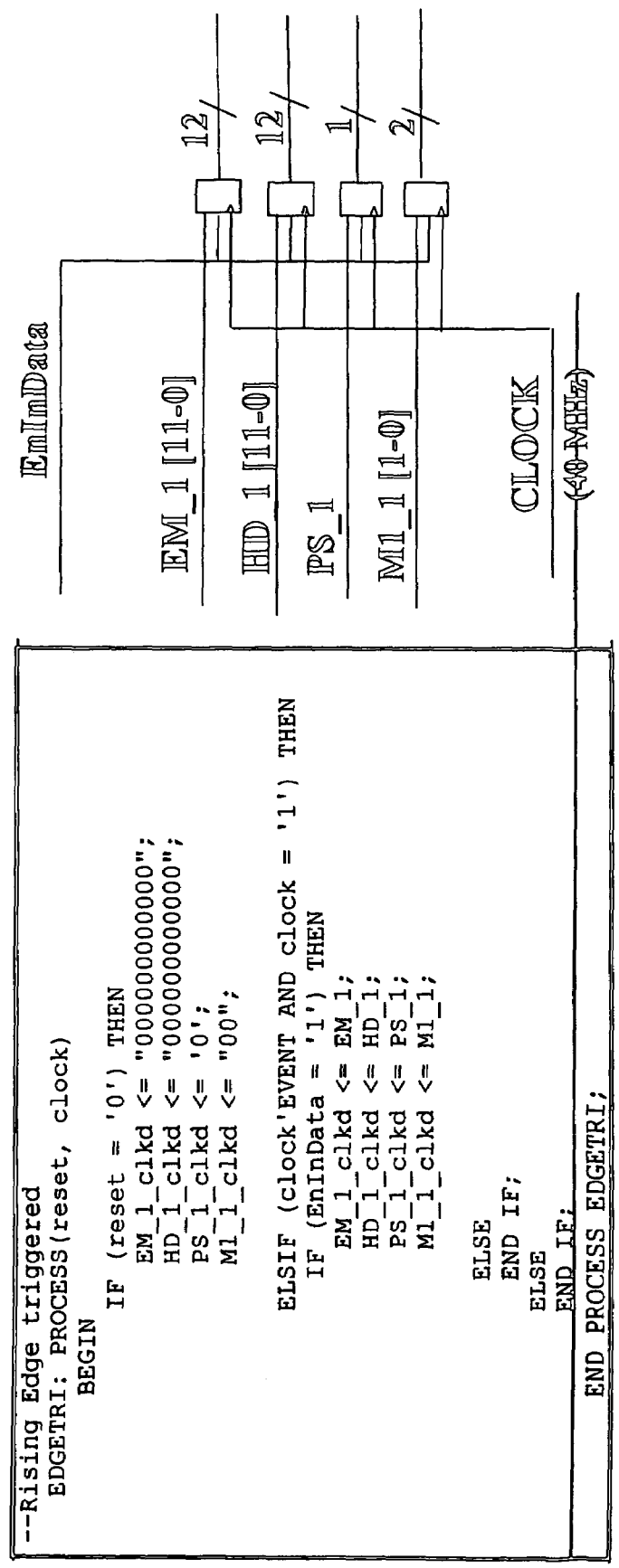
Figure 20:
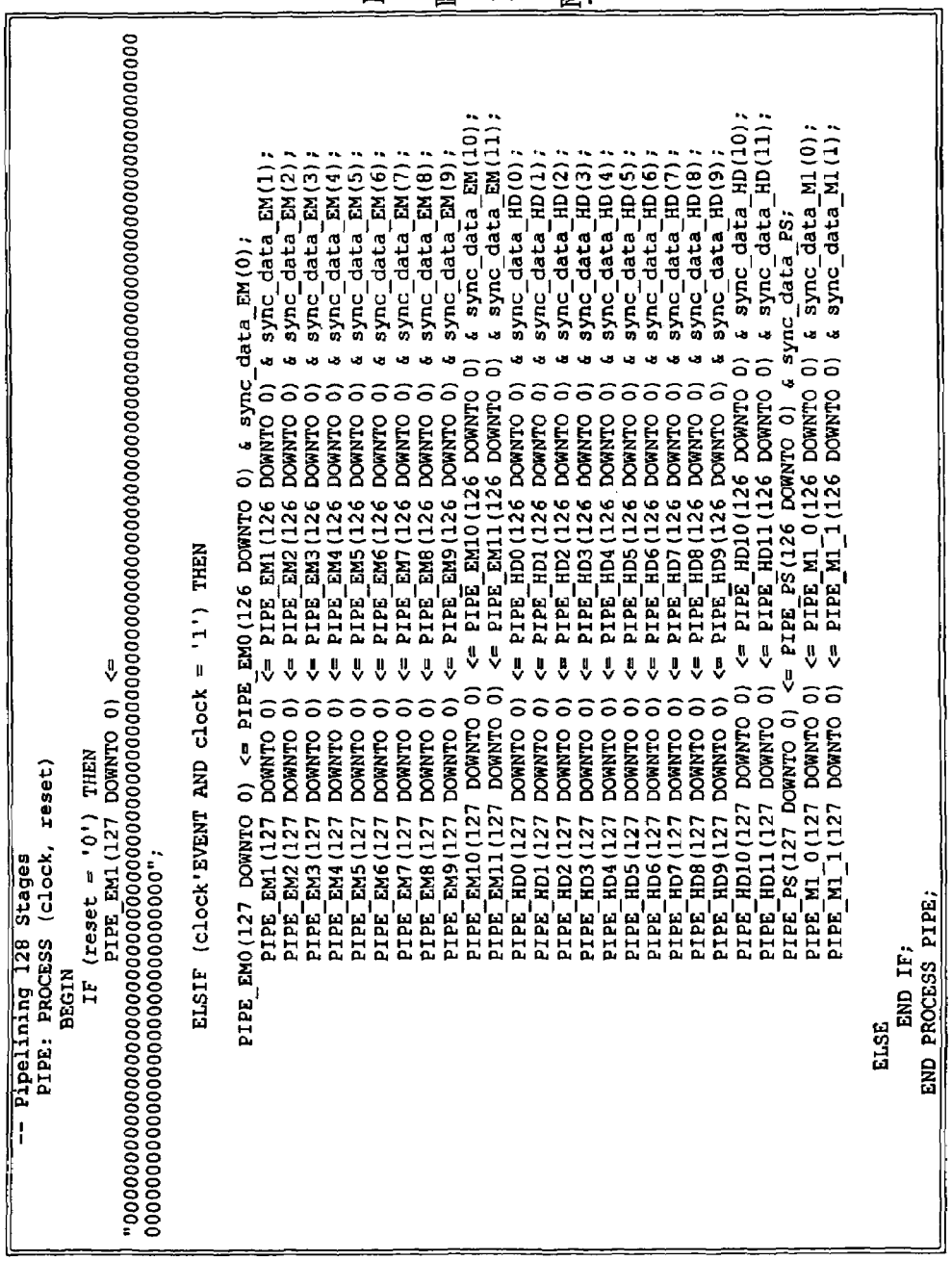
Figure 21:
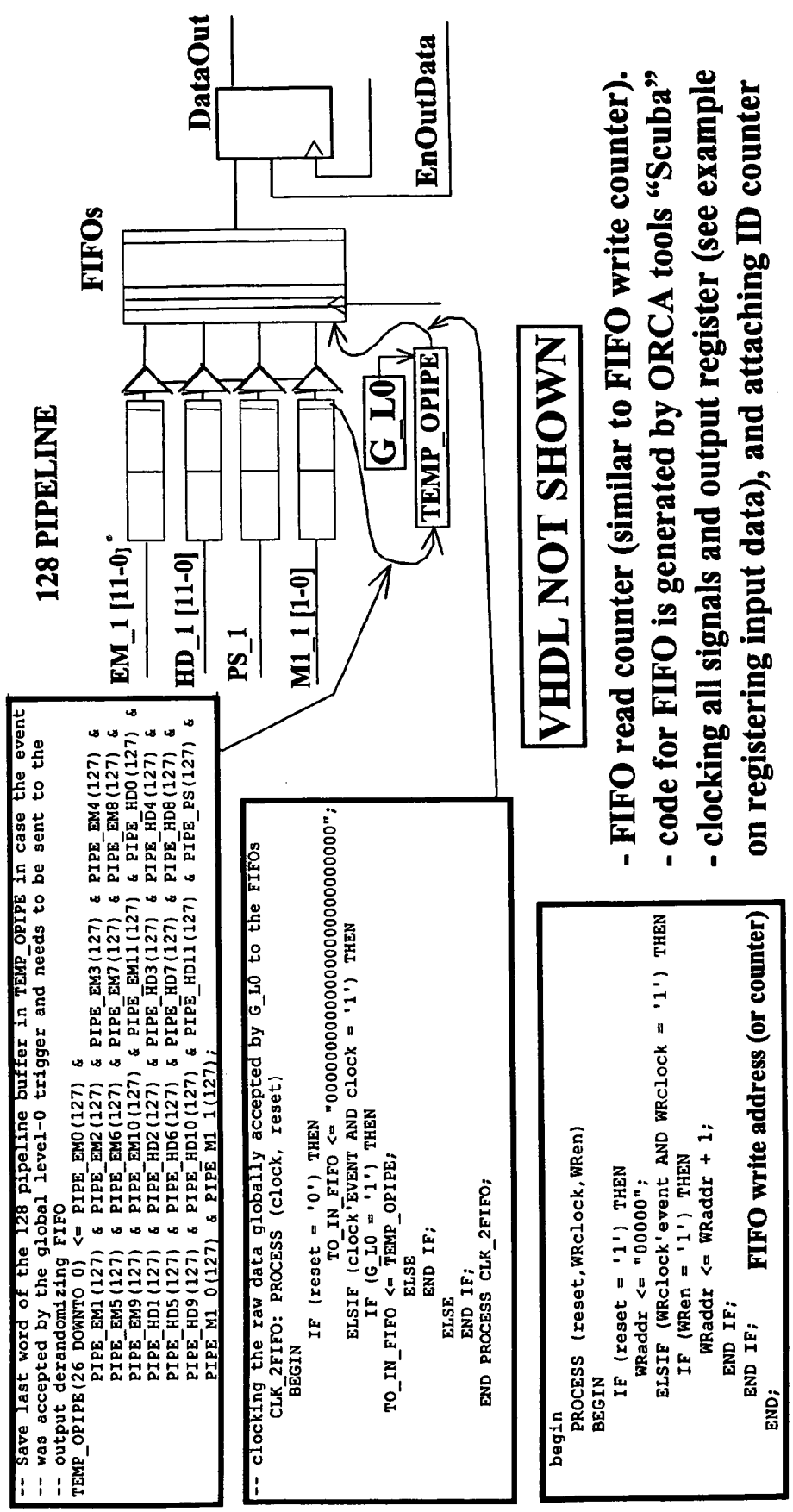
Figure 22:
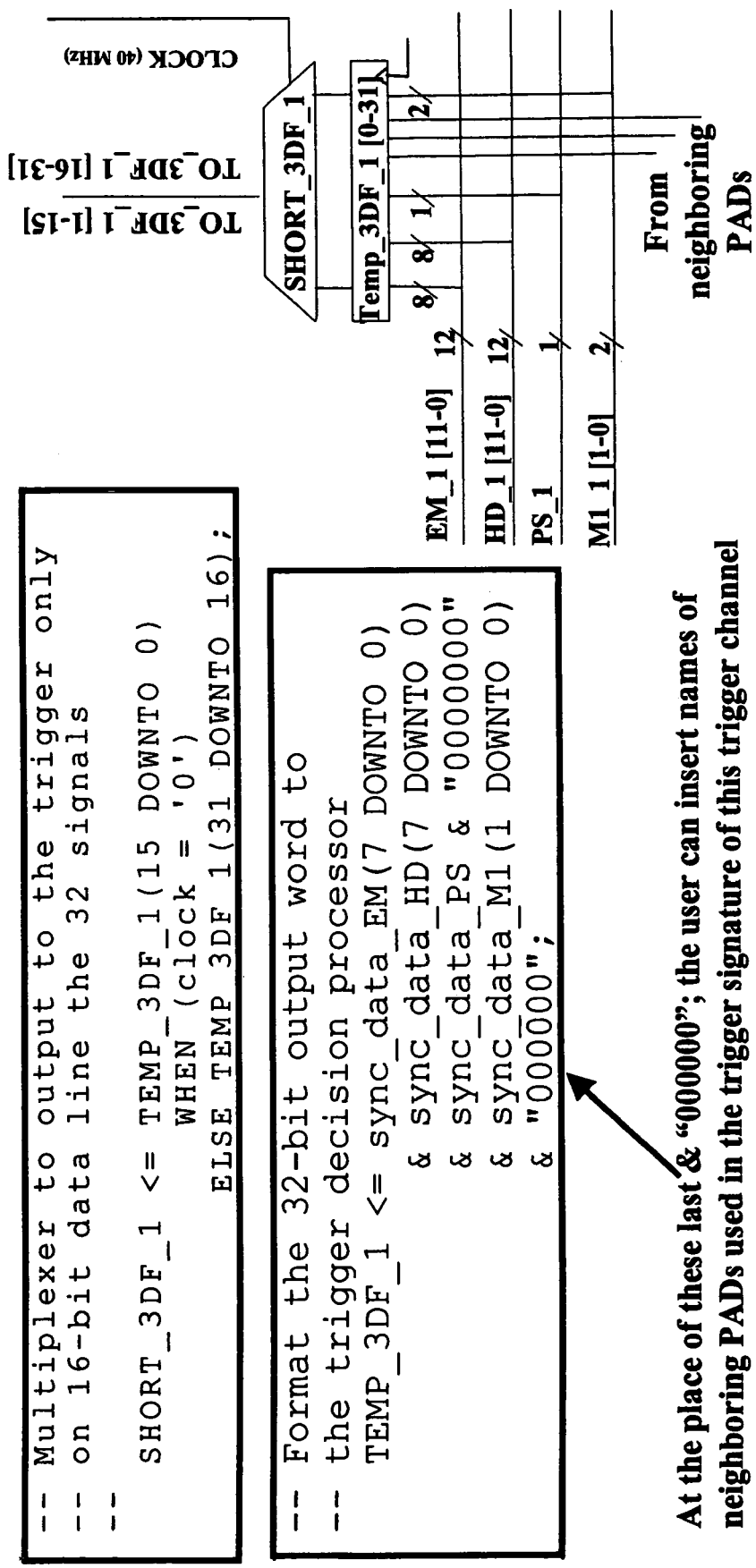
Figure 23:
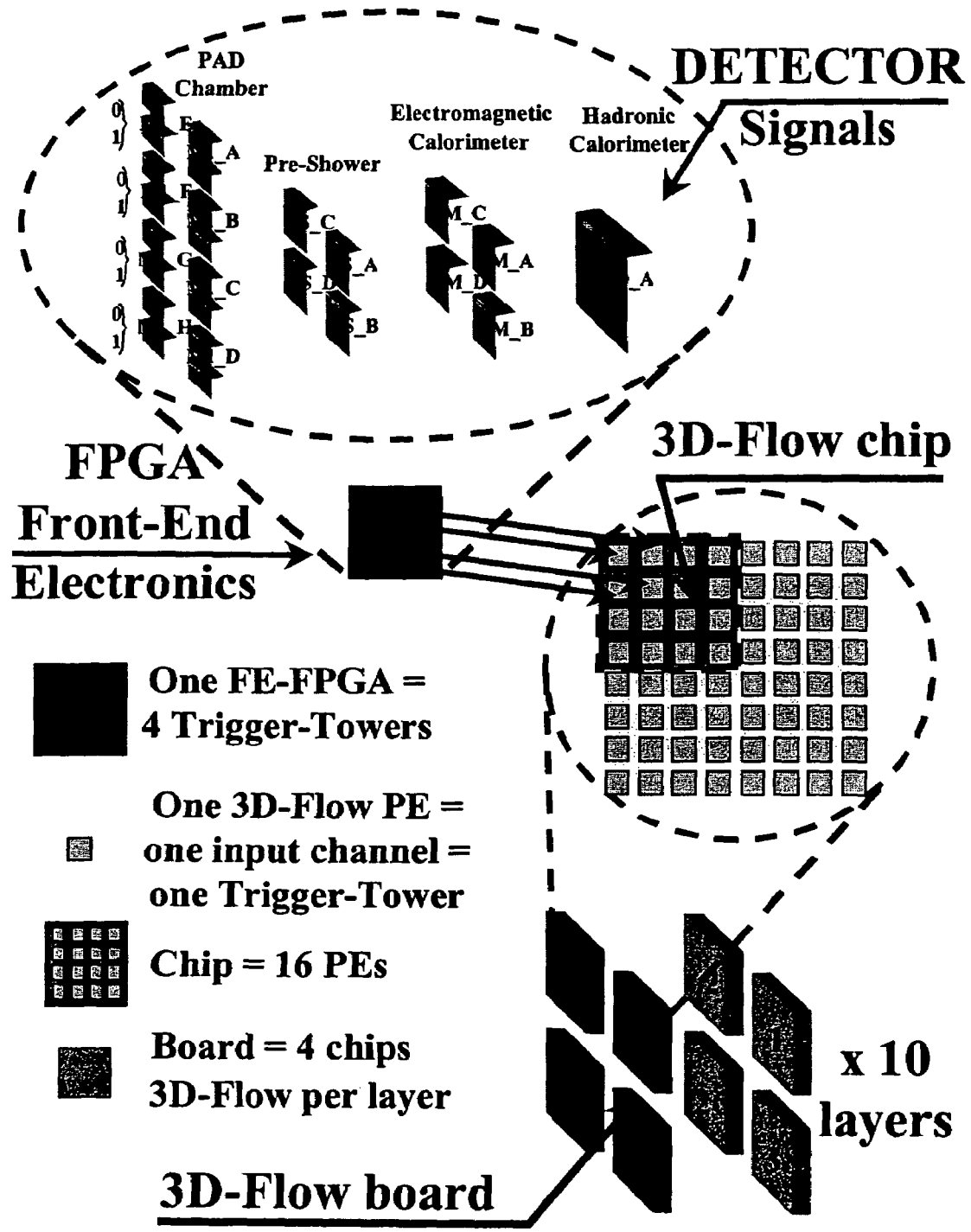

5.6 Example of Using a Commercial Processor in the 3D-Flow Architecture for a Robot Application The following is an example of a migration from the 3D-Flow processor to a commercially available processor used in a 3D-Flow system architecture for a single-channel application:

Let us assume that a problem needs to be solved in the design of the control of a robot having 200 sensors (or with different degrees of movement, e.g. three for each finger, three for each hand, three for each arm, and so on). The sampling rate to the sensors may be from 500 Hz to 10 KHz. The latency from reading the input data, to sending the result to the actuators should be less than a quarter of a second. The real-time algorithm (written in C++) cannot be broken in pipeline stages because it needs to continuously correlate the data read from the 200 sensors, and the intermediate results of the algorithm cannot be forwarded to the next electronic stage because they are too numerous and would require too many wires/pins. After verifying that there are no commercially available processors that can execute the real-time algorithm within the time interval of two consecutive input data, it is decided that the implementation of the 3D-Flow architecture for one channel will be ideal and will solve the problem using several commercial processors interfaced via the 3D-Flow bypass switches. Any future modifications to the system resulting from the increased complexity of the real-time algorithm, or the increase in the number of sensors (or movements of the robot) could be accommodated easily by adding one layer (since it is one channel, there will be only one additional processor) with its associated bypass switch to the system (FIGS. 10B and 10C shows how the current approaches require a redesign of the entire system if the complexity of the algorithm or the number of sensors increase).

5.6.1 Comparison of Results Obtained Between Existing Designs and the 3D-Flow Design As an example, let us consider the first-level trigger of the cmS experiment at CERN for 4864 channels compared to the 3D-Flow system. The digital section of the first-level trigger processor consists of 19 crates (9U), each of which has 8 receiver boards inserted in the rear of the crate (see FIG. 55), 8 electron isolation boards inserted from the front (see bottom of FIG. 55), one JS board, one CEM board, one LTTC board, and one ROC board. This gives a total of 20 boards per crate, which makes for 380 boards per system.

FIG. 55 shows the backplane used on each of the 19 crates of the cmS first-level trigger. The bottom left of the figure shows a section of how the 20 boards are inserted (8 from the rear and 12 from the front). The right side of the figure shows a cross section of the 13-layer board backplane.

The location of the front and rear boards with respect to the backplane (see bottom of FIG. 55) and the display of 3 of the 6 signal layers at the top of the figure shows that the PCB is made of short and long traces with a higher concentration in some areas than in others. This layout, which derives from the overall architecture and approach of the trigger system, creates a problem in reaching high speeds (160 MHz is the current speed using differential signaling).

The above problem is not present on the 3D-Flow system because the overall architecture has been constrained to a single type of board with regular connections.

Figure 56:
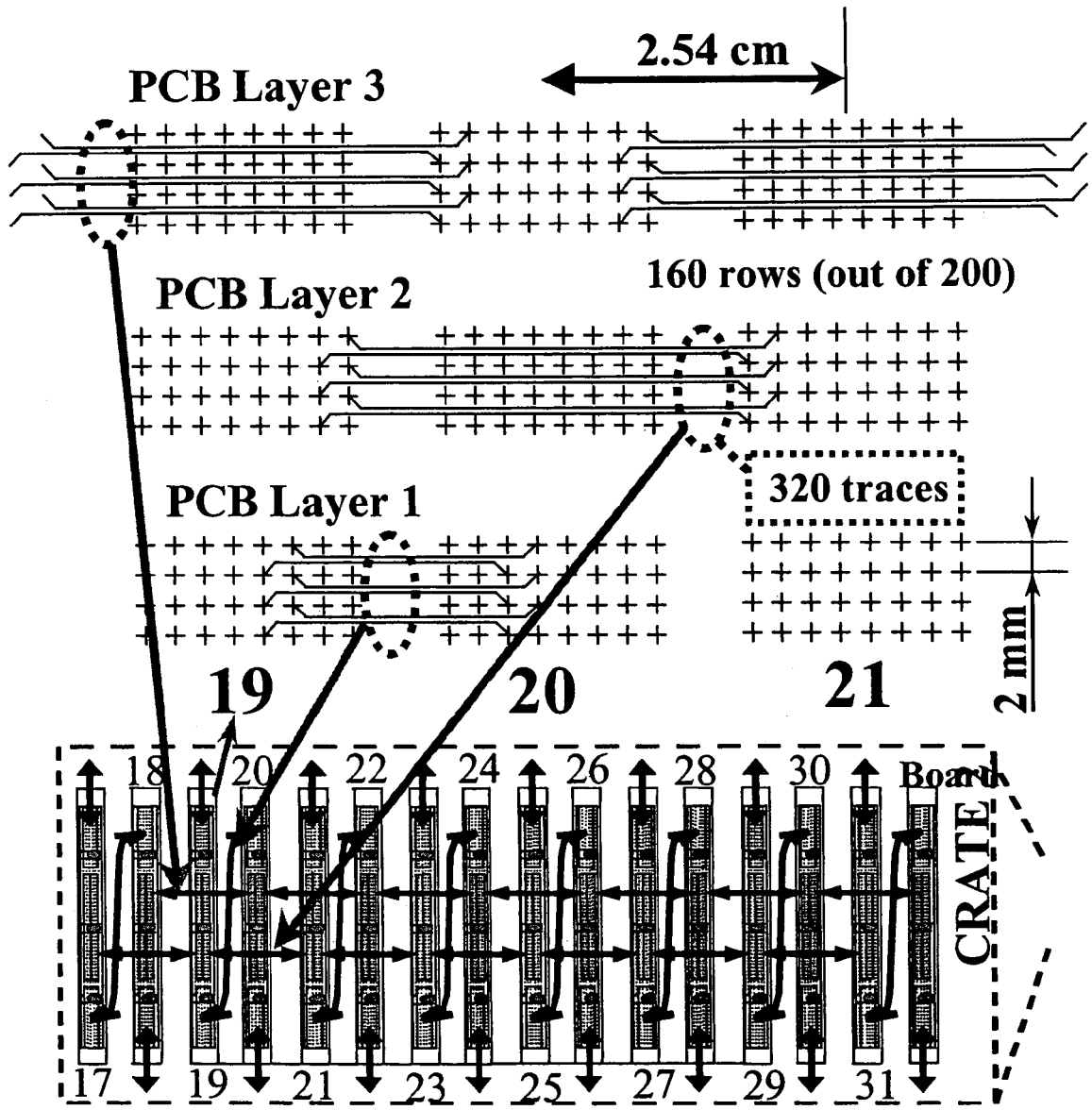

FIG. 56 shows the layout of the backplane of the 3D-Flow crate. The entire 3D-Flow system for 6144 channels in 6 crates (9U) is shown in FIG. 48. Each crate accommodates 16 identical boards with input/output on the front panel and neighboring connections on the backplane. The pattern of the connections on the backplane is regular, thus requiring only short PCB traces as shown in FIG. 56.

The bottom part of FIG. 56 shows the layout of all connectors of the backplane, with three groups of 320 traces connecting pairs of connectors. The details of the connection of each group, which is implemented on a different PCB.

5.6.1.1 Cost/Performance Comparison Between Hardwired Systems and the 3D-Flow Programmable System The detailed board and system design of the 3D-Flow (including a list of ICs, connectors, cables and the layout of the components on the boards) is described herein.

To make a meaningful price comparison, a number of HEP documents quoting prices has been studied. Since the prices derived seemed low, the cost of the 3D-Flow boards has been estimated higher. The following criteria have been applied: a) 3D-Flow boards for the simpler 2×2 algorithm $4/cm2, while for the more complex 3×3 algorithm requiring more 3D-Flow chips $6.4/cm2; b) LAL-Bologna $2.7/cm2; c) cmS $3.3/cm2.

Even if the cost of the 3D-Flow board is estimated at almost twice that of the cmS boards, the 3D-Flow architecture has a definite advantage in cost—it is about three times less expensive, which will be reflected also in lower maintenance cost—in addition to its advantage in programmability, scalability, and flexibility.

LAL and Bologna boards (36.6 cm×40 cm) have been estimated at an average of $3600/board. cmS large boards (36.6 cm×40 cm) have been estimated at an average of $4800/board. cmS small boards (36.6 cm×28 cm) have been estimated at an average of $3400/board.

The "3D-Flow mixed-signal processing boards," (36.6 cm×34 cm) has been estimated at $5000/board for the 2×2 LAL algorithm and $8000/board for the complex cmS algorithm.

The cost to design a 9U board has been estimated at $77000. The cost to design a backplane has been estimated at $50000. The cost of a backplane has been estimated at $3600. The cost of a 9U crate has been estimated at $9000. Legenda:

LAL board design (4): front-end card (248 units); ECAL summary card (28 units); HCAL summary card (8 units); selection card (18 units), selection controller card (2 units);

3D-Flow board design (1): 3D-Flow mixed-signal board (96 units).

Bologna board design (4): front-end card (212 units); ECAL L0 card (208 units); HCAL L0 card (56 units); Message dispatcher card (1 unit); and CMS board design (6): Receiver cards (152 units); EI cards (152 units); JS cards (19 units); CEM cards (19 units); LTTC cards (19 un.); ROC cards (19 un.).

While the cost benefit in an experiment is considerable, even more important is the performance of the level-0 trigger, and its flexibility to accommodate future changes. The below list gives references of the features/performances. The details are described in Sections I, III, and V of this article and in the references listed in the table.

TABLE 9

Fast data acquisition and processing implementations: Features and Performances.

| ITEM | CMS | LAL | 3DF | BO |
|---|---|---|---|---|
| 2 × 2 Algorithm | | X | X | |
| 3 × 3 Algorithm | X | | X | X |
| Fully programmable | | | X | |
| Add subsystems later | | | X | |
| No boundary limitation | | | X | |
| Modular Scalable | | | X | |
| Technology-independ. | | | X | |

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

TABLE 8

Trigger cost implementation comparison between hardwired systems and the 3D-Flow programmable system.

| | Bologna 6144 Ch | | LAL Orsay 6144 Ch | | 3D-Flow 6144 Ch | | CMS 4864 Ch. | | 3D-Flow 4864 Ch | |
|---|---|---|---|---|---|---|---|---|---|---|
| | (boards @ $2.4/cm²) | | (boards @ $2.4/cm²) | | (boards @ $4/cm²) | | (boards @ $3.3/cm²) | | (boards @ $6.4/cm²) | |
| ITEM | # | Sys Cost [K$] | # | Sys Cost [K$] | # | Sys Cost [K$] | # | Sys Cost [K$] | # | Sys Cost [K$] |
| Board Design | 4 | 308 | 4 | 308 | 1 | 77 | 6 | 426 | 1 | 77 |
| Backplane Design | 3 | 150 | 3 | 150 | 1 | 50 | 1 | 50 | 1 | 50 |
| Crates inter-cabling | | | | | 40 | 9 | | | 40 | 9 |
| Boards (small) | | | | | 96 | 480 | 228 | 775 | 76 | 608 |
| Boards (large) | 477 | 1717 | 304 | 1094 | | | 152 | 729 | | |
| Backplanes | 40 | 144 | 20 | 72 | 6 | 22 | 19 | 69 | 6 | 22 |
| Crates | 40 | 360 | 20 | 180 | 6 | 54 | 19 | 171 | 6 | 54 |
| Total | | $2679K | | $1804K | | $692K | | $2220K | | $820K |

What is claimed is:

1. A system for processing data signals, comprising:

N processing units organized in series in a pipeline arrangement with an input end and an output end, wherein said pipeline arrangement receives data at said input end in a first time interval t1, wherein said N processing units comprises one or more repeating processing units and a non-repeating processing unit, and wherein each processing unit in said one or more repeating processing units comprises:

(A) a processor for receiving and transforming a first type of data signal into a second type of data signal,
wherein said processor has an input port for receiving said first type of data signal and an output port for sending said second type of data signal,
wherein said processor completes a predetermined algorithm in a second time interval t2, and wherein t2 is greater than t1, and
wherein N is an integer determined by said first time interval t1 and said second time interval t2, wherein $$N = \frac{t2}{t1}$$

when the ratio of said second time interval t2 to said first time interval t1, $$\frac{t2}{t1},$$

is an integer, or $$N = \left(\left[\frac{t2}{t1}\right] + 1\right)$$

when said ratio $$\left(\frac{t2}{t1}\right)$$

is not an integer, wherein [t2/t1] denotes the greatest integer less than or equal to $$\frac{t2}{t1};$$

(B) a register for storing said first type of data signal or said second type of data signal, wherein said second type of data signal is transformed by said processor from said first type of data signal according to said pre-determined algorithm;
(C) a bypass switch capable of being in a first state or a second state and operating in a plurality of cycles with each cycle in said plurality of cycles consisting of N consecutive first time intervals,
wherein, when in said first state, said bypass switch is connected to a register in an adjacent processing unit in said pipeline arrangement and to said register of (B), said processor of (A) is bypassed and does not receive said first type of data signal,
wherein, when in said second state, said bypass switch is not connected to any register in said pipeline arrangement, said input port of said processor of (A) is connected to a register in an adjacent processing unit in said pipeline arrangement and said output port of said processor of (A) is connected to said register of (B), and during said second state of said bypass switch, said processor of (A) receives a first type of data signal at said input port, and wherein said cycle of N consecutive first time intervals consists of (i) N-1 consecutive first time intervals during which said bypass switch is in said first state and (ii) one first time interval during which said bypass switch is in said second state;
wherein, at any first time interval, only the bypass switch in one processing unit of said N processing units is in said second state, and
wherein said non-repeating processing unit comprises a processor, a register, and a bypass switch.

2. The system of claim 1, wherein said non-repeating processing unit is a starting processing unit which receives data from a data input device in said first time interval t1, and wherein said starting processing unit comprises:
(SA) a starting processor for receiving and transforming a first type of data signal into a second type of data signal,
wherein said starting processor has a starting input port for receiving said first type of data signal and a starting output port for sending said second type of signal,
wherein said starting processor completes said predetermined algorithm at said second time interval t2, and
wherein N is an integer determined by said first time interval t1 and said second time interval t2, wherein $$N = \frac{t2}{t1}$$

when the ratio of said second time interval t2 to said first time interval t1, $$\frac{t2}{t1},$$

is an integer, or $$N = \left(\left[\frac{t2}{t1}\right] + 1\right)$$

when said ratio $$\left(\frac{t2}{t1}\right)$$

is not an integer, wherein $$\left[\frac{t2}{t1}\right]$$

denotes the greatest integer less than or equal to $$\frac{t2}{t1};$$

(SB) a starting register for storing said first type of data signal or said second type of data signal, wherein said second type of data signal is transformed by said staffing processor of (SA) from said first type of data signal according to said pre-determined algorithm;

(SC) a starting bypass switch having a first state and a second state and operating in cycles with each cycle consisting of N consecutive first time intervals, wherein, when in said first state, said staffing bypass switch is connected to said data input device and to said staffing register of (SB), said staffing processor of (SA) is bypassed and does not receive said first type of data signal, wherein, when in said second state, said starting bypass switch is not connected to said data input device or to said staffing register of (SA), said input port of said starting processor of (SA) is connected to said data input device and said output port of said staffing processor (SA) is connected to said staffing register of (SB), and during said second state of said staffing bypass switch, said starting processor of (SA) receives a first type data signal from said data input device at the staffing input port, and wherein said cycle of N consecutive first time intervals consists of (i) N-1 consecutive first time intervals during which said staffing bypass switch is in said first state and (ii) one first time interval during which said staffing bypass switch is in said second state.

3. The system of claim 1, wherein said first type of data signal comprises a signal received from a sensor.

4. The system of claim 1, wherein N is an integer equal or greater than 2.

5. The system of claim 1, wherein N is an integer equal or greater than 8.

6. The system of claim 1, wherein said first time interval is 25 nanoseconds (ns) or shorter.

7. The system of claim 1, wherein said first time interval is 1 ns or shorter.

8. The system of claim 1, wherein said second time interval is between 100 ns to 300 ns.

9. The system of claim 1, wherein said second time interval is of the order of hundreds of microseconds (μs).

10. The system of claim 1, wherein said second time interval is of the order of hundreds of milliseconds (ms).

* * * * *